United States Patent
Ahmed et al.

(10) Patent No.: US 9,236,743 B2
(45) Date of Patent: Jan. 12, 2016

(54) APPARATUS AND METHOD FOR VOLTAGE AND CURRENT BALANCING IN GENERATION OF OUTPUT POWER IN POWER GENERATION SYSTEMS

(71) Applicants: Shehab Ahmed, Doha (QA); Ahmed Massoud, Doha (QA); Ahmed Salah Morsy, Doha (QA)

(72) Inventors: Shehab Ahmed, Doha (QA); Ahmed Massoud, Doha (QA); Ahmed Salah Morsy, Doha (QA)

( * ) Notice: Subject to any disclaimer, the term of this patent is extended or adjusted under 35 U.S.C. 154(b) by 0 days.

(21) Appl. No.: 14/446,277

(22) Filed: Jul. 29, 2014

(65) Prior Publication Data
US 2015/0035371 A1 Feb. 5, 2015

Related U.S. Application Data

(60) Provisional application No. 61/860,567, filed on Jul. 31, 2013.

(51) Int. Cl.
 *H02J 3/46* (2006.01)
 *H02J 3/38* (2006.01)

(52) U.S. Cl.
 CPC . *H02J 3/382* (2013.01); *H02J 3/46* (2013.01); Y10T 307/691 (2015.04)

(58) Field of Classification Search
 CPC ............ Y10T 307/707; Y10T 307/685; Y10T 307/691; H02J 3/46; H02J 3/382
 USPC ................................................. 307/77, 78, 82
 See application file for complete search history.

(56) References Cited

U.S. PATENT DOCUMENTS

| | | | | |
|---|---|---|---|---|
| 2010/0289338 | A1* | 11/2010 | Stauth | H01L 31/02021 307/77 |
| 2011/0115297 | A1* | 5/2011 | de Waal | H01L 31/02021 307/77 |
| 2011/0140532 | A1 | 6/2011 | Cherukupalli | |
| 2011/0279085 | A1* | 11/2011 | Shigemizu | H01M 10/441 320/117 |
| 2012/0104863 | A1 | 5/2012 | Yuan | |
| 2012/0187766 | A1* | 7/2012 | Cleland | H02J 1/10 307/82 |
| 2012/0255591 | A1 | 10/2012 | Arditi et al. | |
| 2013/0026839 | A1 | 1/2013 | Grana | |
| 2013/0026842 | A1 | 1/2013 | Arditi et al. | |
| 2013/0026843 | A1 | 1/2013 | Arditi et al. | |
| 2013/0033113 | A1 | 2/2013 | Huang et al. | |
| 2015/0144176 | A1* | 5/2015 | Chang | H02J 3/383 136/244 |

OTHER PUBLICATIONS

Bellini et al., "MPPT Algorithm for Current Balancing of Partially Shaded Photovoltaic Modules", IEEE, pp. 933-938, Jul. 2010.
(Continued)

*Primary Examiner* — Fritz M Fleming
(74) *Attorney, Agent, or Firm* — Richard C. Litman

(57) ABSTRACT

An apparatus for voltage balancing parallel arranged direct current (DC) voltage source strings in a power generation system includes a string voltage balancing circuit having reverse blocking switches to control a current flow and an output voltage of the DC voltage source strings. Capacitors are connected to a corresponding reverse blocking switch and in series with a corresponding one of the plurality of DC voltage source strings to construct a voltage difference for a corresponding one of the plurality DC voltage source strings. The string voltage balancing circuit adjusts an output voltage of the DC voltage source strings by controlling a current flowing in the plurality of DC voltage source strings to adjust a voltage constructed across corresponding ones of the capacitors to balance the output voltage for the DC voltage source strings to be substantially the same output voltage. Current balancing using differential power processing is also provided.

20 Claims, 32 Drawing Sheets

(56) References Cited

OTHER PUBLICATIONS

Shenoy et al., "Differential Power Processing for Increased Energy Production and Reliability of Photovoltaic Systems", IEEE Transactions on Power Electronics, vol. 28, No. 6, pp. 2968-2979, Jun. 2013.

Qin et al., "Sub-Module Differential Power Processing for Photovoltaic Applications", IEEE, pp. 101-108, Mar. 2013.

Morsy et al., A New Approach for Increasing Energy Harvest in Large Scale PV Plants Employing a Novel Voltage Balancing Topology, 6 pages, distributed Nov. 2013, IECON Conference, Nov. 10-13, 2013.

* cited by examiner

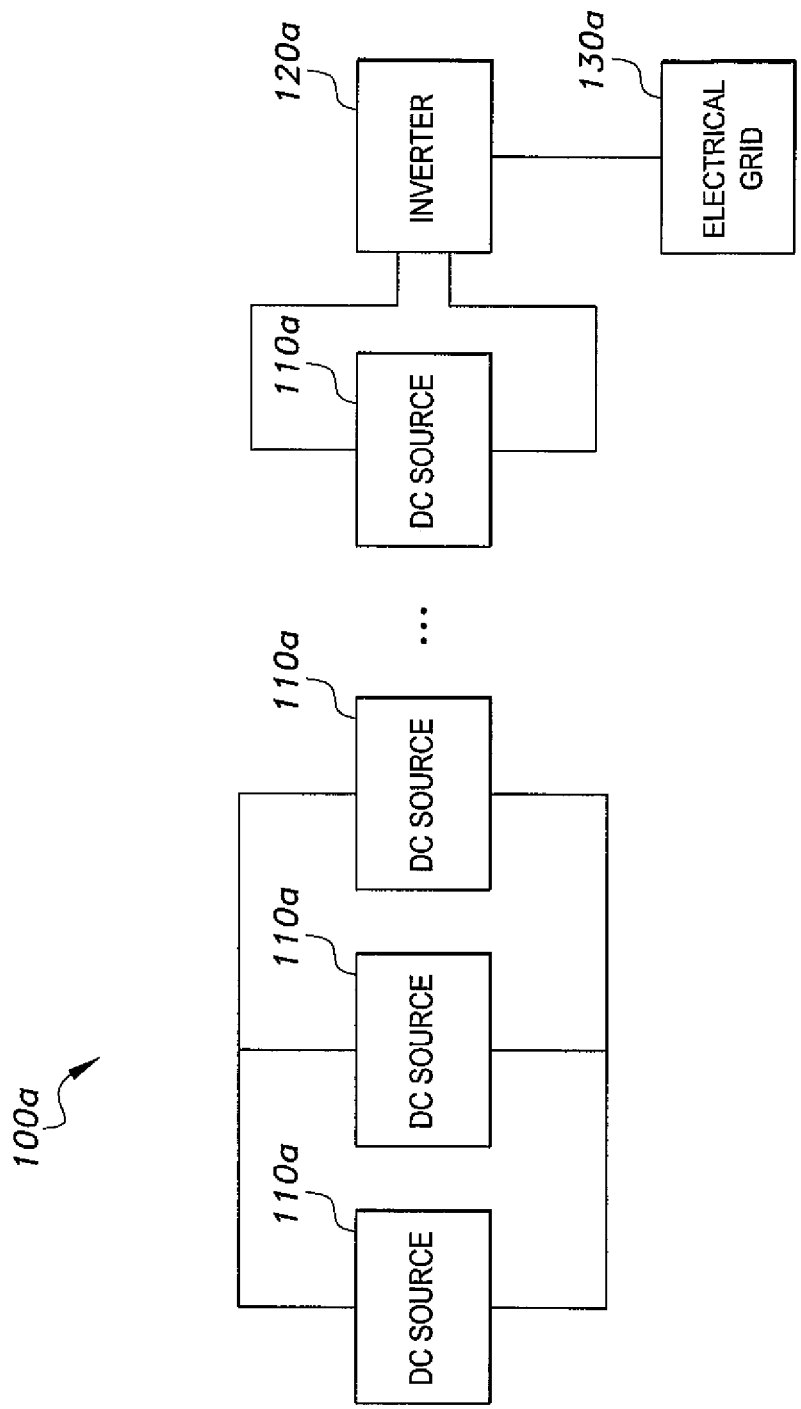

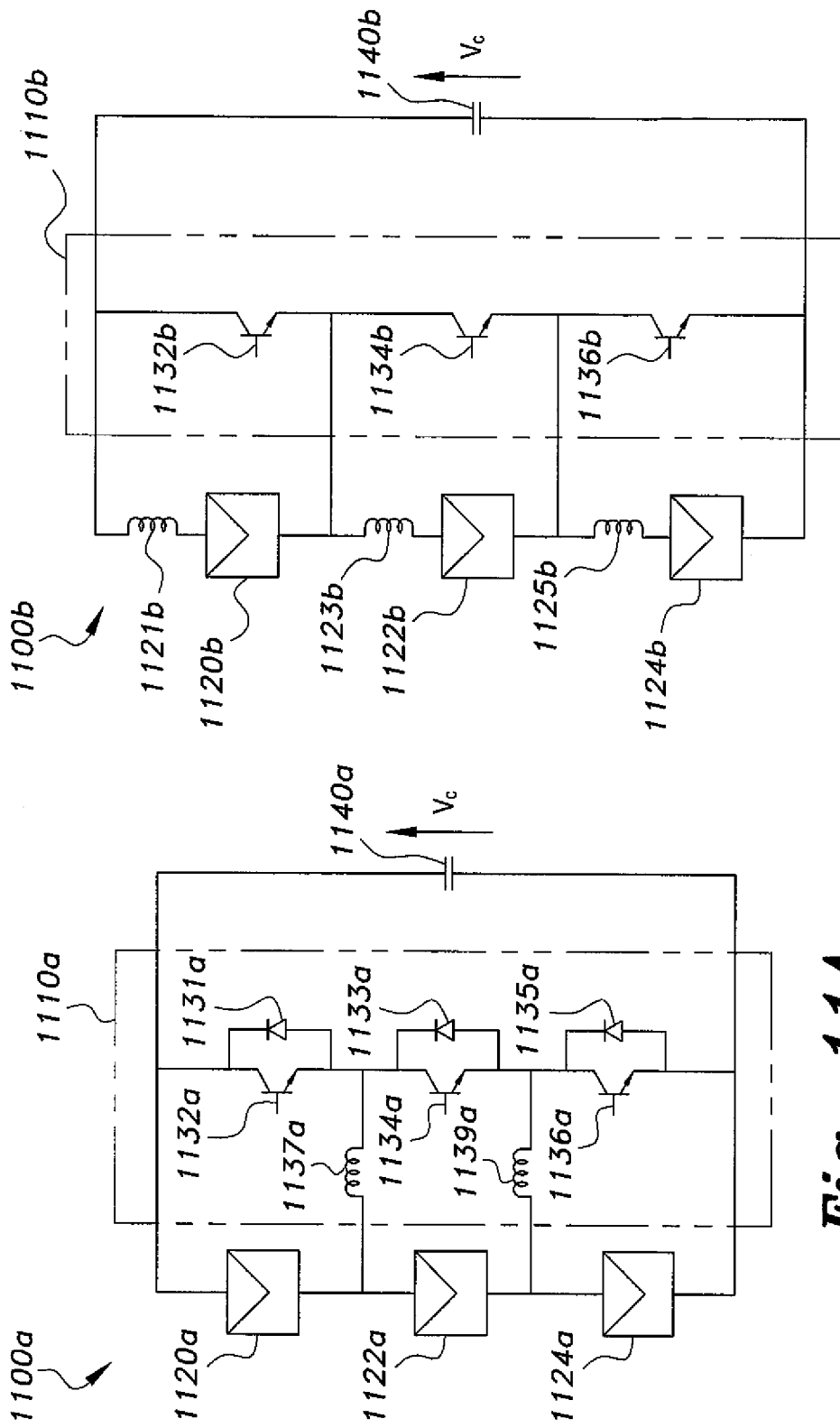

APPARATUS AND METHOD FOR VOLTAGE AND CURRENT BALANCING IN GENERATION OF OUTPUT POWER IN POWER GENERATION SYSTEMS

CROSS-REFERENCE TO RELATED APPLICATION

This application claims the benefit of priority under 35 USC §119 to U.S. Provisional Patent Application No. 61/860,567, filed Jul. 31, 2013 in the United States Patent Office, incorporated by reference herein in its entirety.

BACKGROUND OF THE INVENTION

1. Field of the Invention

The present invention relates to electrical systems, and particularly to voltage and current balancing of generated output power in power generation electrical systems, such as for solar or wind power generation.

2. Description of the Related Art

Alternative energy generation serves as an alternative to traditional use of fossil fuel to generate electricity. Forms of alternative energy include solar energy, wind energy, geothermal energy, biofuel, hydrogen, and the like. Alternative energy generation has certain advantages over fossil fuels, such as being ecologically friendly. In the recent years, there has been increased interest and investment into alternative energy generation. However, alternative energy generation can be inefficient and costly when compared to the use of fossil fuel. Accordingly, it is desirable to provide improved systems and methods for alternative energy generation.

In such systems for alternative energy generation, one approach is to connect strings of direct current (DC) voltage sources in parallel to increase power throughput, such as the case in photovoltaic (PV) arrays, series connected DC output wind farms, batteries, and capacitors, and it is desirable to maintain the voltage of the parallel strings at an equal value. Strings of DC voltage sources can be placed in parallel before being connected to a central inverter to increase throughput. In such configuration, it is desirable to have the same string voltage for the DC voltage source strings in order to prevent any current circulation. In some embodiments, a series diode can be used with every string in order to prevent current circulation. When a string's voltage differs from the rest of the parallel strings, that string is "taken out" or excluded from the parallel combination, thus, typically reducing the total output power. In cases of PV arrays, this can occur because one or more PV modules in the DC voltage source string are shaded, covered with debris or snow, aging or aged, defective, non-homogenous (e.g., produced by different manufacturers), and the like, for example.

In recently years, such as over the past 5-7 years, for example, microinverters have been introduced and are becoming relatively widespread. One of the first commercial products for microinverters was that developed by Enphase Energy in 2008. Since then, a relatively small number of companies have developed microinverter concepts and are commercializing or in the process of commercializing such concepts.

However, in some cases, microinverter systems can have certain drawbacks especially when utility scale installations are in question. In such systems, high voltages typically are required in order to assist in preventing power losses in the system wiring. Strings of series connected microinverters can likely provide an advantage. However, in some cases, synchronization and control of these strings of AC inverters is not trivial, and typically are not necessarily very practical. However, in certain applications, using DC microinverters can provide advantages in power generation, for example.

In this regard, a relatively detailed evaluation of wind farm layouts using both AC and DC components is described in S. Lundberg, "Evaluation of wind farm layouts," EPE Journal, vol. 19, no. 1, pp. 157-169 (March 2004), the entirety of which in incorporated by reference herein as part of this specification. The criterion of investigation is the energy production cost. If renewable energy systems based on wind power production are to become widespread, this criterion generally needs to be evaluated in light of new developments in power generation technology. The energy production cost used in the article is defined as the total investment cost divided by the total energy production of a wind farm. To determine the energy production and the investment cost, accurate loss and cost models are typically desirable, for example.

In certain cases, modern offshore wind farms use AC transmission. Such systems typically utilize an offshore transformer station to raise the voltage from the wind turbines, for example, to 132-150 kV for transmission to shore, for example. Many of the wind farm topologies studied in the above Lundberg EPE Journal article have such an offshore platform. However, offshore platforms are typically complex and costly. In order to reduce complexity and cost, parallel strings of series connected DC output wind turbines can be utilized, as for example, the power generation system 300b illustrated in FIG. 3B.

In this regard, for example, FIG. 1C illustrates an example of a power generation system having line-commutated converters (LCCs) with a static synchronous compensator (STATCOM) for high voltage direct current (HVDC) transmission. FIG. 1C illustrates a power generation system 100c that is a classical LCC based system with a STATCOM. The power generation system 100c includes a plurality of DC voltage sources, such as the wind turbines 110c and 115c, which provide a DC voltage power to the HVDC converter that includes a smoothing reactor, filters F and a point of common coupling (PCC) from which a converted AC voltage is provided to an electrical grid.

Classical LCC based HVDC transmission systems, such as of the type of the power generation system 100c, are based on current source converters with naturally commutated thyristors, so called line-commutated converters (LCC). However, such systems typically only can transfer power between two active AC networks. Thus they typically are less useful in connection with wind farms as the offshore AC grid typically needs to be powered up prior to a possible startup. Also, such classical LCC HVDC systems, such as the power system 100 generally cannot provide independent control of the active and reactive powers, as well as can produce relatively large amounts of harmonics can makes the use of large filters inevitable.

One feasible solution, for the grid connection of offshore wind farms, is so-called "hybrid HVDC" transmission which generally combines a line commutated converter with a STATCOM, as illustrated in the power generation system 100c. The STATCOM can provide the necessary commutation voltage to the HVDC converter and the reactive power compensation to the network during steady state, dynamic and transient conditions. Also, it can provide limited active power support to the offshore network during transient conditions, for example. Also, the LCC can be relatively reliable with relatively little maintenance. Further compared to voltage source converter (VSC) based power generation schemes, such as illustrated in FIG. 1D, LCC based HVDC transmission, such as illustrated in the power generation system 100c of FIG. 100c, typically has much lower power losses (i.e. only 2-3 converter losses) and for high ratings it has comparably relatively low capital costs. However, based on overall system economics, LCC based HVDC transmission typically only merits consideration for transmission capacities above approximately 600 megawatts (MW).

Also, as to VSC based power generation systems, FIG. 1D illustrates an example of a voltage source converter (VSC) based power generation system for high voltage direct current (HVDC) transmission. FIG. 1D illustrates a power generation system 100d that is a VSC based system. The power generation system 110c includes a plurality of DC voltage sources, such as the wind turbines 110d and 115d, which provide a DC voltage power to the HVDC converter that includes a phase reactor, filters F and a point of common coupling (PCC) from which the converted AC voltage is provided to an electrical grid.

VSC based HVDC power generation and transmission type systems have been around since their first commercial installation in 1999, such as in providing generated power to a grid connection from relatively large offshore wind farms, for example. With a VSC type power generation system there is typically no need for an active commutation voltage. Therefore, VSC based HVDC transmission typically does not require a relatively strong offshore or onshore AC network and can even start up against a dead network (black-start capability). In VSC based power generation systems, the active and reactive power can be controlled independently, which can reduce a need for reactive power compensation and can contribute to stabilize the AC network at their connection points.

Also, in VSC based power generation systems, such as in the power generation system 100d, use of insulated-gate bipolar transistor (IGBT) semiconductors can allow for much higher switching frequencies which can reduce the harmonic content of the VSC based systems. Therefore, the filter requirements on the AC side of VSC based power generation systems can be significantly reduced compared to conventional HVDC converters, for example. However, the high-frequency pulse-width modulation (PWM) switching can result in comparatively high converter losses.

While a total efficiency of the two converter stations of a VSC based HVDC transmission system can be less than that of an LCC based system, the cost of VSC based systems is still relatively high due to the more advanced semiconductor valves generally required. In this regard, in order to handle the high voltage, multiple IGBTs typically have to be connected in series, which likely makes the valves expensive, as complex gate drives and voltage sharing circuitries are generally required. Also, VSC based HVDC transmission systems are typically relatively competitive at transmission distances over 100 km or power levels of between approximately 200 MW and 900 MW.

FIG. 1E illustrates a graph 100e of transmission capacity in megawatts (MW) versus transmission distance in kilometers (km) for various HVAC and LCC/VSC based HVDC power generation systems, HVAC transmission systems have been used for the vast a majority of offshore wind farms commissioned to date, which currently can cover distances up to 100 kilometers (km) and power transmission capacities up to 200 MW, for example. For larger and more remote wind farms, transmission losses are can increase relatively significantly due to capacitive charging currents, which can limit the use of HVAC transmission systems, such as illustrated in and according to the graph 100e of FIG. 1E, for example.

Such use of parallel strings of series connected DC output wind turbines can provide a relatively low energy cost and the required high voltage generally can be obtained without use of a central DC-DC converter. Another advantage of the topology can be that turbine voltage insulation stresses are relatively reduced, and can be handled by the transformer in the local DC-DC converter. However, as described in S. Lundberg, "Wind farm configuration and energy efficiency studies—series DC versus AC layouts," PhD Thesis, Department of Energy and Environment, Chalmers University of Technology, Gothenburg, Sweden (ISSN-0346-718X 2006), the entirety of which is incorporated by reference herein as part of this specification, individual wind turbine converters typically need to be designed (or overrated) for a voltage level of about 35% above the nominal voltage.

Such design for an overrated voltage level typically is due to the fact that if one turbine does not feed out energy and therefore fails to hold output voltage, other turbines must compensate for this by increasing their output voltage. While overrating all the wind turbine converters of a wind farm can provide a solution to extend the operation of the wind farm during turbine outages, this can be a relatively costly alternative that can have limitations, such as especially in relatively larger power generation systems.

Accordingly, it is desirable to provide improved systems and methods for alternative energy generation for power generation systems, such as to increase the efficiency of power generation in a cost effective manner.

Thus, string voltage balancing converters, and voltage and current balancing circuitry and topologies in the generation of output power in power generation systems, addressing the aforementioned problems is desired.

SUMMARY OF THE INVENTION

Embodiments of string voltage balancing power converters, as can include embodiments of voltage balancing circuits and topologies, as can be combined with embodiments of current balancing circuits and topologies, as described herein, of various configurations for power generation electrical systems are provided to balance series DC source or series strings of DC sources that are placed in parallel. Embodiments of string voltage balancing power converters for power generation electrical systems can be advantageously used in photovoltaic (PV) arrays and plants, wind farms based on the series/parallel connection of DC output turbine converters, battery banks, capacitor banks, and the like, for example.

Embodiments of apparatuses and methods for voltage balancing parallel arranged DC voltage source strings in a power generation system includes a string voltage balancing circuit having reverse blocking switches to control a current flow and an output voltage of the DC voltage source strings. Capacitors are connected to a corresponding reverse blocking switch and in series with a corresponding one of the plurality of DC voltage source strings to construct a voltage difference for a corresponding one of the plurality DC voltage source strings. The string voltage balancing circuit adjusts an output voltage of the DC voltage source strings by controlling a current flowing in the plurality of DC voltage source strings to adjust a voltage constructed across corresponding ones of the capacitors to balance the output voltage for the DC voltage source strings to be substantially the same output voltage.

Embodiments of apparatuses and methods for current balancing a plurality of parallel arranged direct current (DC) voltage source strings in a power generation system include a differential power processing (DPP) current balancing circuit. The DPP current balancing circuit includes a plurality of reverse blocking switches connected to a plurality of series connected DC voltage source modules forming corresponding ones of the plurality of DC voltage source strings to control currents respectively flowing through each of the series connected DC voltage source modules. A plurality of inductors connected to the series connected DC voltage source modules and to the plurality of reverse blocking switches induce a corresponding voltage based on the flow of the respective controlled currents to balance a current between corresponding ones of the series connected DC voltage source modules to adjust the respective currents flowing through each of the plurality of series connected DC voltage source modules.

These and other features of the present invention will become readily apparent upon further review of the following specification and drawings.

BRIEF DESCRIPTION OF THE DRAWINGS

FIG. 1A illustrates general schematic diagram of a power generation system with DC voltage sources connected in parallel utilizing a central inverter that changes a DC voltage to an AC voltage to which embodiments of DC voltage balancing circuits and topologies according to the present invention can be applied.

FIG. 11A illustrates a general schematic diagram of an embodiment of current balancing circuit as can be used in a power generation system of a plurality of DC voltage source strings to balance the current between series connected DC voltage sources, such as PV arrays in a DC voltage source string according to the present invention.

FIG. 11B illustrates a general schematic diagram of another embodiment of current balancing circuit as can be used in a power generation system of a plurality of DC voltage source strings to balance the current between series connected DC voltage sources, such as PV arrays in a DC voltage source string according to the present invention.

Unless otherwise indicated, similar reference characters denote corresponding features consistently throughout the attached drawings.

DETAILED DESCRIPTION OF THE PREFERRED EMBODIMENTS

Embodiments of string voltage balancing power converters, as can include embodiments of voltage balancing circuits and topologies, as can be combined with embodiments of current balancing circuits and topologies, as described herein, of various configurations for power generation electrical systems are provided to balance series DC source or series strings of DC sources that are placed in parallel. Embodiments of string voltage balancing power converters for power generation electrical systems can be advantageously used in photovoltaic (PV) arrays and plants, wind farms based on the series/parallel connection of DC output turbine converters, battery banks, capacitor banks, and the like, for example. In some embodiments of string voltage balancing power converters for power generation electrical systems, string voltage balancing converters balance the voltage on series strings of DC sources that are placed in parallel to maximize power throughput from the system. As discussed herein, such balancing of the voltage on series strings of DC sources can be achieved by controlling the voltage and/or current, such as in embodiments that include placing of a capacitor in series with each DC voltage source string or as can be shared by multiple strings, for example.

FIG. 1A illustrates general schematic diagram of a power generation system with DC voltage sources connected in parallel utilizing a central inverter that changes a DC voltage to an alternating current (AC) voltage to which embodiments of voltage balancing and current balancing circuits and topologies can be applied. For example, FIG. 1A illustrates a power generation system 100a with DC voltage sources 110a connected in parallel, which utilizes a central inverter 120a to change a DC voltage to an AC voltage, for example. As is illustrated in FIG. 1A, DC voltage sources 110a, such as can be PV modules, are connected to the central inverter 120a which, among other things, converts a DC voltage generated by the DC voltage sources 110a to an AC voltage suitable for being supplied to an electrical grid 130a. However, one or more DC voltage source strings can be taken out when the generated DC voltage differs from that generated by the rest of DC voltage sources in the power generation system, such as power generation system 100a.

Figure 1B:
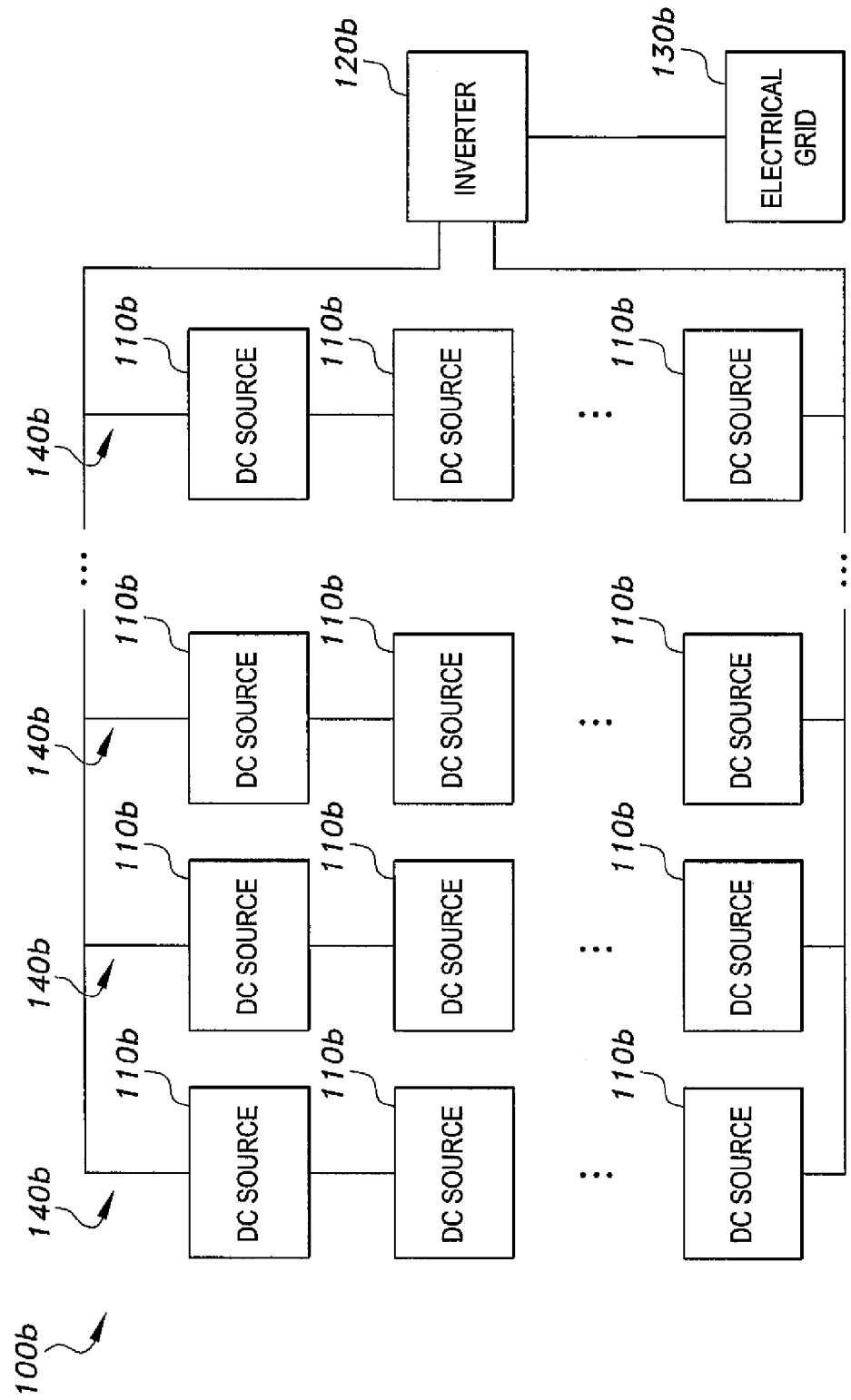
FIG. 1B illustrates a general schematic diagram of a power generation system with DC voltage source strings connected in parallel, which utilizes a central inverter that changes a DC voltage to an AC voltage according to which embodiments of DC voltage balancing circuits and topologies according to the present invention can be applied.
Figure 1C:
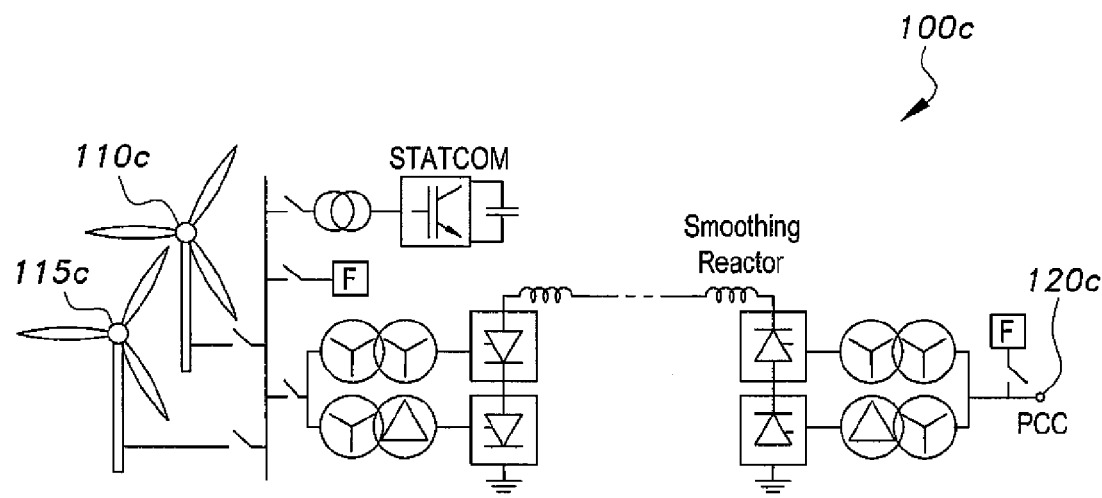
FIG. 1C illustrates an example of a power generation system having line-commutated converters (LCCs) with a static synchronous compensator (STATCOM) for high voltage direct current (HVDC) transmission to which embodiments of DC voltage balancing circuits and topologies according to the present invention can be applied.
Figure 1D:
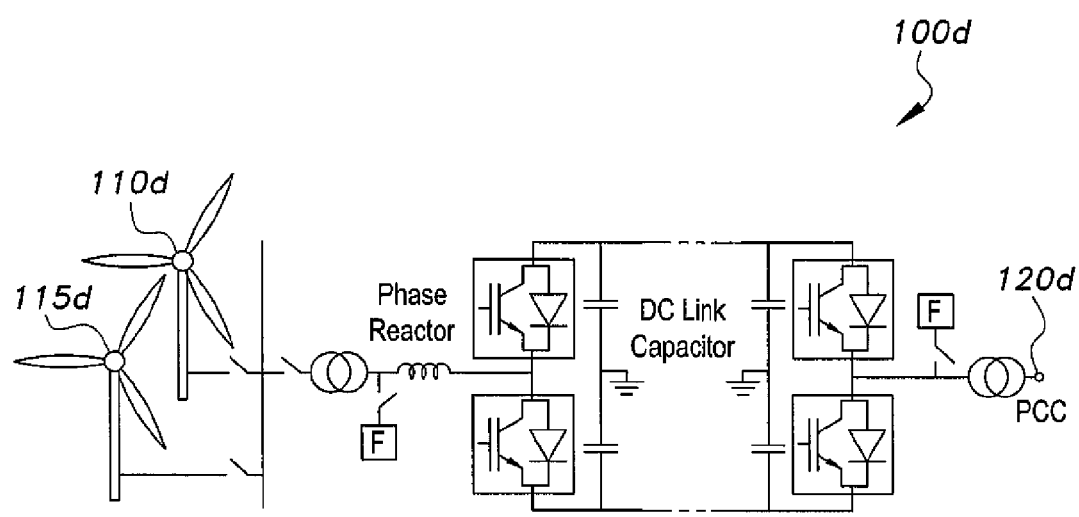
FIG. 1D illustrates an example of a voltage source converter (VSC) based power generation system for high voltage direct current (HVDC) transmission to which embodiments of DC voltage balancing circuits and topologies according to the present invention can be applied.
Figure 1E:
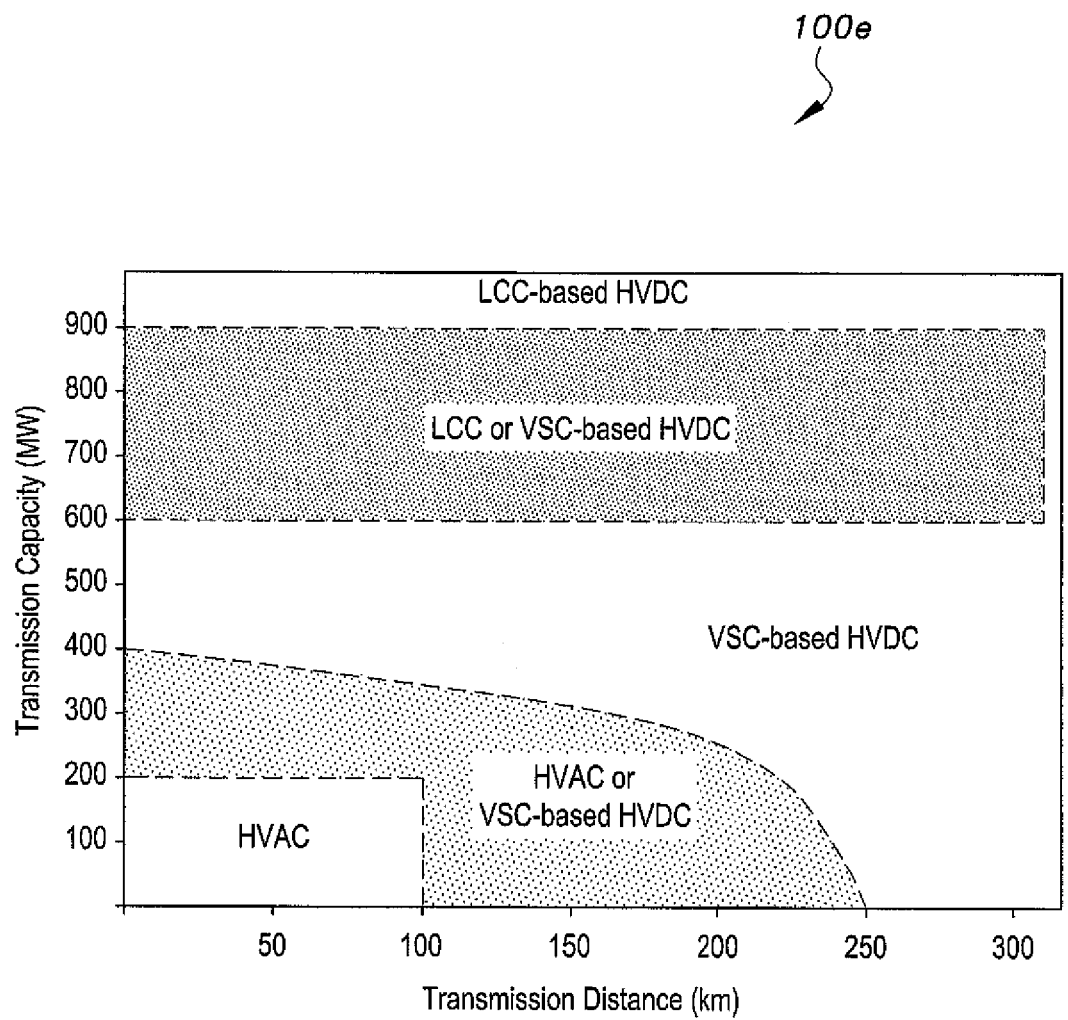
FIG. 1E illustrates a graph of transmission capacity in megawatts (MW) versus transmission distance in kilometers (km) for various HVAC and LCC/VSC based HVDC power generation systems.

FIG. 1B illustrates a general schematic diagram of a power generation system with DC power generation source strings connected in parallel, which utilizes a central inverter that changes a DC voltage to an AC voltage to which embodiments of voltage balancing and current balancing circuits and topologies can be applied. FIG. 1B illustrates a power generation system 100b with a plurality of DC voltage source strings 140b connected in parallel, which utilizes a central inverter 120b to convert a DC voltage to an AC voltage, for example. The power generation system 100b utilizes a plurality of DC voltage source strings, in which more than one DC voltage source 110b make up a corresponding DC voltage source string 140b, in place of individual DC voltage sources illustrated in the power generation system 100a of FIG. 1A.

The central converter or central inverter architecture shown in FIGS. 1A and 1B in the power generation systems 100a and 100b can be used in rooftop PV systems (mainly a DC voltage source single string), as well as can be used in relatively large PV plants. In some embodiments of such power generation systems, especially when a proper shading analysis is carried out, the PV system can be designed to operate with several string inverters instead of a central inverter, such as the power generation systems illustrated in FIGS. 2A and 2B.

Figure 2A:
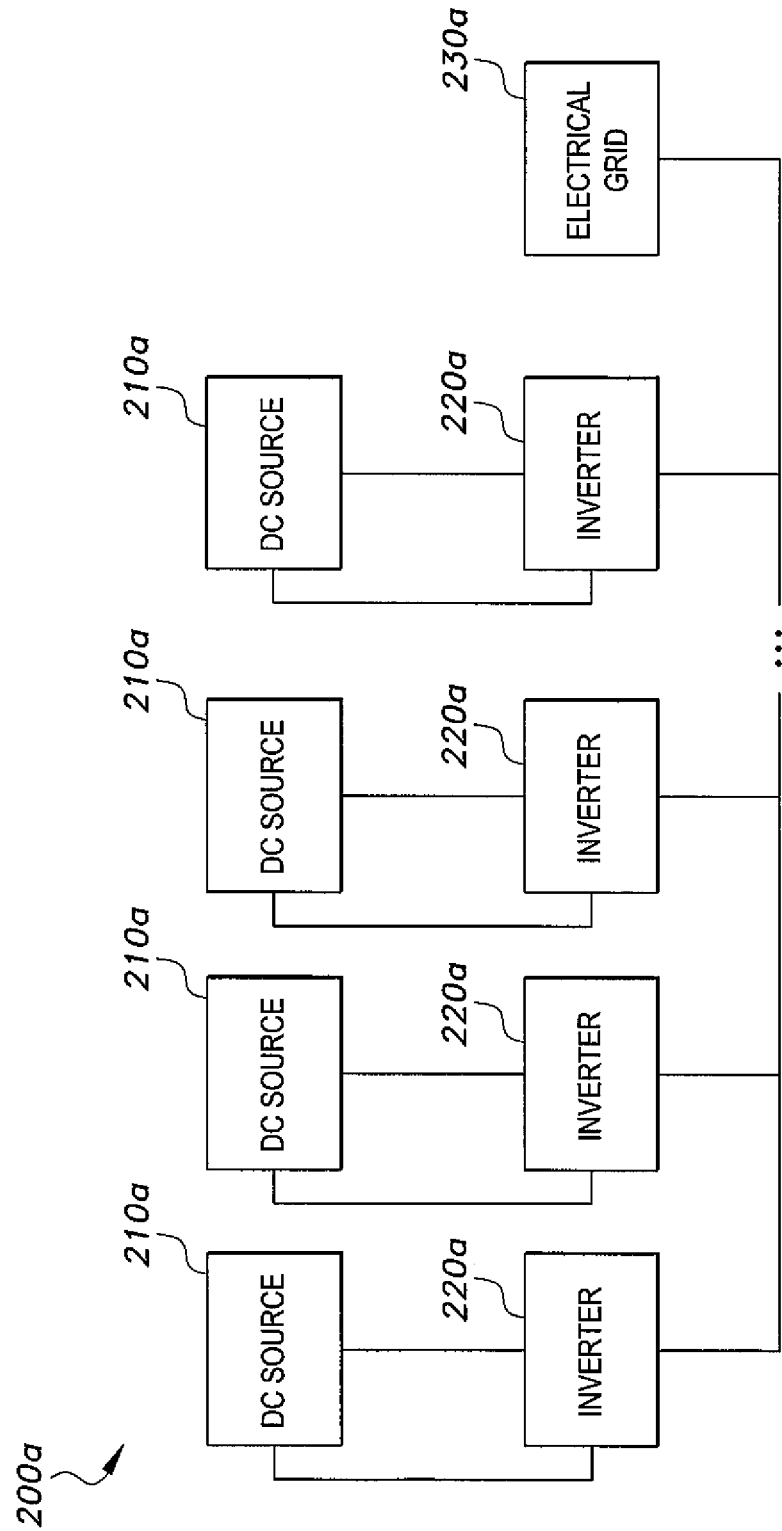
FIG. 2A illustrates a power generation system with DC voltage sources connected in parallel, which utilizes multiple inverters that change a DC voltage to an AC voltage to which embodiments of DC voltage balancing circuits and topologies according to the present invention can be applied.

FIG. 2A illustrates a power generation system with DC voltage sources connected in parallel, which utilizes multiple inverters that change a DC voltage to an AC voltage to which embodiments of voltage balancing and current balancing circuits and topologies can be applied. FIG. 2A illustrates a power generation system 200a with DC sources 210a connected in parallel, which utilizes multiple inverters 220a, such as a corresponding inverter 220a for each DC voltage source 210a, for example. Among other things, the inverters 220a convert a DC voltage generated by the respective DC voltage sources 210a into an AC voltage, which is fed into an electrical grid 230a.

Figure 2B:
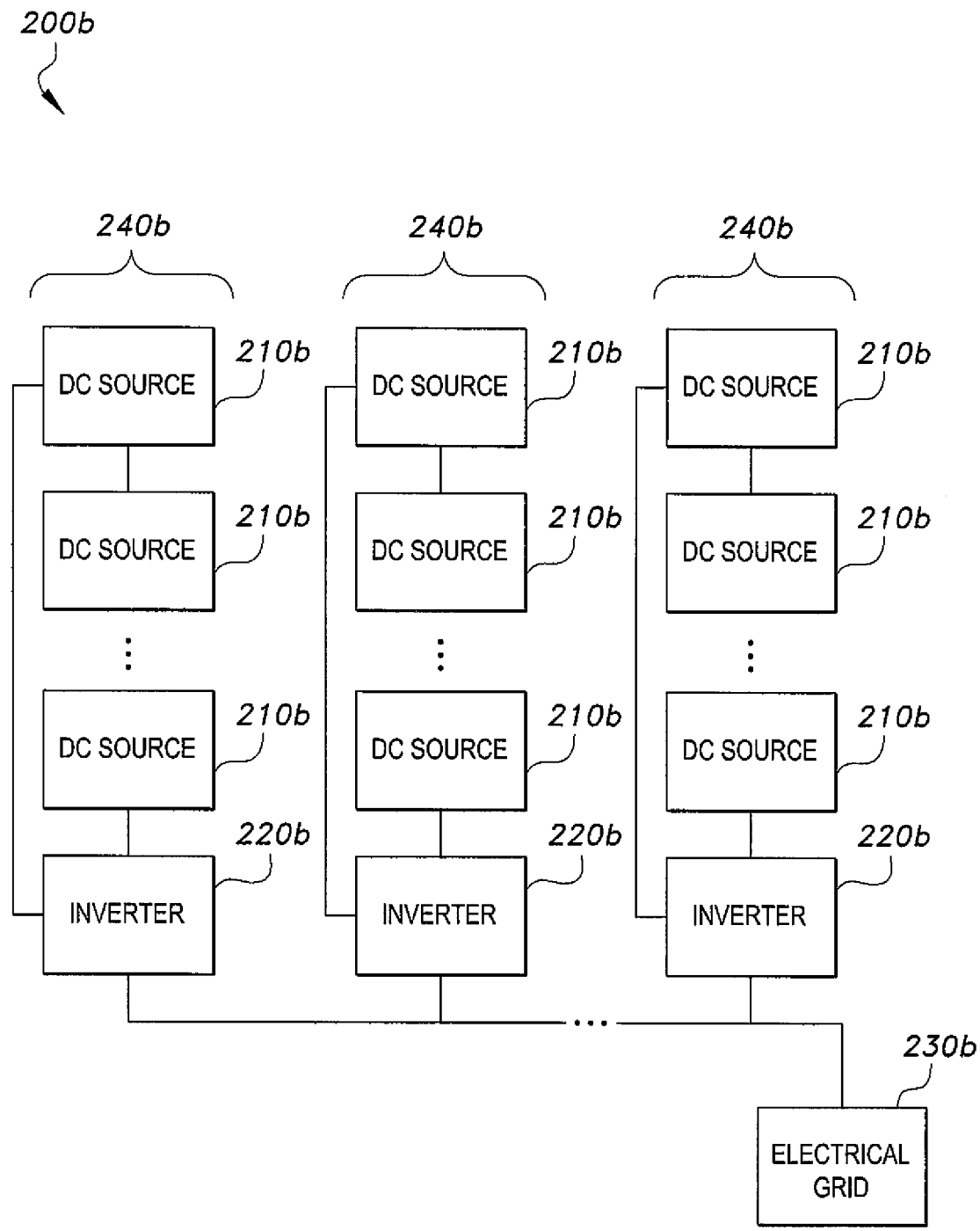
FIG. 2B illustrates a power generation system with DC voltage source strings connected in parallel, which utilizes multiple inverters that change a DC voltage to an AC voltage to which embodiments of DC voltage balancing circuits and topologies according to the present invention can be applied.

FIG. 2B illustrates a power generation system with DC voltage source strings connected in parallel, which utilizes multiple inverters that change a DC voltage to an AC voltage to which embodiments of voltage balancing and current balancing circuits and topologies can be applied. FIG. 2B illustrates a power generation system 200b with strings of sources 240b connected in parallel, which utilizes multiple inverters 220B according to some embodiments. Power generation system 200b utilizes strings of DC sources, in which more than one DC source 110 make up a sources string 240b, in place of individual sources illustrated in FIG. 2A. In some embodiments, more than one string 240b can share an inverter 220b. In some embodiments, using multiple string inverters (as is shown in FIGS. 2A and 2B) adds cost but improves energy harvesting.

Figure 3A:
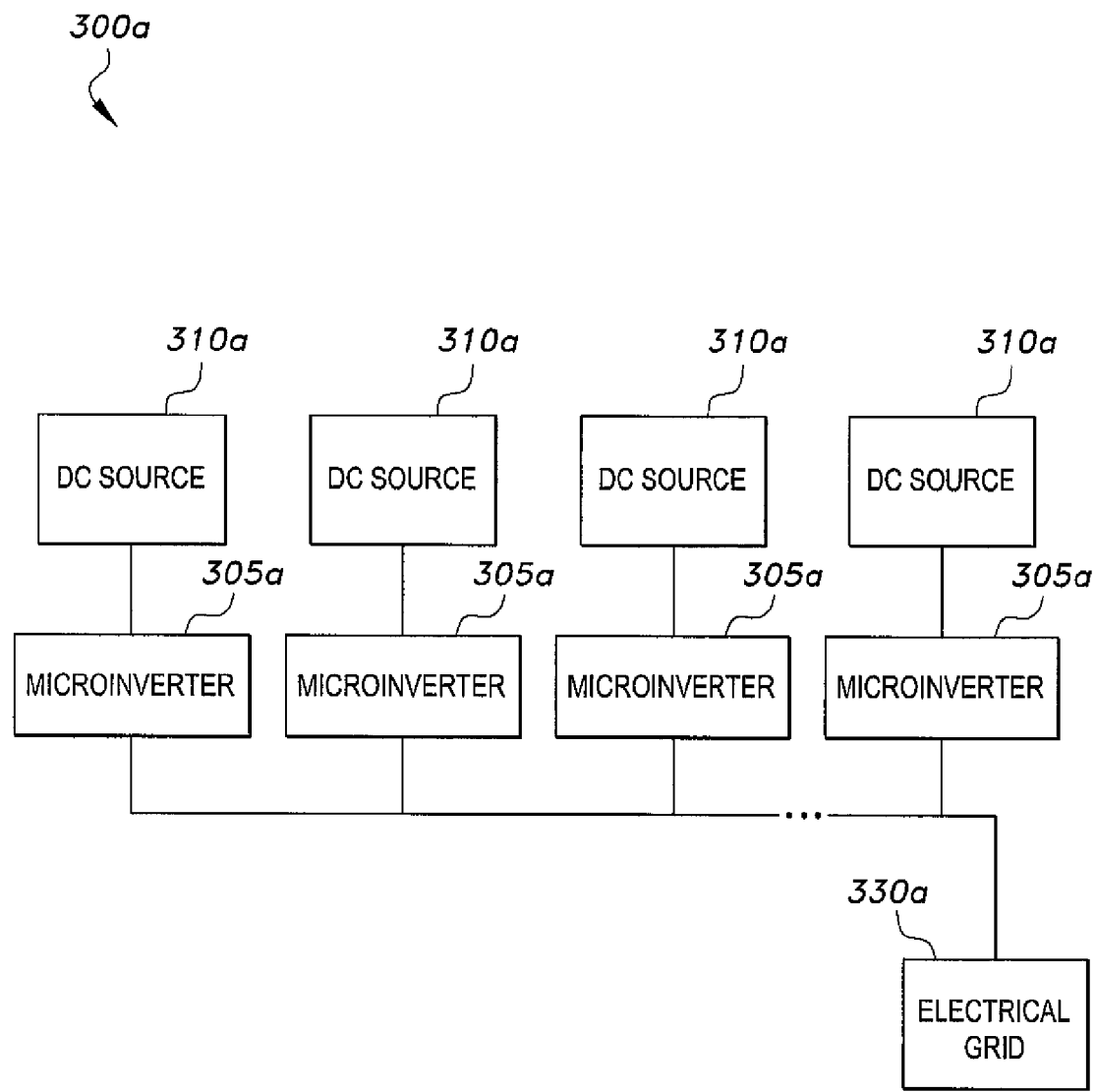
FIG. 3A illustrates a power generation system with DC voltage sources connected in parallel that utilizes microinverters that change a DC voltage to an AC voltage to which embodiments of DC voltage balancing circuits and topologies according to the present invention can be applied.

Also, FIG. 3A illustrates a power generation system with DC voltage sources connected in parallel that utilizes microinverters that change a DC voltage to an AC voltage to which embodiments of voltage balancing and current balancing circuits and topologies can be applied. FIG. 3A illustrates a power generation system 300a that utilizes microinverters 305a respectively associated with a corresponding DC voltage source 310a, for example. The microinverters 305a can, among other things, convert a DC voltage into an AC voltage.

Although a microinverter solution concept seems to addresses problems of shading, aging, manufacturer differences, module failures, etc., in power generation systems, use of such microinverters typically is at the expense of placing a power converter inside every module, such as inside or associated with each of the DC voltage sources 310a. Also, multiple modules can share the same microinverter, such as a microinverter 305a. When microinverters are used, all modules typically can deliver their full potential when placed in parallel.

Figure 3B:
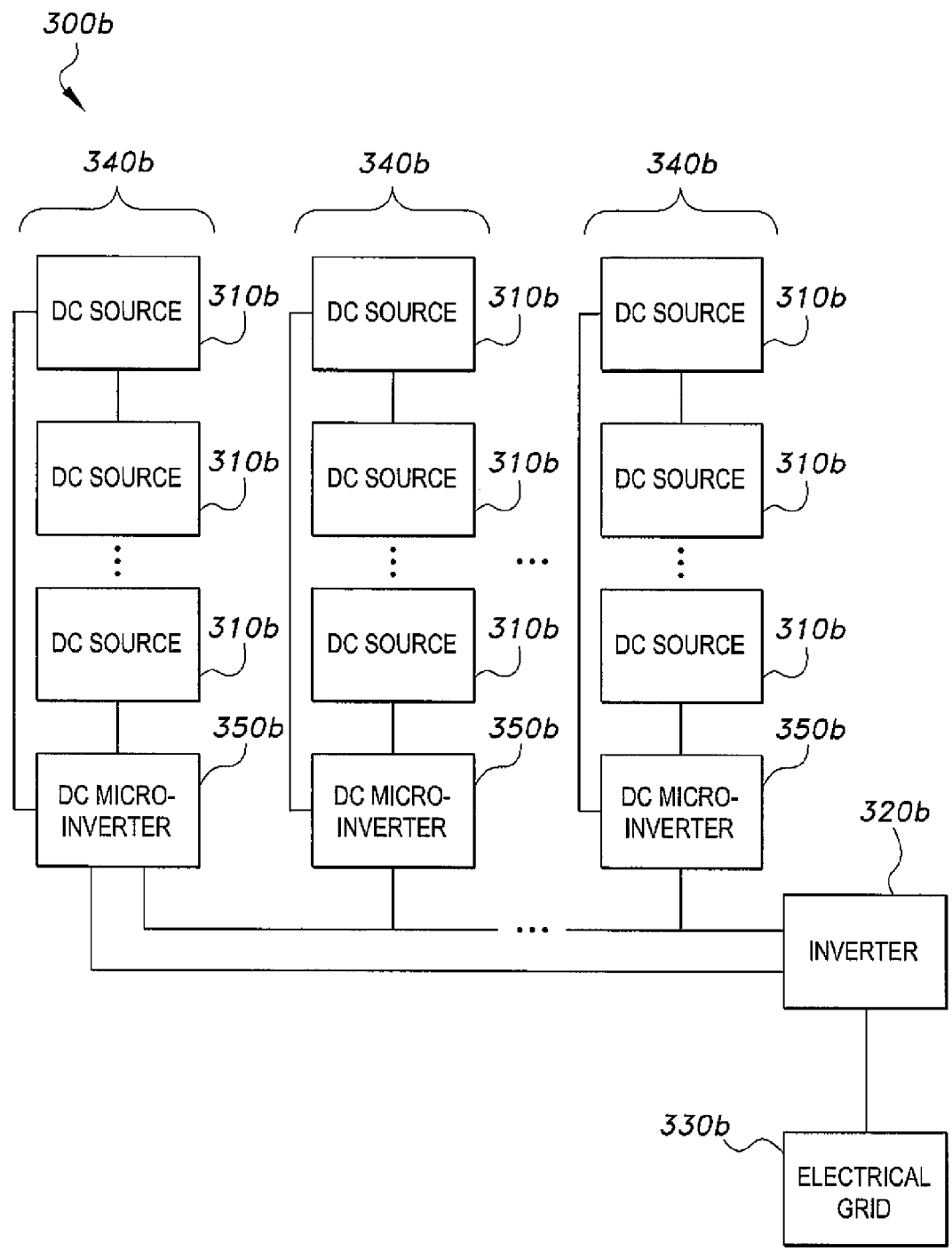
FIG. 3B illustrates a power generation system with DC voltage source strings connected in parallel that utilizes DC microinverters and a central inverter that change a DC voltage to an AC voltage to which embodiments of DC voltage balancing circuits and topologies according to the present invention can be applied.

FIG. 3B illustrates a power generation system with DC voltage source strings connected in parallel that utilizes DC microinverters and a central inverter that changes a DC voltage to an AC voltage to which embodiments of voltage balancing and current balancing circuits and topologies can be applied. FIG. 3B illustrates a power generation system 300b that utilizes DC microinverters 350b, for example. As is illustrated in FIG. 3B, DC voltage sources 310b make up DC voltage source strings 340b, which are respectively connected to the microinverters 350b. A DC voltage from the microinverters 350b is fed to a central inverter 320b, which converts the DC voltage into an AC voltage suitable for being fed into the electrical grid 330b.

In some embodiments, more than DC voltage source string 340b can share the same DC microinverter 350b. In some cases, if increased power throughput is required, more DC voltage source strings, such as DC voltage source strings 340b, need to be connected in parallel, and a need for voltage balancing of the Dc voltage source string generated voltages emerges, such as to enhance the efficiency of the power generation system.

Figure 13:
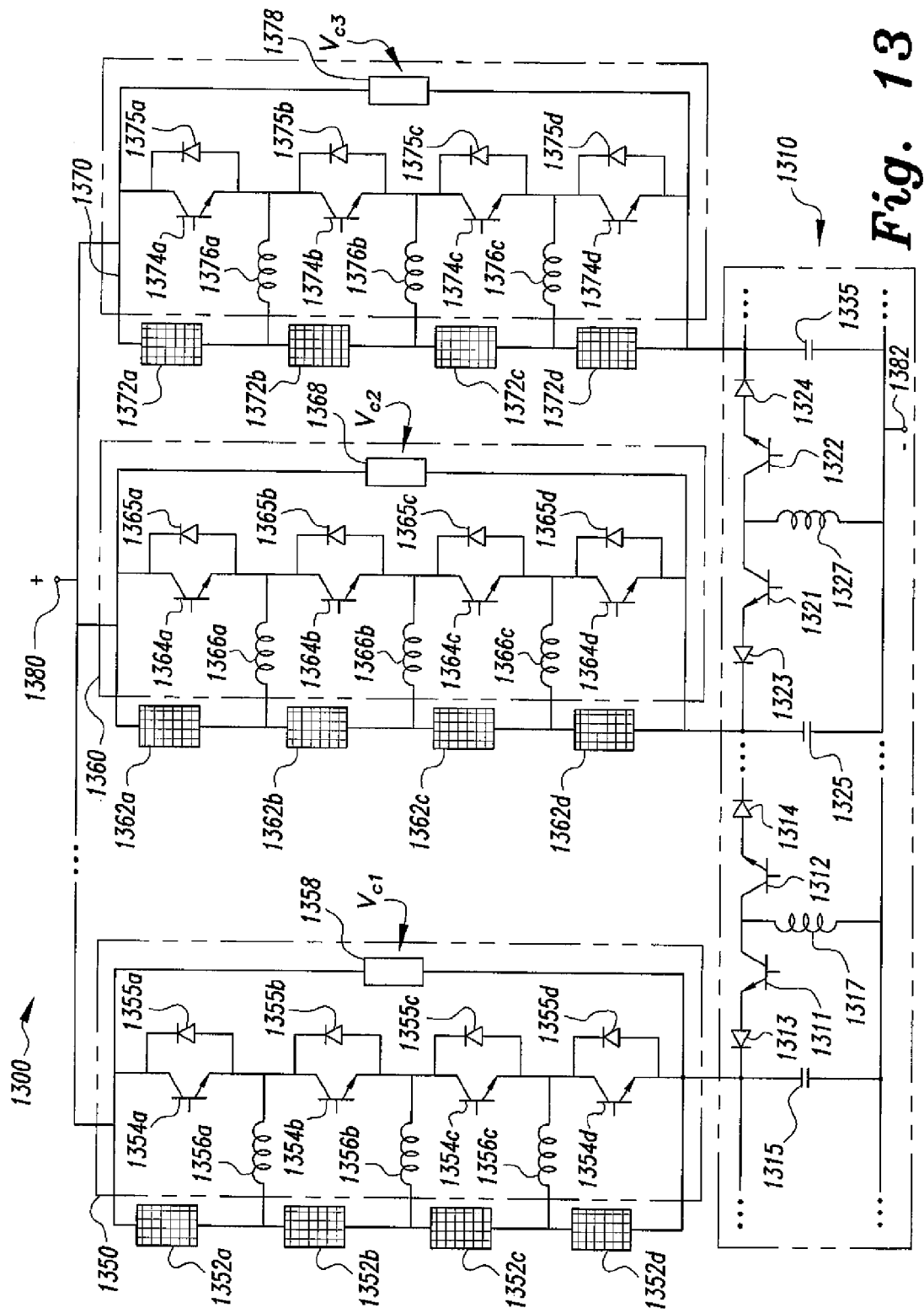
FIG. 13 illustrates a general schematic diagram of an embodiment of a voltage and current balancing circuit topology including a plurality of current balancing circuits for differential power processing to balance the current between series connected DC voltage source modules, such as PV arrays, in a corresponding DC voltage source string integrated with an embodiment of a voltage balancing circuit topology to balance the voltage of a plurality DC voltage source strings in a power generation system according to the present invention.

In electrical power generation systems, such as those described above with respect to FIGS. 1A-3B, control of power generation to balance series DC source or series strings of DC sources that are placed in parallel can be efficiently enhanced by embodiments of string voltage balancing power converters that include or are associated with embodiments of voltage balancing circuitry and topologies that can also be combined with embodiments of current balancing circuitry and topologies, such as to balance currents flowing in individual modules, such as PV arrays, of a corresponding DC voltage source string, for power generation, such as those illustrated in the embodiments FIGS. 4-9 and 11A-11F and in embodiments of a combined voltage balancing and current balancing circuit and topology, such as illustrated in FIG. 13.

Embodiments of string voltage balancing converters including voltage balancing and/or current balancing circuits and topologies, as described herein, can address, among other things, overrating requirements of DC source converters, such as wind turbine converters in a series connected to a DC wind farm. Also, embodiments of string voltage balancing converters including embodiments of voltage balancing circuits and topologies, as well as can also include embodiments of current balancing circuits and topologies, can be configured into architectures to balance any number of a plurality of DC voltage source strings, such as DC voltage source strings of PV panels or of DC output turbines, for example, as can depend on the use of application, and should not be construed in a limiting sense.

Figure 4A:
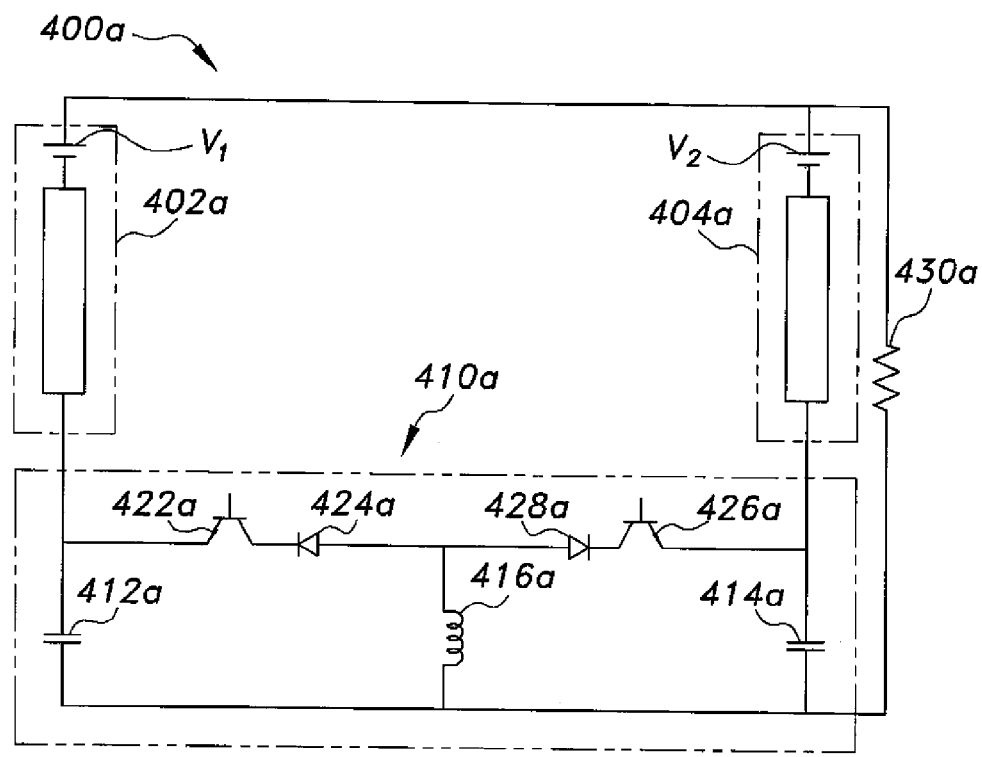
FIG. 4A illustrates a general schematic diagram of an embodiment of power generation system with DC voltage source strings connected in parallel including an embodiment of a DC voltage balancing circuit according to the present invention.

Referring now to FIG. 4A, a general schematic diagram is illustrated of an embodiment of power generation system with DC voltage source strings connected in parallel including an embodiment of a DC voltage balancing circuit. FIG. 4A illustrates a power generation system 400a that includes a string voltage balancing circuit 410a. The power generation system 400a includes two unbalanced strings of DC voltage sources 402a and 404a, such as of PV panels or wind turbines, connected in parallel. For example, for purposes of illustration, the DC voltage source string 402a can generate a 100 kV output voltage $V_1$ and the DC voltage source string 404a can generate an 80 kV output voltage $V_2$. The DC voltage source strings 402a and 404a are connected to a load 430a to which an output voltage is provided.

The string voltage balancing circuit 410a is connected between DC voltage source strings 402a and 404a. The string voltage balancing circuit 410a includes two reverse blocking switches (e.g., valves) 422a and 426a, an inductor 416a, and two capacitors 412a and 414a. The inductor 416a is connected between the switches 422a and 426a and the switches 422a and 426a divide the inductor 416a current between the two lines, such as according to their operating operation point, for example. The switches 422a and 426a can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense. In some embodiments, the switches 422a and 426a have reverse blocking capability or, as illustrated, can be connected to series diodes 424a and 428a configured to block reverse current to provide a reverse blocking capability, for example.

In the power generation system 400a of FIG. 4A, the voltage unbalance between the lines connected to the DC voltage sources strings 402a and 404a is translated into a negative potential on one capacitor (e.g., capacitor 412a connected to the higher line voltage side) and positive potential on the other capacitor (e.g., capacitor 414a connected to the lower line voltage side). The capacitors 412a and 414a, respectively, pull down and pull up the voltage on the lines connected to the DC voltage source strings 402a and 404a so that the voltage is balanced or substantially balanced across the parallel DC voltage source lines 402a and 404a (e.g., to 75 kV).

Figure 4B:
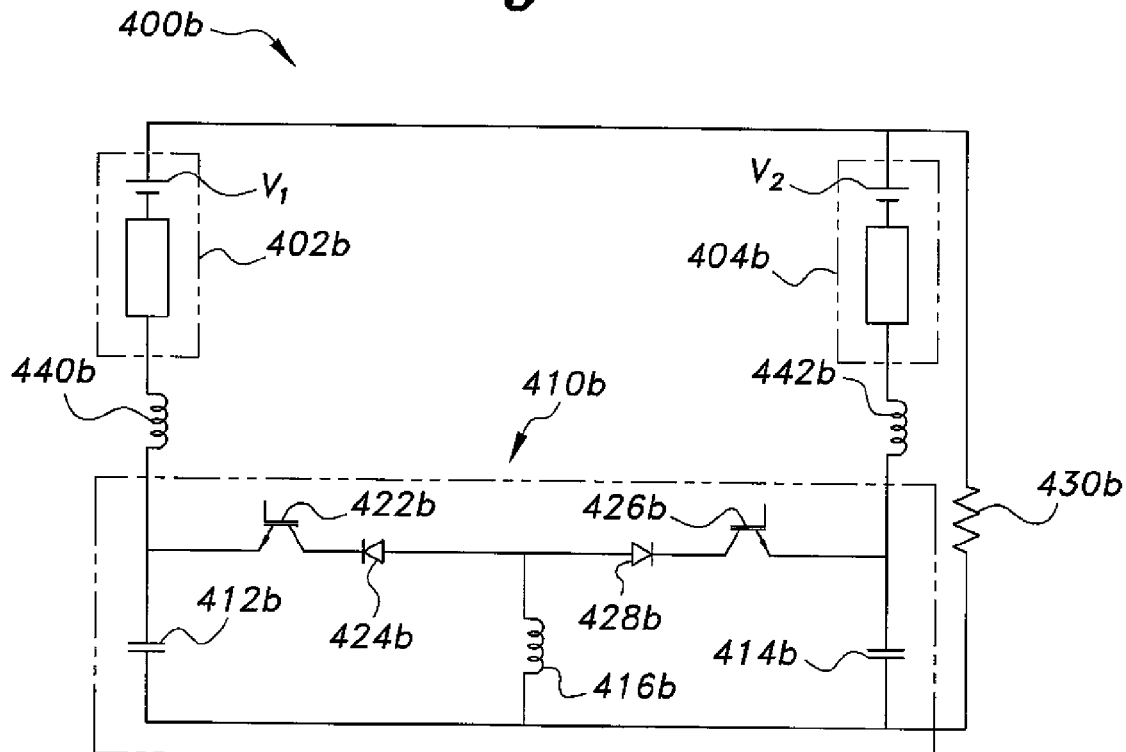
FIG. 4B illustrates a general schematic diagram of an embodiment of a power generation system with DC voltage source strings connected in parallel including an embodiment of a DC voltage balancing circuit according to the present invention.

FIG. 4B illustrates a general schematic diagram of an embodiment of a power generation system with DC voltage source strings connected in parallel including an embodiment of a DC voltage balancing circuit. Similar to the power generation system 400a of FIG. 4A, FIG. 4B illustrates a power generations system 400b that includes a string voltage balancing circuit 410b. The power generation system 400b includes two unbalanced strings of DC voltage sources 402b and 404b, such as of PV panels or wind turbines, connected in parallel. For example, for purposes of illustration, the DC voltage source string 402b can generate a 100 kV output voltage $V_1$ and the DC voltage source string 404b can generate an 80 kV output voltage $V_2$. The DC voltage source strings 402b and 404b are connected to a load 430b to which an output voltage is provided.

The string voltage balancing circuit 410b is connected between the DC voltage source strings 402b and 404b. The string voltage balancing circuit 410b includes two IGBT type semiconductor switches as can be reverse blocking switches (e.g., valves) 422b and 426b, an inductor 416b, and two capacitors 412b and 414b. Use of IGBT type switches for the switches 422b and 426b can allow for relatively higher switching frequencies and can reduce harmonic content, for example. The inductor 416b is connected between the switches 422b and 424b, and the switches 422b and 426b divide the inductor 416b current between the two lines, such as according to their operating operation point, for example. The power generation system 400b also includes an inductor 440b in series with the capacitor 412b and the DC voltage source string 402b and an inductor 442b in series with the capacitor 414b and the DC voltage source string 404b. The inductors 440b and 442b can act as a filter, such as to minimize or reducing a ripple current, for example.

The switches 422b and 426b, in addition to being IGBT type semiconductor switches, can also include any of various suitable switches, such as metal-oxide semiconductor field effect transistor (MOSFET) switches, various types of transistor-type switches, or any another suitable components, as can depend on the use or application, and should not be construed in a limiting sense. In some embodiments, the switches 422b and 426b can have reverse blocking capability or, as illustrated, can be connected to series diodes 424b and 428b configured to block reverse current to provide a reverse blocking capability, for example.

Operation and processes for embodiments of string voltage balancing circuits topologies, such as for the string voltage balancing circuits 410a and 401b, can also be extended and applied to other embodiments of voltage balancing circuit topologies, such as those illustrated in FIGS. 5A-9, for example.

In the embodiments of the operation and process, the string voltage balancing circuits 410a and 410b are respectively connected between the two DC voltage source strings, such as the two unbalanced DC voltage source strings 402a and 404a and the two unbalanced DC voltage source strings 402b and 404b of the power generation systems 400a and 400b, respectively, providing output voltages of $V_1$ and $V_2$. The string voltage balancing circuits 410a and 410b respectively include two reverse blocking switches, the switches 422a and 426a respectively in conjunction with diodes 424a and 428a and the switches 422b and 426b respectively in conjunction with diodes 424b and 428b, and respectively include the inductors 416a and 416b and the capacitors 412a, 414a, 412b and 414b. The switches 422a and 426a of the voltage balancing circuits 410a and the switches 422b and 426b of the voltage balancing circuit 410b are turned on alternately, such that the duty ratio or duty cycle of first switch 422a, 422b ($\delta_1$) plus the duty ratio or duty cycle of second switch 426b, 426b ($\delta_2$) is equal or substantially equal to one, $\delta_1 + \delta_2 = 1$, for example.

The duty ratio or duty cycle of the first switch 422a, 422b ($\delta_1$) and the duty ratio or duty cycle of the second switch 426a, 426b ($\delta_2$) are controlled to get the desired output DC voltage across the load terminals of the power generation system. Such control can be provided by a suitable maximum power point control (MPP) process, such as can be implemented by a computer processor in Matlab®, such as can be implemented by a generalized system 1000 of FIG. 10, for example, as can depend on the use or application, and should not be construed in a limiting sense. The voltage unbalance in the lines is translated into a negative potential on one capacitor (higher line voltage side), and positive potential on the other capacitor (lower line voltage side) to provide the voltage balancing, for example.

Also, operation and processes for embodiments of string voltage balancing circuits topologies, such as for the string voltage balancing circuits 410a and 410, can also be extended and applied to other embodiments of voltage balancing circuit topologies, such as those illustrated in FIGS. 5A-9, for example.

Figure 8A:
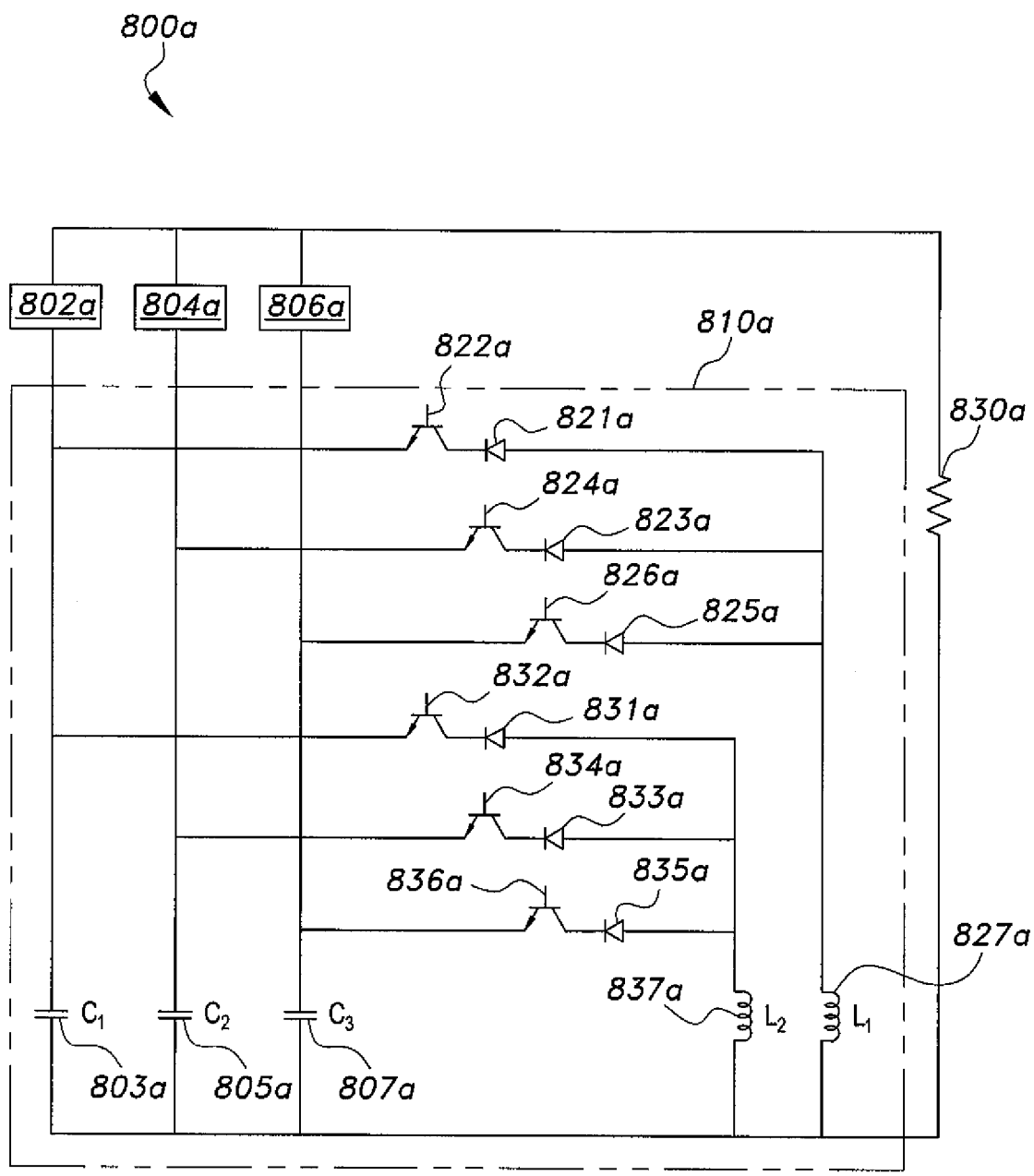
FIG. 8A illustrates a general schematic diagram of an embodiment of power generation system with DC voltage source strings connected in parallel including an embodiment of a DC voltage balancing circuit in a double star balancing converter configuration according to the present invention.
Figure 8B:
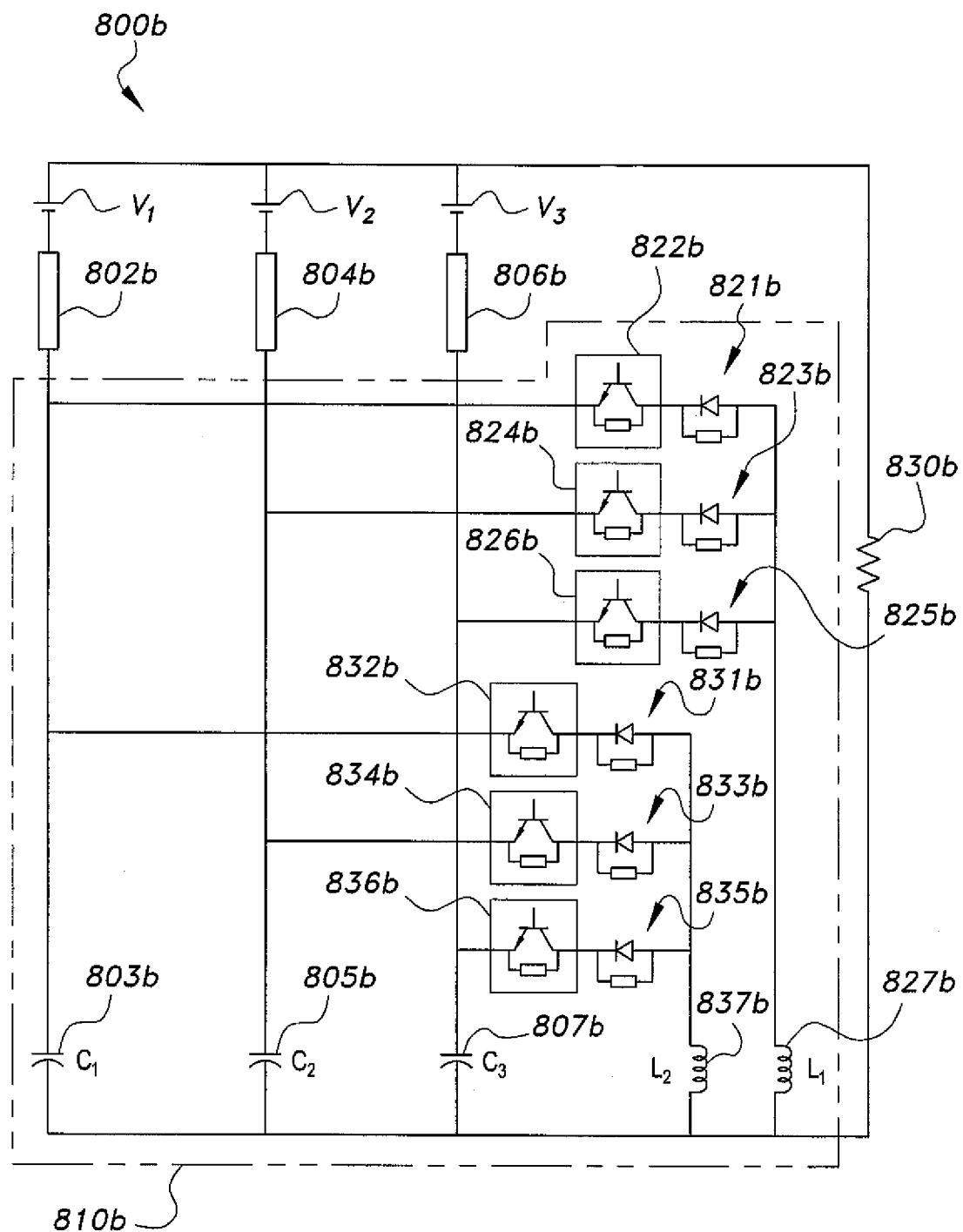
FIG. 8B illustrates a general schematic diagram of an embodiment of power generation system with DC voltage source strings connected in parallel including an embodiment of a DC voltage balancing circuit in a double star balancing converter configuration according to the present invention.
Figure 9:
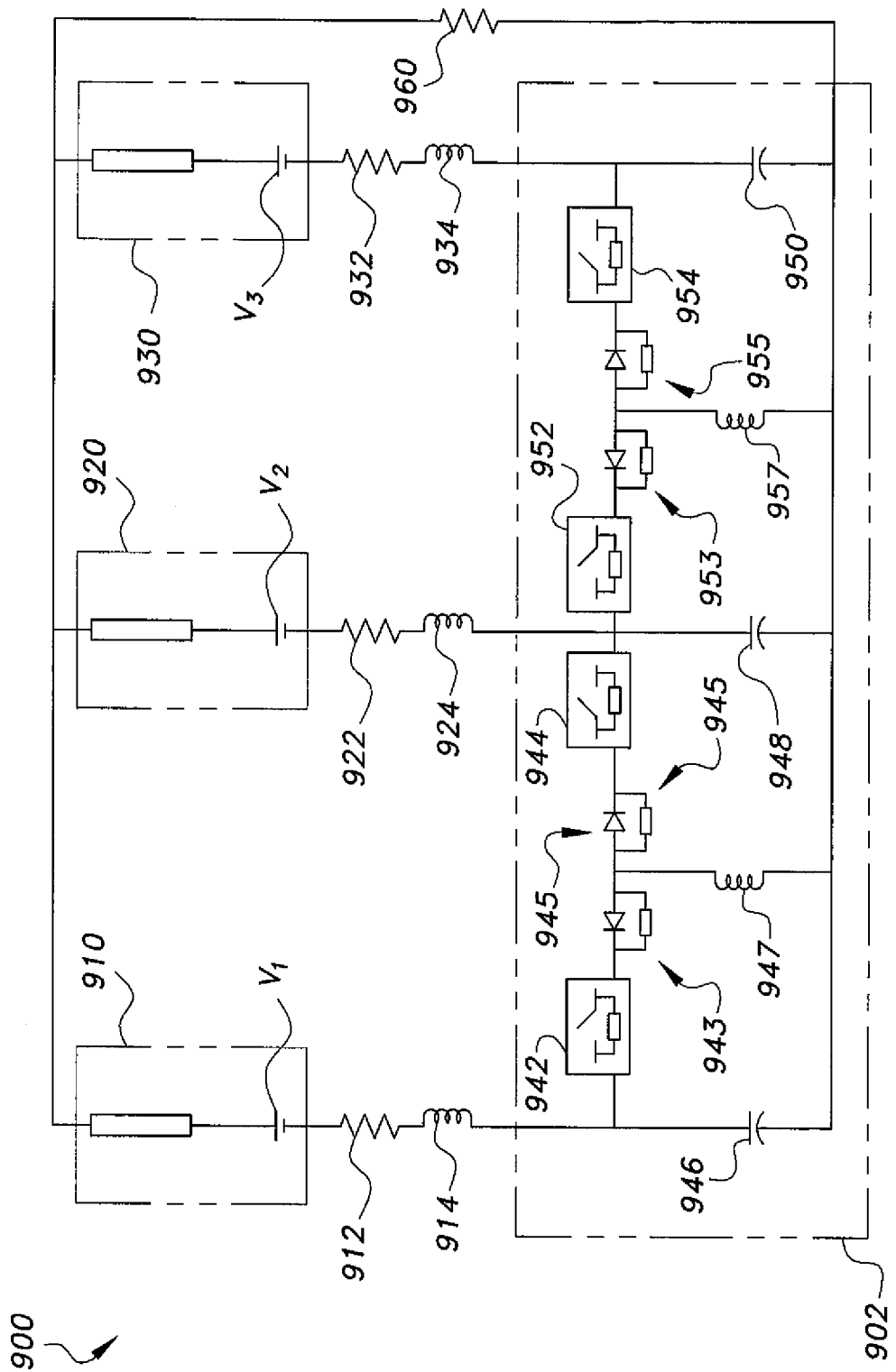
FIG. 9 illustrates a general schematic diagram of an embodiment of power generation system with DC voltage source strings connected in parallel including an embodiment of a DC voltage balancing circuit in an open ring balancing converter configuration according to the present invention.
Figure 10:
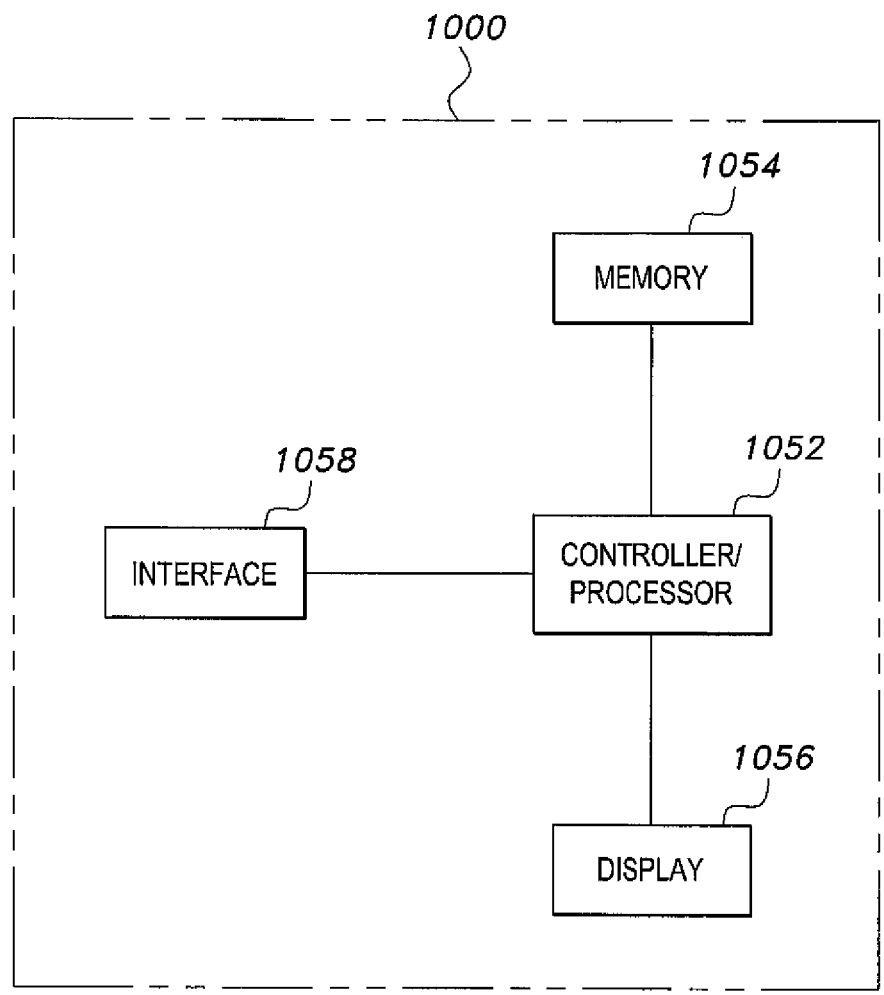
FIG. 10 is a block diagram of a generalized system, including a controller/processor, a memory, an interface and a display, as can be included in as a control system or controller in implementing control of voltage balancing and current balancing of DC voltage source strings in power generation systems including embodiments of voltage balancing circuits and topologies, as can include or be combined with current balancing circuits and topologies, according to the present invention.

FIG. 10 is a block diagram of a generalized system, including a controller/processor, a memory, an interface and a display, as can be included in as a control system or controller in implementing control of voltage balancing and current balancing of DC voltage source strings in power generation systems including embodiments of voltage balancing circuits and topologies, as can include or be combined with current balancing circuits and topologies, such as in the voltage balancing and current balancing circuits and topologies of FIGS. 4A-9 and FIGS. 11A-13.

Referring now to FIG. 10, there is illustrated a block diagram of a generalized system 1000, including a controller/processor 1052, a memory 1054 a display 1056 and an interface 1058, as can be used for implementing operations and control of voltage balancing circuits and topologies and current balancing circuits and topologies for string voltage balancing converters for power generation electrical systems. It should be understood that the generalized system 1000 can represent, for example, a stand-alone computer, computer terminal, portable computing device, networked computer or computer terminal, networked portable device, programmable logic controller (PLC) or an application specific integrated circuit (ASIC). The generalized system 1000, or portions thereof, can be incorporated in or implemented as components of a control simulator system, or other suitable control system, for operation and control of embodiments of string voltage balancing converters, such as for voltage balancing, as can be combined with current balancing, for DC voltage source strings in electrical power generation systems, such as those described and illustrated herein, for example.

Data, programs, instructions or control operations can be entered into the generalized system 1000 by the user or can be received by the generalized system 1000 via any suitable type of user or other suitable interface 1058, and can be stored in a computer readable memory 1054, which can be any suitable type of computer readable and programmable memory. Calculations or operations, such as in the control and operation of the string voltage balancing converters for power generation electrical systems, such as described herein, are performed by the controller/processor 1052, which can be any suitable type of computer processor, programmable logic controller (PLC) or ASIC, for example. Information and data, such as messages, settings or results of the control operation for voltage and current balancing, for example, can be displayed to the user on a display 1056, which can be any suitable type of computer display or digital display, for example, such as a liquid crystal display (LCD).

The controller/processor 1052 can be associated with, or incorporated into, any suitable type of computing device, for example, a personal computer, a PLC or ASIC. The display 1056, the controller/processor 1052, the memory 1054, and any associated computer readable media are in communication with one another by any suitable type of data bus, as is well known in the art.

Examples of computer readable media include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to the memory 1054, or in place of the memory 1054, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The generalized system 1000 of FIG. 10 can be used as a generalized control simulator system to consider and evaluate various string voltage balancing converters on energy production cost or in relation to dynamic evaluation of string voltage balancing converters, such as when utilized in conjunction with various power generation electrical systems, as used with PV arrays, a series connected DC wind turbine farm or a multilayered wind farm model, for example.

Further, the generalized system 1000 can be used in simulation of operation and control and in operation and control of string voltage balancing converters for power generation electrical systems, such as can implement control of voltage balancing and current balancing in embodiments of string voltage balance converters. An example of the generalized system 1000, such as for a generalized control simulator system, can be a TAMUQ real time simulator, such as can be based on the Opal-RT real time environment, for example, as can implement control the voltages, currents and switch operation in the various embodiments of string voltage balancing converters for power generation electrical systems, such as described herein.

A generalized control simulator system, such as can be implemented by the generalized system 1000 can include a RT Lab processing unit, such as includes a controller/processor and memory to store instructions and programs to implement the string voltage balance converter control. The generalized control simulator system can also include a user console monitor to control the string voltage balancing and current balancing, as can also display the control operations and results of the string voltage balancing converter control, and can include an analog/digital interface to interface with the power generation system components and string voltage balancing converters, as can be associated with an uninterruptible power supply (UPS) unit to provide power for the power generation system and string voltage balancing converter control operation.

Figure 4C:
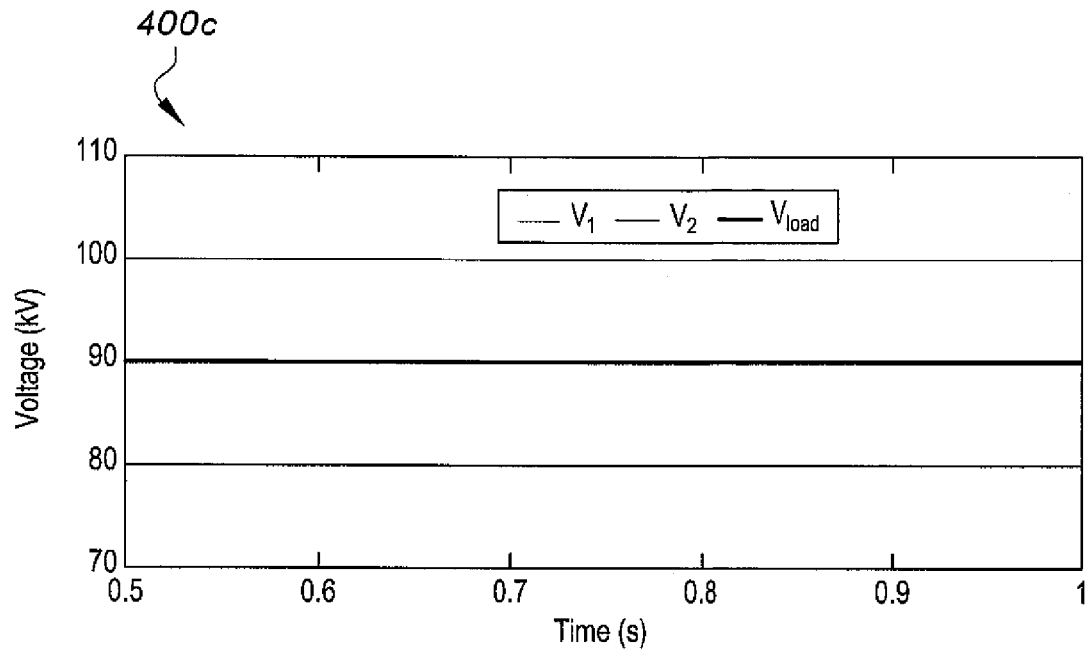
FIG. 4C, FIG. 4D and FIG. 4E illustrate graphs of simulation results respectively comparing voltage, current and capacitor voltage, versus time, for the embodiment of a DC voltage balancing circuit of FIG. 4B according to the present invention.
Figure 4D:
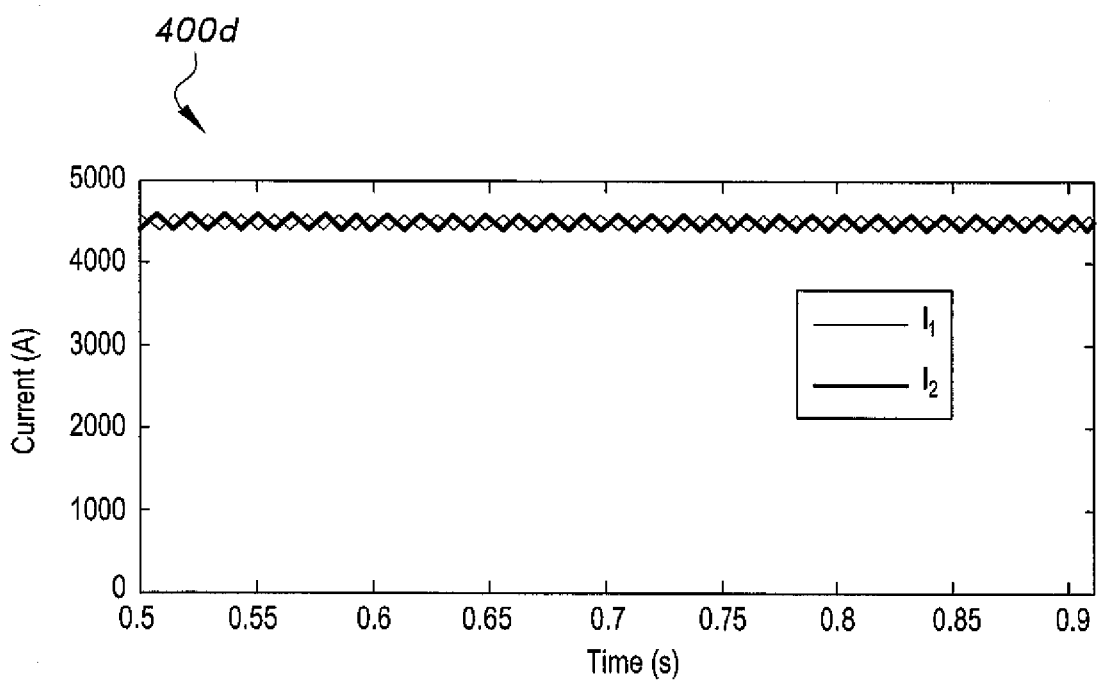
Figure 4E:
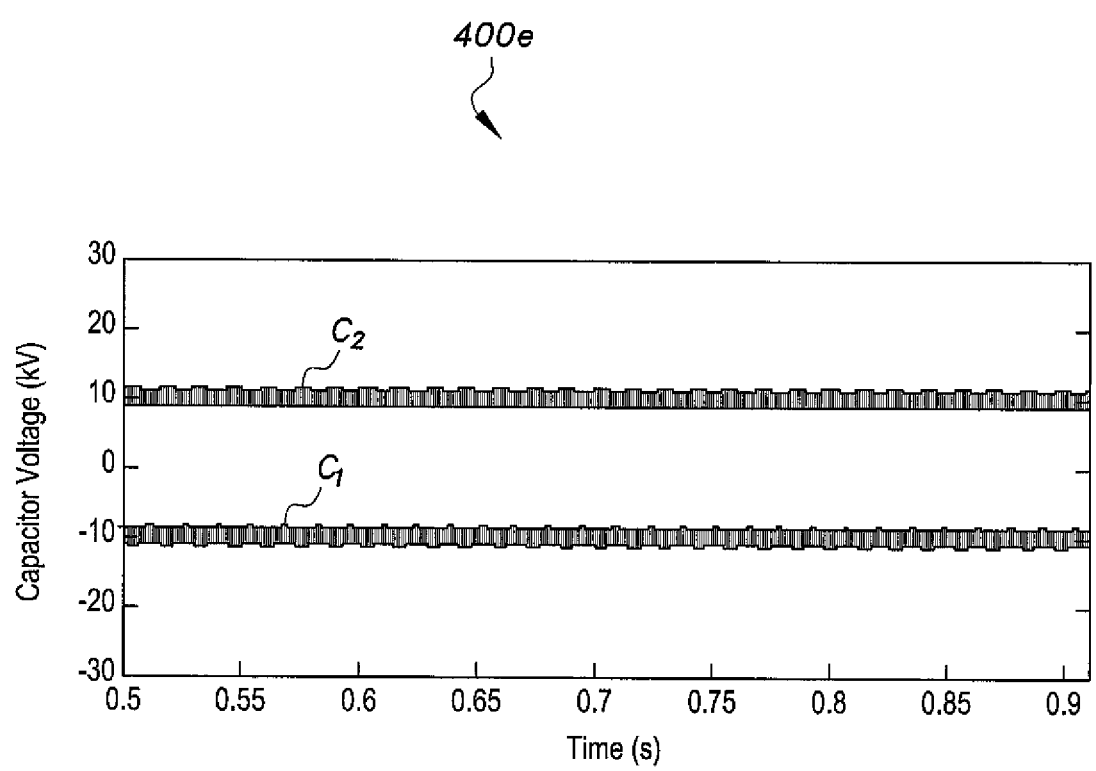

FIG. 4C, FIG. 4D and FIG. 4E illustrate graphs of simulation results respectively comparing voltage, current and capacitor voltage, versus time, for an embodiment of a DC voltage balancing circuit of FIG. 4B. Referring to FIGS. 4C-4E, the simulation results for an embodiment of the voltage balancing circuit 410b in the power generation system 400b of FIG. 4B are presented. In the simulation, for the two DC voltage source strings 402b and 404b, the voltage generated by the first DC voltage source string 402b was 100 kilovolts (kV) and the voltage generated by the second DC voltage source string 404b was 80 kV.

Also, in the simulation, the duty ratio or duty cycle of first switch 422b ($\delta_1$) and the duty ratio or duty cycle of second switch 426b ($\delta_2$) each were equal to 50% of the total duty cycle, such that their duty ratios or duty cycles were equal or substantially equal to one, $\delta_1+\delta_2=1$, in the voltage balancing process, such as by simulation control implemented by a computer processor in Matlab®, as can be implemented by the generalized system 1000 of FIG. 10. The inductance of the inductors 416b, 440b and 442b were each equal to 5 millihenry(ies) (mH) and the capacitance of the capacitors 412b and 414b were each equal to 1 millifarad (mF), a switching frequency of the switches 422b and 426b was 1 kilohertz (kHz) and the load 430b was set to 10 ohms.

FIG. 4C illustrates a graph 400c of simulation results comparing voltage (kV) versus time (seconds (s)). In the graph 400c it can be seen that the voltage generated by the DC voltage source string 402b was 100 kV, the voltage generated by the second DC voltage source string 404b was 80 kV and the load voltage on the load 430b was 90 kV, indicating a voltage balancing for the DC voltage source strings 402b and 404b.

FIG. 4D illustrates a graph 400d of simulation results comparing current (amperes (A)) versus time (s). In the graph 400d, it can be seen that the current $I_1$ for the DC voltage source string 402b and the current $I_2$ for the DC voltage source string 404b, were substantially balanced with respect to each other.

FIG. 4E illustrates a graph 400e of simulation results comparing capacitor voltage (kV) versus time (s). In the graph 400e, it can be seen that the voltage for the capacitor 412b is approximately −10 kV of a negative potential on the higher voltage line side of the 100 kV voltage generated by the DC voltage source string 402b of 100 kV and that the voltage for the capacitor 414b is approximately 10 kV of a positive potential on the lower voltage line side of the 80 kV generated by the DC voltage source string 404b for the DC voltage source string 404b, indicating a voltage balancing for the DC voltage source strings 402b and 404b.

Also, the string voltage balancing circuits 410a and 410b respectively illustrated in FIGS. 4A and 4B can be generalized an extended to any number of a plurality of DC voltage source strings connected in parallel. It has to be noted that the voltage balancing circuits and topologies as illustrated in FIGS. 4A and 4B, and as described herein, can be extended to architectures including n parallel connected DC converters for a corresponding power generation system having a plurality of DC voltage source strings to be balanced, as can depend on the use or application, and should not be construed in a limiting sense.

Figure 5A:
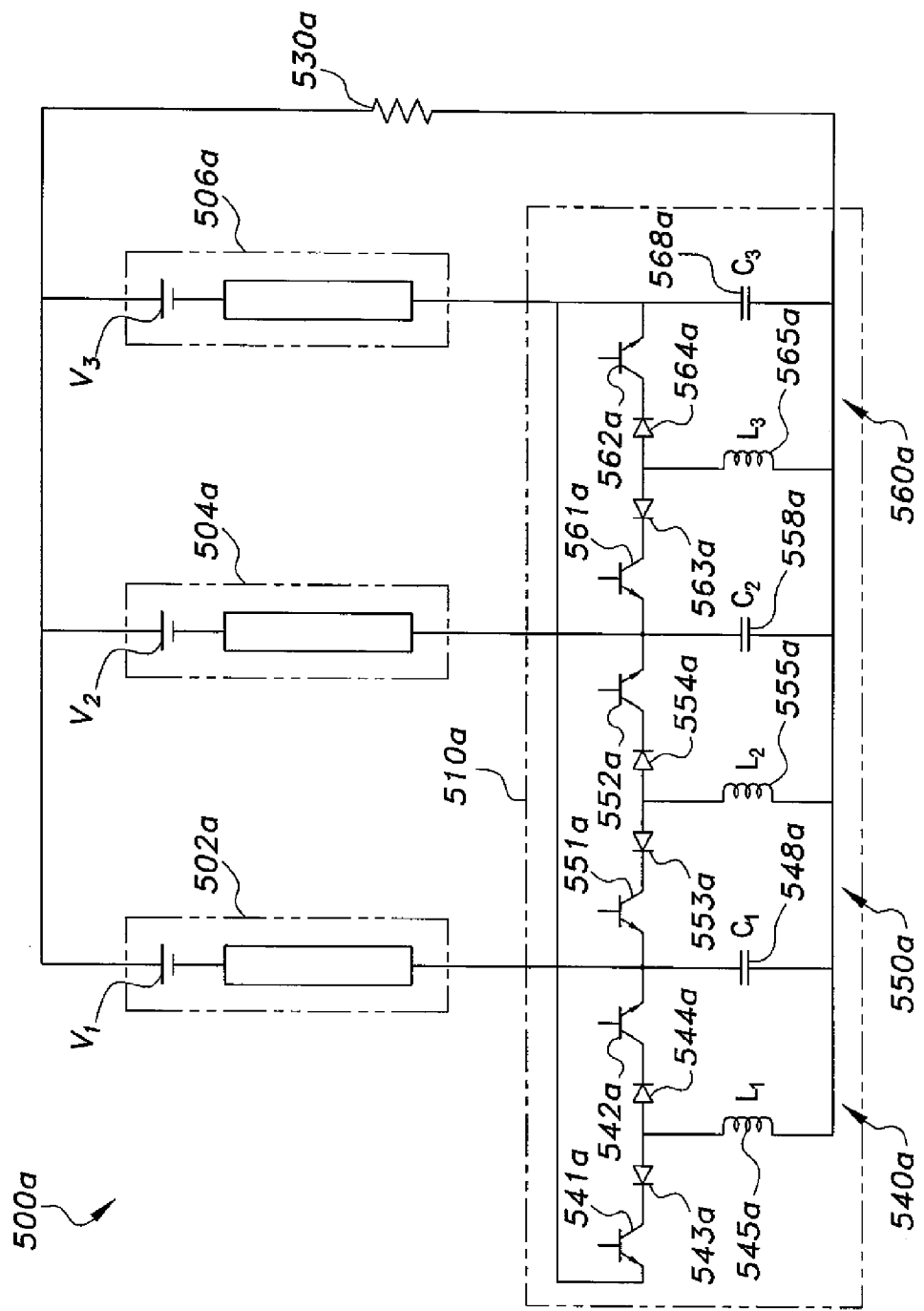
FIG. 5A illustrates a general schematic diagram of an embodiment of power generation system with DC voltage source strings connected in parallel including an embodiment of a DC voltage balancing circuit in a closed ring balancing converter configuration according to the present invention.

FIG. 5A illustrates a general schematic diagram of an embodiment of power generation system with DC voltage source strings connected in parallel including an embodiment of a DC string voltage balancing circuit in a closed ring voltage balancing configuration. FIG. 5A illustrates an embodiment of a power generation system 500a that utilizes a closed ring string voltage balancing circuit 510a. The closed ring string voltage balancing circuit 510a forms a closed loop ring, such as illustrated in FIG. 5A.

The power generation system 500a includes three unbalanced DC voltage source strings 502a, 504a and 506a, such as of PV panels or wind turbines. For example, for purposes of illustration, the DC voltage source string 502a can generate a 100 kV output voltage $V_1$, the DC voltage source string 504a can generate an 80 kV output voltage $V_2$ and the DC voltage source string 506a can generate a 90 kV output voltage $V_3$. As illustrated, the DC voltage sources strings 502a, 504a, and 506a are connected in parallel. The DC voltage source strings 502a, 504a, and 506a are also connected in parallel to a load 530a to which an output voltage is provided.

The closed ring string voltage balancing circuit 510a is connected between the DC voltage source strings 502a, 504a and 506a. Also, the closed ring voltage balancing circuit 510a, in the embodiment of FIG. 5A, includes three string voltage balancing circuits 540a, 550a and 560a, similar to the string voltage balancing circuits 410a and 410b of FIGS. 4A and 4B, forming the closed loop string voltage balancing circuit 510a.

The first string voltage balancing circuit 540a balances the voltages generated by the DC voltage source strings 502a and 506a, the second string voltage balancing circuit 550a balances the voltages generated by the DC voltage source strings 502a and 504a and the third string voltage balancing circuit 560a balances the voltages generated by the DC voltage source strings 504a and 506a, similar to the string voltage balancing circuits 410a and 410b of FIGS. 4A and 4B. The closed ring string voltage balancing circuit 510a can therefore be considered as an extension of the string voltage balancing circuits 410a and 410b of FIGS. 4A and 4B. Also, an embodiment of the closed loop string voltage balancing circuit 510a forms the closed loop to include six switches, such as six transistors, as can include various types of transistors, for example. As is illustrated in FIG. 5A, a string voltage balancing circuit is inserted between any two of the three DC voltage sources strings 502a, 504a, and 506a.

As described, the first string voltage balancing circuit 540a is connected between the DC voltage source strings 502a and 506a to balance the voltages generated by the DC voltage source strings 502a and 506a. The first string voltage balancing circuit 540a includes two reverse blocking switches (e.g., valves) 541a and 542a, an inductor 545a ($L_1$), and two capacitors 548a ($C_1$) and 568a ($C_3$). The inductor 545a ($L_1$) is connected between the switches 541a and 542a, and the switches 541a and 542a divide the inductor 545a ($L_1$) current between the two lines, such as according to their operating operation point, for example. In some embodiments, the switches 541a and 542a have reverse blocking capability or, as illustrated, can be connected to series diodes 543a and 544a configured to block reverse current to provide a reverse blocking capability, for example.

As also described, the second string voltage balancing circuit 550a is connected between the DC voltage source strings 502a and 504a to balance the voltages generated by the DC voltage source strings 502a and 504a. The second string voltage balancing circuit 550a includes two reverse blocking switches (e.g., valves) 551a and 552a, an inductor 555a ($L_2$), and two capacitors 548a ($C_1$) and 558a ($C_2$). The inductor 555a ($L_2$) is connected between the switches 551a and 552a, and the switches 551a and 552a divide the inductor 555a ($L_2$) current between the two lines, such as according to their operating operation point, for example. In some embodiments, the switches 551a and 552a have reverse blocking capability or, as illustrated, can be connected to series diodes 553a and 554a configured to block reverse current to provide a reverse blocking capability, for example.

Also, as described, the third string voltage balancing circuit 560a is connected between the DC voltage source strings 504a and 506a to balance the voltages generated by the DC voltage source strings 504a and 506a. The third string voltage balancing circuit 560a includes two reverse blocking switches (e.g., valves) 561a and 562a, an inductor 565a ($L_3$), and two capacitors 558a ($C_2$) and 568a ($C_3$). The inductor 565a ($L_3$) is connected between the switches 561a and 562a, and the switches 561a and 562a divide the inductor 565a ($L_3$) current between the two lines, such as according to their operating operation point, for example. In some embodiments, the switches 561a and 562a have reverse blocking capability or, as illustrated, can be connected to series diodes 563a and 564a configured to block reverse current to provide a reverse blocking capability, for example.

In the string voltage balancing circuits 540a, 550a and 560a, the switches 541a and 542a, the switches 551a and 552a and the switches 561a and 562a can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

Figure 5B:
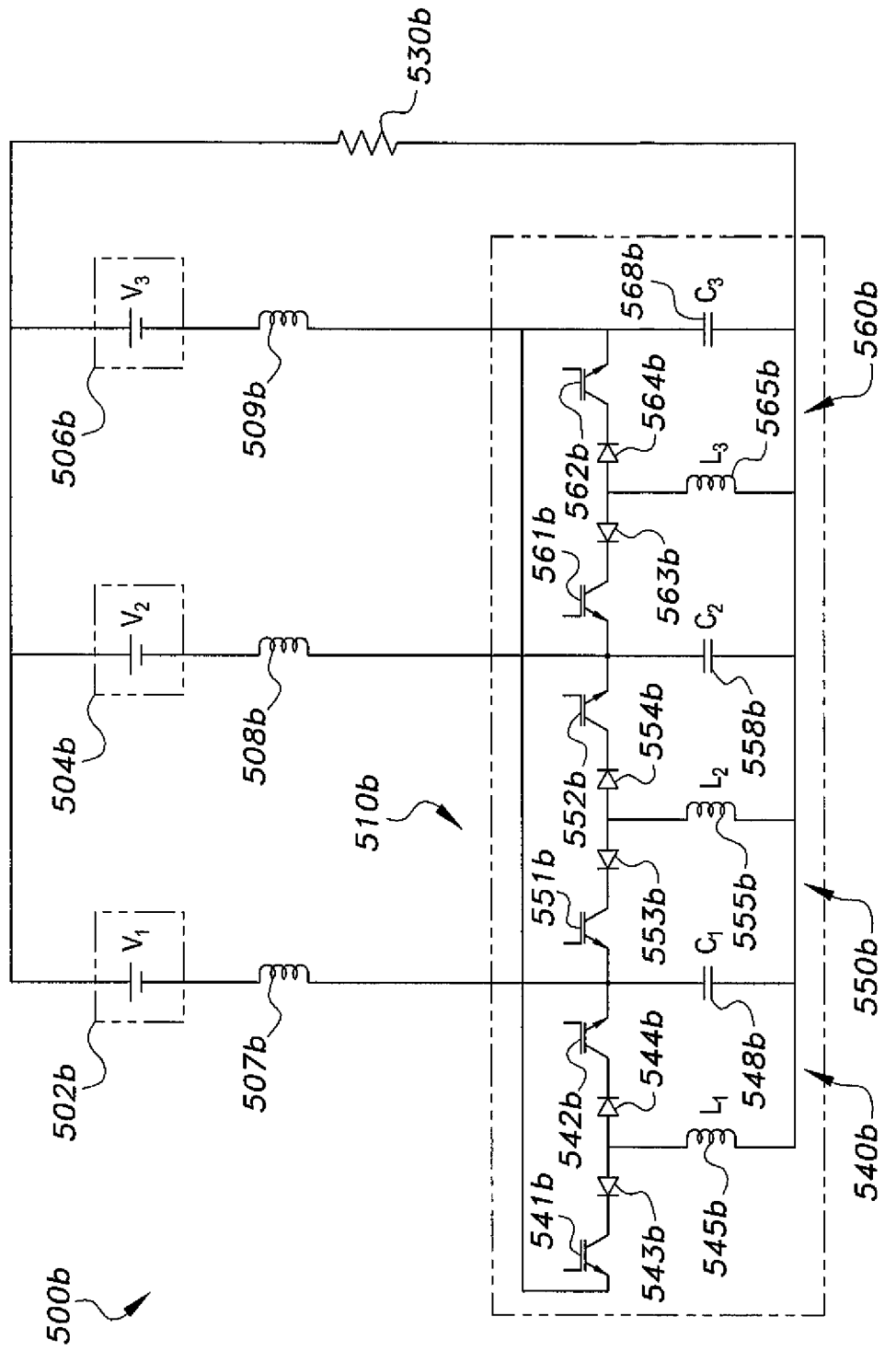
FIG. 5B illustrates a general schematic diagram of an embodiment of power generation system with DC voltage source strings connected in parallel including an embodiment of a DC voltage balancing circuit in a closed ring balancing converter configuration according to the present invention.

FIG. 5B illustrates a general schematic diagram of an embodiment of power generation system with DC voltage source strings connected in parallel including an embodiment of a DC string voltage balancing circuit in a closed ring voltage balancing configuration, similar to the power generation system 500a and the closed loop string voltage balancing circuit 510a. FIG. 5B illustrates an embodiment of a power generation system 500b that utilizes a closed ring string voltage balancing circuit 510b. The closed ring string voltage balancing circuit 510b forms a closed loop ring, such as illustrated in FIG. 5B.

The power generation system 500b includes three unbalanced DC voltage source strings 502b, 504b and 506b, such as of PV panels or wind turbines. For example, for purposes of illustration, the DC voltage source string 502b can generate a 100 kV output voltage $V_1$, the DC voltage source string 504b can generate an 80 kV output voltage $V_2$ and the DC voltage source string 506b can generate a 90 kV output voltage $V_3$. As illustrated, the DC voltage sources strings 502b, 504b, and 506b are connected in parallel. The DC voltage source strings 502b, 504b, and 506b are also connected in parallel to a load 530b to which an output voltage is provided.

The closed ring string voltage balancing circuit 510b is connected between the DC voltage source strings 502b, 504b and 506b. Also, the closed ring voltage balancing circuit 510b, in the embodiment of FIG. 5B, similar to the closed ring string voltage balancing circuit 510a, includes three string voltage balancing circuits 540b, 550b and 560b, which are also similar to the string voltage balancing circuits 410a and 410b of FIGS. 4A and 4B, forming the closed loop string voltage balancing circuit 510b.

The first string voltage balancing circuit 540b balances the voltages generated by the DC voltage source strings 502b and 506b, the second string voltage balancing circuit 550b balances the voltages generated by the DC voltage source strings 502b and 504b and the third string voltage balancing circuit 560b balances the voltages generated by the DC voltage source strings 504b and 506b, similar to the string voltage balancing circuits 410a and 410b of FIGS. 4A and 4B. The closed ring string voltage balancing circuit 510b can likewise be considered as an extension of the string voltage balancing circuits 410a and 410b of FIGS. 4A and 4B. Also, an embodiment of the closed loop string voltage balancing circuit 510b forms the closed loop to include six switches, such as six transistors, as can include various types of transistors, for example. As is illustrated in FIG. 5B, a string voltage balancing circuit is inserted between any two of the three DC voltage sources strings 502b, 504b, and 506b.

As described, the first string voltage balancing circuit 540b is connected between the DC voltage source strings 502b and 506b to balance the voltages generated by the DC voltage source strings 502b and 506b. The first string voltage balancing circuit 540b includes two IGBT type semiconductor switches as can be reverse blocking switches (e.g., valves) 541b and 542b (e.g., valves). Use of IGBT type switches for the switches 541b and 542b can allow for relatively higher switching frequencies and can reduce harmonic content, for example.

The first string voltage balancing circuit 540b also includes an inductor 545b ($L_1$), and two capacitors 548b ($C_1$) and 568b ($C_3$). The inductor 545b ($L_1$) is connected between the switches 541b and 542b, and the switches 541b and 542b divide the inductor 545b ($L_1$) current between the two lines, such as according to their operating operation point, for example. In some embodiments, the switches 541b and 542b have reverse blocking capability or, as illustrated, can be connected to series diodes 543b and 544b configured to block reverse current to provide a reverse blocking capability, for example.

As also described, the second string voltage balancing circuit 550b is connected between the DC voltage source strings 502b and 504b to balance the voltages generated by the DC voltage source strings 502b and 504b. The second string voltage balancing circuit 550b includes two IGBT type semiconductor switches as can be reverse blocking switches (e.g., valves) 551b and 552b (e.g., valves). Use of IGBT type switches for the switches 551b and 552b can allow for relatively higher switching frequencies and can reduce harmonic content, for example.

The second string voltage balancing circuit 550b also includes an inductor 555b ($L_2$), and two capacitors 548 ($C_1$) and 558 ($C_2$). The inductor 555b ($L_2$) is connected between the switches 551b and 552b, and the switches 551b and 552b divide the inductor 555b ($L_2$) current between the two lines, such as according to their operating operation point, for example. In some embodiments, the switches 551b and 552b have reverse blocking capability or, as illustrated, can be connected to series diodes 553b and 554b configured to block reverse current to provide a reverse blocking capability, for example.

Also, as described, the third string voltage balancing circuit 560b is connected between the DC voltage source strings 504b and 506b to balance the voltages generated by the DC voltage source strings 504b and 506b. The third string voltage balancing circuit 560b includes two IGBT type semiconductor switches as can be reverse blocking switches (e.g., valves) 561b and 562b (e.g., valves). Use of IGBT type switches for the switches 561b and 562b can allow for relatively higher switching frequencies and can reduce harmonic content, for example.

The third string voltage balancing circuit 560b also includes an inductor 565b ($L_3$), and two capacitors 558b ($C_2$) and 568b ($C_3$). The inductor 565b ($L_3$) is connected between the switches 561b and 562b, and the switches 561b and 562b divide the inductor 565b ($L_3$) current between the two lines, such as according to their operating operation point, for example. In some embodiments, the switches 561b and 562b have reverse blocking capability or, as illustrated, can be connected to series diodes 563b and 564b configured to block reverse current to provide a reverse blocking capability, for example.

In the string voltage balancing circuits 540b, 550b and 560, the switches 541b and 542b, the switches 551b and 552b and the switches 561b and 562b, in addition to being IGBT type semiconductor switches, can also include any of various suitable switches, such as metal-oxide semiconductor field effect transistor (MOSFET) switches, various types of transistor-type switches, or any another suitable components, as can depend on the use or application, and should not be construed in a limiting sense.

Also, as illustrated in FIG. 5B, the power generation system 500b also includes an inductor 507b in series with the capacitor 548b and the DC voltage source string 502b, an inductor 508b in series with the capacitor 558b and the DC voltage source string 504b and an inductor 509b in series with the capacitor 568b and the DC voltage source string 506b. The inductors 507b, 508b, and 509b can act as a filter, such as to minimize or reducing a ripple current, for example, in the power generation system 500b.

The duty ratios or duty cycles, $\delta_1$-$\delta_6$, of the corresponding switches 541a, 542a, 551a, 552a, 561a and 562a in the closed loop string voltage balancing circuit 510a and of the corresponding switches 541b, 542b, 551b, 552b, 561b and 562b in the closed loop string voltage balancing circuit 510b are controlled to get the desired output DC voltage across the load terminals, such as the loads 530a and 530b of the power generation system. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense. The voltage unbalance in the lines can be translated into a negative potential on a corresponding capacitor, a positive potential on a corresponding capacitor or a zero potential on a corresponding capacitor to provide the voltage balancing, for example.

The closed loop string voltage balancing circuits 510a and 510b respectively illustrated in FIGS. 5A and 5B can be generalized an extended to any number of a plurality of DC voltage source strings connected in parallel. It is noted that the voltage balancing circuits and topologies as illustrated in FIGS. 5A and 5B, and as described herein, can be extended to architectures including n parallel connected DC converters for a corresponding power generation system having a plurality of DC voltage source strings to be balanced, as can depend on the use or application, and should not be construed in a limiting sense.

Figure 6A:
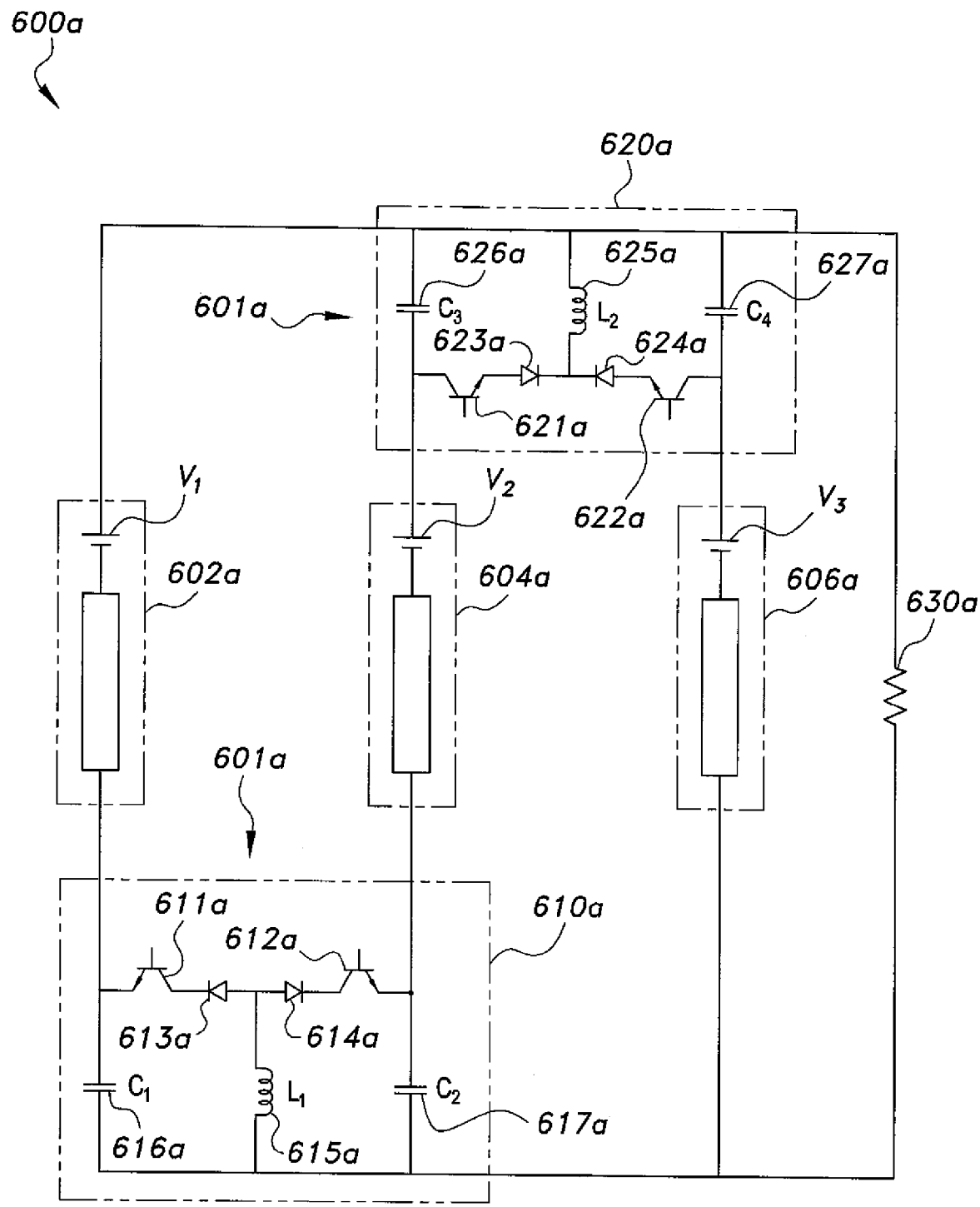
FIG. 6A illustrates a general schematic diagram of an embodiment of power generation system with DC voltage source strings connected in parallel including an embodiment of a DC voltage balancing circuit in a complementary terminal balancing converter configuration according to the present invention.

FIG. 6A illustrates a general schematic diagram of an embodiment of power generation system with DC voltage source strings connected in parallel including an embodiment of a DC voltage balancing circuit in a complementary terminal balancing converter configuration. FIG. 6A illustrates an embodiment of a power generation system 600a that utilizes a complimentary string voltage balancing circuit 601a. The complimentary string voltage balancing circuit 601a includes two string voltage balancing circuits 610a and 620a that together form the complimentary string voltage balancing circuit 601a, such as illustrated in FIG. 6A.

The power generation system 600a includes three unbalanced DC voltage source strings 602a, 604a and 606a, such as of PV panels or wind turbines. As illustrated, the DC voltage sources strings 602a, 604a, and 606a are connected in parallel. The DC voltage source strings 602a, 604a, and 606a are also connected in parallel to a load 630a to which an output voltage is provided.

The first and second string voltage balancing circuits 610a and 620a of the complimentary string voltage balancing circuit 601a are respectively connected between the DC voltage source strings 602a, 604a and 606a. Also, the first and second string voltage balancing circuits 610a and 620a of the complimentary string voltage balancing circuit 601a are each similar to the string voltage balancing circuits 410a and 410b of FIGS. 4A and 4B, forming the complimentary string voltage balancing circuit 601a.

The first string voltage balancing circuit 610a balances the voltages generated by the DC voltage source strings 602a and 604a, and the second string voltage balancing circuit 620a balances the voltages generated by the DC voltage source strings 604a and 606a, similar to the string voltage balancing circuits 410a and 410b of FIGS. 4A and 4B. The complimentary string voltage balancing circuit 601a can therefore be considered as an extension of the string voltage balancing circuits 410a and 410b of FIGS. 4A and 4B.

As described, the first string voltage balancing circuit 610a is connected between the DC voltage source strings 602a and 604a to balance the voltages generated by the DC voltage source strings 602a and 604a. The first string voltage balancing circuit 610a includes two reverse blocking switches (e.g., valves) 611a and 612a, an inductor 615a ($L_1$), and two capacitors 616a ($C_1$) and 617a ($C_2$). The inductor 615a ($L_1$) is connected between the switches 611a and 612a, and the switches 611a and 612a divide the inductor 615a ($L_1$) current between the two lines, such as according to their operating operation point, for example. In some embodiments, the switches 611a and 612a have reverse blocking capability or, as illustrated, can be connected to series diodes 613a and 614a configured to block reverse current to provide a reverse blocking capability, for example.

As also described, the second string voltage balancing circuit 620a is connected between the DC voltage source strings 604a and 606a to balance the voltages generated by the DC voltage source strings 604a and 606a. The second string voltage balancing circuit 620a includes two reverse blocking switches (e.g., valves) 621a and 622a, an inductor 625a ($L_2$), and two capacitors 626a ($C_3$) and 627a ($C_4$). The inductor 625a ($L_2$) is connected between the switches 621a and 622a, and the switches 621a and 622a divide the inductor 625a ($L_2$) current between the two lines, such as according to their operating operation point, for example. In some embodiments, the switches 621a and 622a have reverse blocking capability or, as illustrated, can be connected to series diodes 623a and 624a configured to block reverse current to provide a reverse blocking capability, for example.

In the first and second string voltage balancing circuits 610a and 620a, the switches 611a and 612a and the switches 621a and 622a can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

As is illustrated in the power generation system 600a, the first string voltage balancing circuit 610a is connected between the DC voltage source strings 602a and 604a, and the second string voltage balancing circuit 620a is connected between the DC voltage source strings 604a and 606a, with the capacitance of the middle line, i.e., the DC voltage source string 604a, being split between the capacitor 617a ($C_2$) of the first string voltage balancing circuit 610a and the capacitor 626a ($C_3$) of the second string voltage balancing circuit 620a, for example. The complimentary string voltage balancing circuit 601a including the first and second string voltage balancing circuits 610a and 620a can minimize the number of components for voltage balancing compared to the closed ring string voltage balancing circuit 510a illustrated in FIG. 5A, for example.

For example, for purposes of illustration, the DC voltage source string 602a can generate a 100 kV output voltage $V_1$, the DC voltage source string 604a can generate an 80 kV output voltage $V_2$ and the DC voltage source string 606a can generate a 90 kV output voltage $V_3$. Therefore, the first and second string voltage balancing circuits 610a and 620a of the complimentary string voltage balancing circuit 601a can balance or substantially balance the DC voltage source strings 602a, 604a and 606a output voltage at 90 kV, for example.

In such case, the voltage across the capacitor 616a ($C_1$) is −10 kV, the voltage across the capacitor and 617a ($C_2$) is 10 kV, the voltage across the capacitor 626a ($C_3$) is 0 kV and the voltage across the capacitor and 627a ($C_4$) is 0 kV, for example. A possible drawback of the complimentary string voltage balancing circuit 601a including the first and second string voltage balancing circuits 610a and 620a illustrated in FIG. 6A is that the first and second string voltage balancing circuits 610a and 620a are respectively located at opposite ends of the DC voltage source strings 602a, 604a and 606a, for example.

Figure 6B:
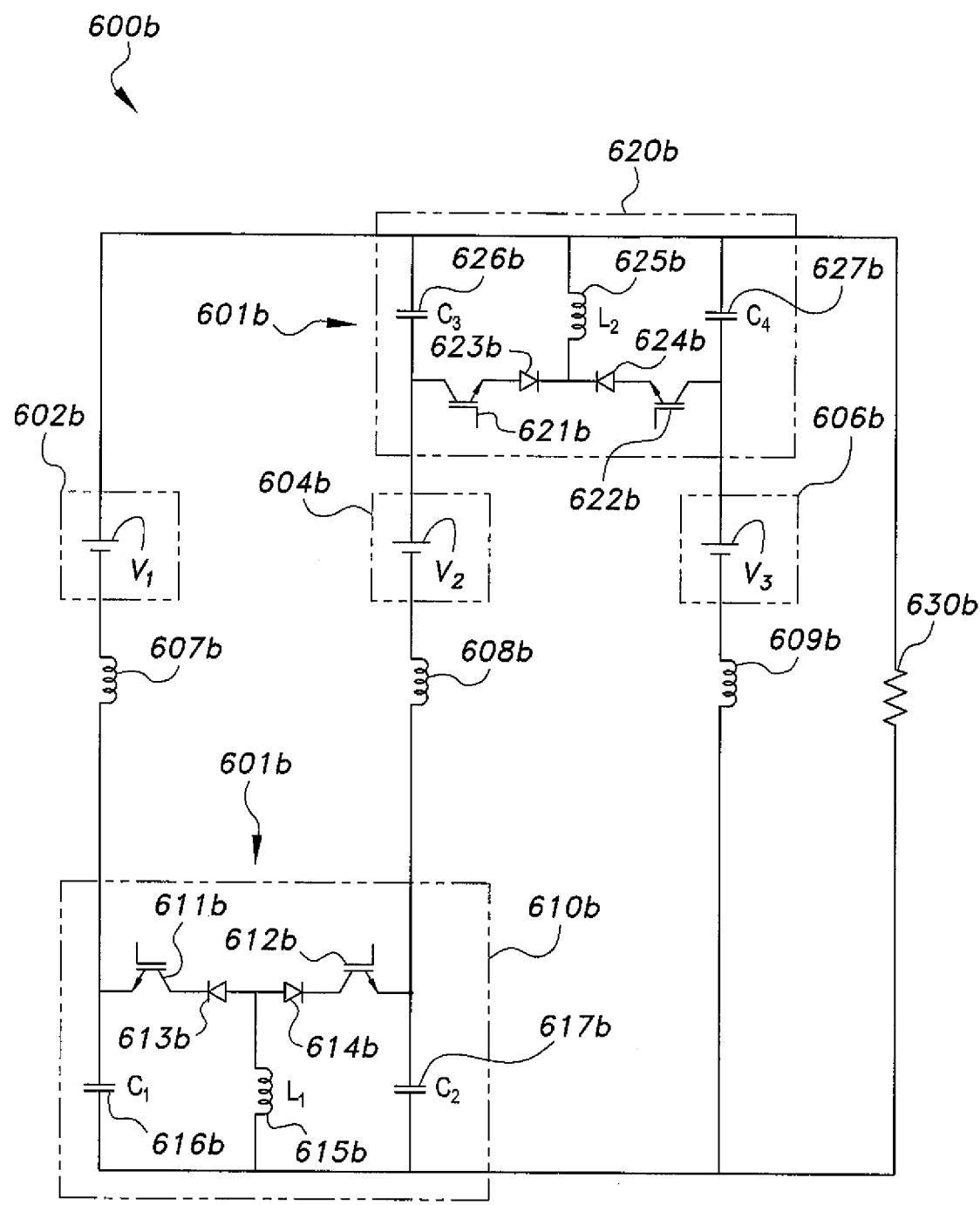
FIG. 6B illustrates a general schematic diagram of an embodiment of power generation system with DC voltage source strings connected in parallel including an embodiment of a DC voltage balancing circuit in a complementary terminal balancing converter configuration according to the present invention.

FIG. 6B illustrates a general schematic diagram of an embodiment of power generation system with DC voltage source strings connected in parallel including an embodiment of a DC voltage balancing circuit in a complementary terminal balancing converter configuration. FIG. 6B illustrates an embodiment of a power generation system 600b that utilizes a complimentary string voltage balancing circuit 601b, similar to the complimentary string voltage balancing circuit 601a of FIG. 6A. The complimentary string voltage balancing circuit 601b includes two string voltage balancing circuits 610b and 620b that together form the complimentary string voltage balancing circuit 601b, such as illustrated in FIG. 6B.

The power generation system 600b includes three unbalanced DC voltage source strings 602b, 604b and 606b, such as of PV panels or wind turbines. As illustrated, the DC voltage sources strings 602b, 604b, and 606b are connected in parallel. The DC voltage source strings 602b, 604b, and 606b are also connected in parallel to a load 630b to which an output voltage is provided.

The first and second string voltage balancing circuits 610b and 620b of the complimentary string voltage balancing circuit 601b are respectively connected between the DC voltage source strings 602b, 604b and 606b. Also, the first and second string voltage balancing circuits 610b and 620b of the complimentary string voltage balancing circuit 601b are each similar to the string voltage balancing circuits 410a and 410b of FIGS. 4A and 4B, forming the complimentary string voltage balancing circuit 601b.

The first string voltage balancing circuit 610b balances the voltages generated by the DC voltage source strings 602b and 604b, and the second string voltage balancing circuit 620b balances the voltages generated by the DC voltage source strings 604b and 606b, similar to the string voltage balancing circuits 410a and 410b of FIGS. 4A and 4B. The complimentary string voltage balancing circuit 601b can therefore be considered as an extension of the string voltage balancing circuits 410a and 410b of FIGS. 4A and 4B.

As described, the first string voltage balancing circuit 610b is connected between the DC voltage source strings 602b and 604b to balance the voltages generated by the DC voltage source strings 602b and 604b. The first string voltage balancing circuit 610b includes two IGBT type semiconductor switches as can be reverse blocking switches (e.g., valves) 611b and 612b. Use of IGBT type switches for the switches 611b and 612b can allow for relatively higher switching frequencies and can reduce harmonic content, for example.

The first string voltage balancing circuit 610b includes an inductor 615b ($L_1$), and two capacitors 616b ($C_1$) and 617b ($C_2$). The inductor 615b ($L_1$) is connected between the switches 611b and 612b, and the switches 611b and 612b divide the inductor 615b ($L_1$) current between the two lines, such as according to their operating operation point, for example. In some embodiments, the switches 611b and 612b have reverse blocking capability or, as illustrated, can be connected to series diodes 613b and 614b configured to block reverse current to provide a reverse blocking capability, for example.

As also described, the second string voltage balancing circuit 620b is connected between the DC voltage source strings 604b and 606b to balance the voltages generated by the DC voltage source strings 604b and 606b. The second string voltage balancing circuit 620b includes two IGBT type semiconductor switches as can be reverse blocking switches (e.g., valves) 621b and 622b. Use of IGBT type switches for the switches 621b and 622b can allow for relatively higher switching frequencies and can reduce harmonic content, for example.

The second string voltage balancing circuit 620b also includes an inductor 625b ($L_2$), and two capacitors 626b ($C_3$) and 627b ($C_4$). The inductor 625b ($L_2$) is connected between the switches 621b and 622b, and the switches 621b and 622b divide the inductor 625b ($L_2$) current between the two lines, such as according to their operating operation point, for example. In some embodiments, the switches 621b and 622b have reverse blocking capability or, as illustrated, can be connected to series diodes 623b and 624b configured to block reverse current to provide a reverse blocking capability, for example.

In the first and second string voltage balancing circuits 610b and 620b, the switches 611b and 612b and the switches 621b and 622b, in addition to being IGBT type semiconductor switches, can also include any of various suitable switches, such as metal-oxide semiconductor field effect transistor (MOSFET) switches, various types of transistor-type switches, or any another suitable components, as can depend on the use or application, and should not be construed in a limiting sense.

Also, as illustrated in FIG. 6B, the power generation system 600b also includes an inductor 607b in series with the capacitor 616b and the DC voltage source string 602b, an inductor 608b in series with the capacitor 617b and the DC voltage source string 604b and an inductor 609b in series with the capacitor 627b and the DC voltage source string 606b. The inductors 607b, 608b, and 609b can act as a filter, such as to minimize or reducing a ripple current, for example, in the power generation system 600b.

As is illustrated in the power generation system 600b, the first string voltage balancing circuit 610b is connected between the DC voltage source strings 602b and 604b, and the second string voltage balancing circuit 620b is connected between the DC voltage source strings 604b and 606b, with the capacitance of the middle line, i.e., the DC voltage source string 604b, being split between the capacitor 617b ($C_2$) of the first string voltage balancing circuit 610b and the capacitor 626b ($C_3$) of the second string voltage balancing circuit 620b, for example. The complimentary string voltage balancing circuit 601b including the first and second string voltage balancing circuits 610b and 620b can minimize the number of components for voltage balancing compared to the closed ring string voltage balancing circuit 510b illustrated in FIG. 5B, for example.

For example, for purposes of illustration, the DC voltage source string 602b can generate a 100 kV output voltage $V_1$, the DC voltage source string 604b can generate an 80 kV output voltage $V_2$ and the DC voltage source string 606b can generate a 90 kV output voltage $V_3$. Therefore, the first and second string voltage balancing circuits 610b and 620b of the complementary string voltage balancing circuit 601b can balance or substantially balance the DC voltage source strings 602b, 604b and 606b output voltage at 90 kV, for example.

In such case, the voltage across the capacitor 616b ($C_1$) is −10 kV, the voltage across the capacitor and 617b ($C_2$) is 10 kV, the voltage across the capacitor 626b ($C_3$) is 0 kV and the voltage across the capacitor and 627b ($C_4$) is 0 kV, for example. A possible drawback of the complimentary string voltage balancing circuit 601b including the first and second string voltage balancing circuits 610b and 620b illustrated in FIG. 6B is that the first and second string voltage balancing circuits 610b and 620b are respectively located at opposite ends of the DC voltage source strings 602b, 604b and 606b, for example.

The duty ratios or duty cycles, $\delta_1$-$\delta_4$, of the corresponding switches 611a, 612a, 621a and 622a in the complementary string voltage balancing circuit 601a and of the corresponding switches 611b, 612b, 621b and 622b in the complementary string voltage balancing circuit 601b are controlled to get the desired output DC voltage across the load terminals, such as the loads 630a and 630b of the power generation system. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense. The voltage unbalance in the lines can be translated into a negative potential on a corresponding capacitor, a positive potential on a corresponding capacitor or a zero potential on a corresponding capacitor to provide the voltage balancing, for example.

The complementary string voltage balancing circuits 601a and 601b respectively illustrated in FIGS. 6A and 6B can be generalized an extended to any number of a plurality of DC voltage source strings connected in parallel. It is noted that the voltage balancing circuits and topologies as illustrated in FIGS. 6A and 6B, and as described herein, can be extended to architectures including n parallel connected DC converters for a corresponding power generation system having a plurality of DC voltage source strings to be balanced, as can depend on the use or application, and should not be construed in a limiting sense.

Figure 7A:
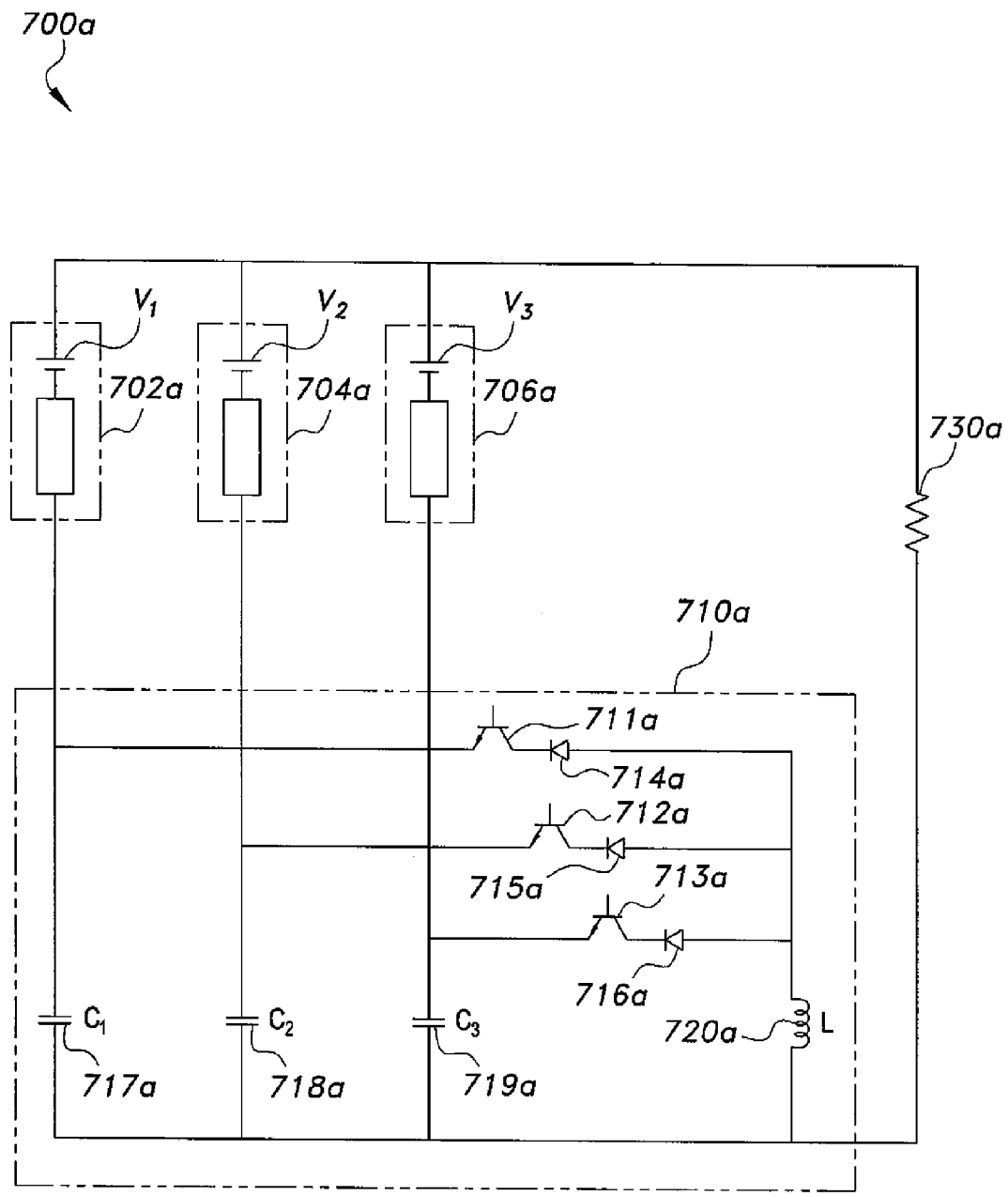
FIG. 7A illustrates a general schematic diagram of an embodiment of power generation system with DC voltage source strings connected in parallel including an embodiment of a DC voltage balancing circuit in a single star balancing converter configuration according to the present invention.

FIG. 7A illustrates a general schematic diagram of an embodiment of power generation system with DC voltage source strings connected in parallel including an embodiment of a DC voltage balancing circuit in a single star balancing converter configuration. FIG. 7A illustrates an embodiment of a power generation system 700a that utilizes a single star string voltage balancing circuit 710a.

The power generation system 700a includes three unbalanced DC voltage source strings 702a, 704a and 706a, such as of PV panels or wind turbines. As illustrated, the DC voltage sources strings 702a, 704a, and 706a are connected in parallel. The DC voltage source strings 702a, 704a, and 706a are also connected in parallel to a load 730a to which an output voltage is provided.

The single star string voltage balancing circuit 710a is respectively connected to the DC voltage source strings 702a, 704a and 706a. Also, the single star string voltage balancing circuit 710a is similar in operation to the string voltage balancing circuits 410a and 410b of FIGS. 4A and 4B, for example. The single star string voltage balancing circuit 710a can therefore be considered as an extension of the string voltage balancing circuits 410a and 410b of FIGS. 4A and 4B.

The single star string voltage balancing circuit 710a is respectively connected to the DC voltage source strings 702a, 704a and 706a to balance the voltages generated by the DC voltage source strings 702a, 704a and 706a. The single star string voltage balancing circuit 710a is respectively connected between the DC voltage sources strings 702a, 704a, and 706a and includes one inductor 720a (L) and three switches forming a star configuration. Also, the single star string voltage balancing circuit 710a can overcome limitations of a relatively large number of components and physical location differences of circuit topology location associated with the closed loop string voltage balancing circuits 510a and 510b and the complementary string voltage balancing circuits 601a and 601b, such as illustrated in FIGS. 5A, 5B, 6A and 6B, respectively, for example.

The single star string voltage balancing circuit 710a includes three reverse blocking switches (e.g., valves) 711a, 712a and 713a and includes the inductor 720a (L) respectively connected to each of the switches 711a, 712a and 713a. The inductor 720a (L) can act to filter out ripples in the individual string currents respectively controlled by the switches 711a, 712a and 713a flowing in the corresponding DC voltage source strings 702a, 704a and 706a.

The single star string voltage balancing circuit 710a also includes three capacitors 717a ($C_1$), 718a ($C_2$) and 719a ($C_3$). The capacitor 717a ($C_1$) is connected to the switch 711a and is associated with the first DC voltage source string 702a to balance the voltage generated by the first DC voltage source string 702a. The capacitor 718a ($C_2$) is connected to the switch 712a and is associated with the second DC voltage source string 704a to balance the voltage generated by the second DC voltage source string 704a. The capacitor 719a ($C_3$) is connected to the switch 713a and is associated with the third DC voltage source string 706a to balance the voltage generated by the third DC voltage source string 706a. In some embodiments, the switches 711a, 712a and 713a have reverse blocking capability or, as illustrated, can be connected to series diodes 714a, 715a and 716a configured to block reverse current to provide a reverse blocking capability, for example.

In the single star string voltage balancing circuit 710a, the switches 711a, 712a and 713a can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

For example, for purposes of illustration, the first DC voltage source string 702a can generate a 100 kV output voltage $V_1$, the second DC voltage source string 704a can generate an 80 kV output voltage $V_2$ and the third DC voltage source string 706a can generate a 90 kV output voltage $V_3$, Therefore, the single star string voltage balancing circuit 710a can balance or substantially balance the DC voltage source strings 702a, 704a and 706a output voltage at 90 kV, for example. In such case, the voltage across the capacitor 717a ($C_1$) is −10 kV, the voltage across the capacitor and 718a ($C_2$) is 10 kV, the voltage across the capacitor 719a ($C_3$) is 0 kV, for example.

Figure 7B:
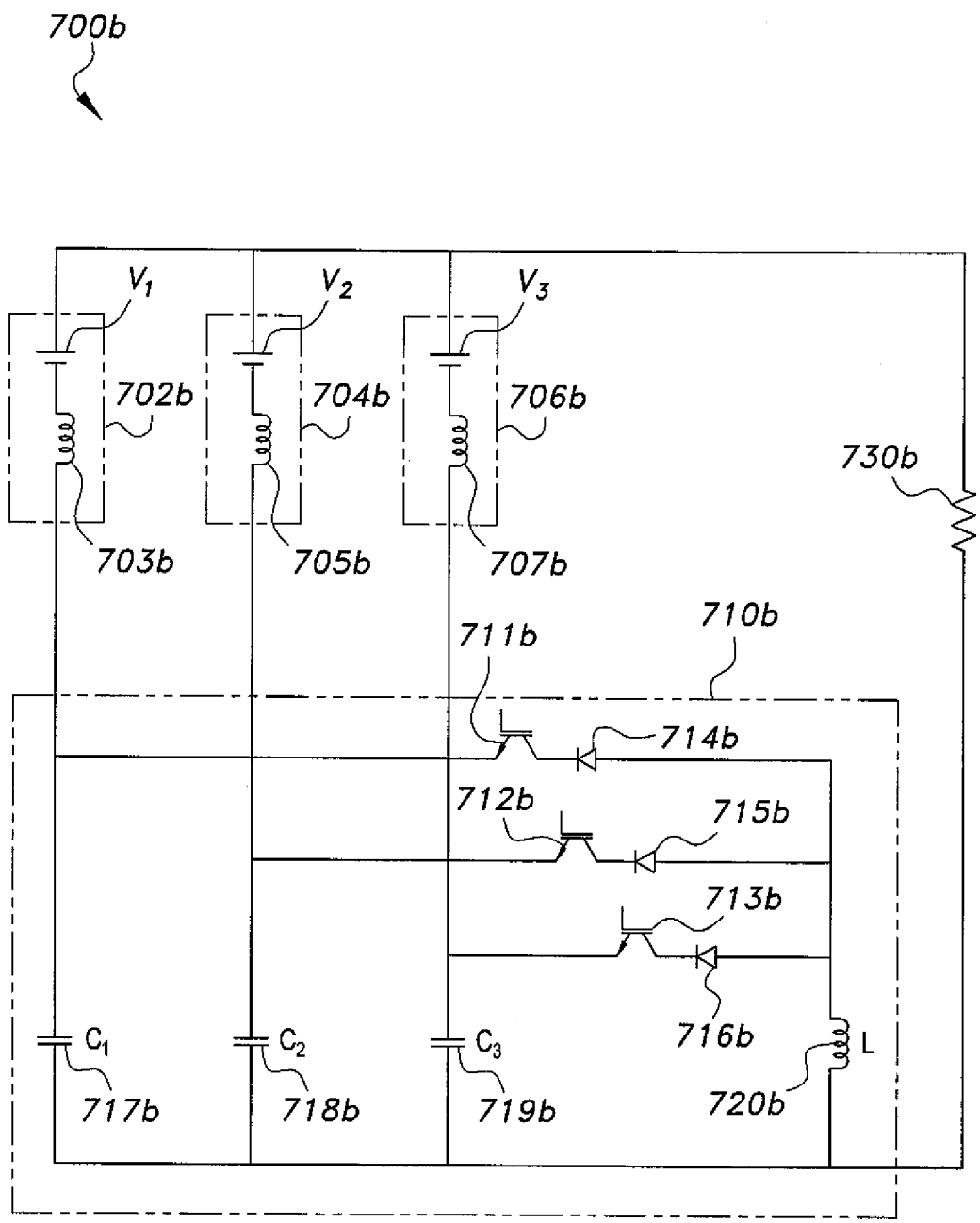
FIG. 7B illustrates a general schematic diagram of an embodiment of power generation system with DC voltage source strings connected in parallel including an embodiment of a DC voltage balancing circuit in a single star balancing converter configuration according to the present invention.

FIG. 7B illustrates a general schematic diagram of an embodiment of power generation system with DC voltage source strings connected in parallel including an embodiment of a DC voltage balancing circuit in a single star balancing converter configuration. FIG. 7B illustrates an embodiment of a power generation system 700b that utilizes a single star string voltage balancing circuit 710b, similar to the single star string voltage balancing circuit 710a of FIG. 7A.

The power generation system 700b includes three unbalanced. DC voltage source strings 702b, 704b and 706b, such as of PV panels or wind turbines. As illustrated, the DC voltage sources strings 702b, 704b, and 706b are connected in parallel. The DC voltage source strings 702b, 704, and 706b are also connected in parallel to a load 730b to which an output voltage is provided.

The single star string voltage balancing circuit 710b is respectively connected to the DC voltage source strings 702b, 704b and 706b. Also, the single star string voltage balancing circuit 710b is similar in operation to the string voltage balancing circuits 410a and 410b of FIGS. 4A and 4B, for example. The single star string voltage balancing circuit 710b can therefore be considered as an extension of the string voltage balancing circuits 410a and 410b of FIGS. 4A and 4B.

The single star string voltage balancing circuit 710b is respectively connected to the DC voltage source strings 702b, 704b and 706b to balance the voltages generated by the DC voltage source strings 702b, 704b and 706b. The single star string voltage balancing circuit 710b is respectively connected between the DC voltage sources strings 702b, 704b, and 706b and includes one inductor 720b (L) and three switches forming a star configuration. Also, the single star string voltage balancing circuit 710b can similarly overcome limitations of a relatively large number of components and physical location differences of circuit topology location associated with the closed loop string voltage balancing circuits 510a and 510b and the complementary string voltage balancing circuits 601a and 601b, such as illustrated in FIGS. 5A, 5B, 6A and 6B, respectively, for example.

The single star string voltage balancing circuit 710b includes three IGBT type semiconductor switches as can be reverse blocking switches (e.g., valves) 711b, 712b and 713b. Use of IGBT type switches for the switches 711b, 712b and 713b can allow for relatively higher switching frequencies and can reduce harmonic content, for example. The single star string voltage balancing circuit 710b also includes the inductor 720b (L) respectively connected to each the switches 711b, 712b and 713b. The inductor 720b (L) can act to filter out ripples in the individual string currents respectively controlled by the switches 711b, 712b and 713b flowing in the corresponding DC voltage source strings 702b, 704b and 706b.

The single star string voltage balancing circuit 710b also includes three capacitors 717b ($C_1$), 718b ($C_2$) and 719b ($C_3$). The capacitor 717b ($C_1$) is connected to the switch 711b and is associated with the first DC voltage source string 702b to balance the voltage generated by the first DC voltage source string 702b. The capacitor 718b ($C_2$) is connected to the switch 712b and is associated with the second DC voltage source string 704b to balance the voltage generated by the second DC voltage source string 704b. The capacitor 719b ($C_3$) is connected to the switch 713b and is associated with the third DC voltage source string 706b to balance the voltage generated by the third DC voltage source string 706b. In some embodiments, the switches 711b, 712b and 713b have reverse blocking capability or, as illustrated, can be connected to series diodes 714b, 715b and 716b configured to block reverse current to provide a reverse blocking capability, for example.

In the single star string voltage balancing circuit 710b, the switches 711b, 712b and 713b, in addition to being IGBT type semiconductor switches, can also include any of various suitable switches, such as metal-oxide semiconductor field effect transistor (MOSFET) switches, various types of transistor-type switches, or any another suitable components, as can depend on the use or application, and should not be construed in a limiting sense.

Also, as illustrated in FIG. 7B, the power generation system 700b also includes an inductor 703b in series with the capacitor 717b ($C_1$) and the DC voltage source string 702b, an inductor 705b in series with the capacitor 718b ($C_2$) and the DC voltage source string 704b and an inductor 707b in series with the capacitor 719b ($C_3$) and the DC voltage source string 706b. The inductors 703b, 705b, and 707b can act as a filter, such as to minimize or reducing a ripple current, for example, in the power generation system 700b.

For example, for purposes of illustration, the first DC voltage source string 702b can generate a 100 kV output voltage $V_1$, the second DC voltage source string 704b can generate an 80 kV output voltage $V_2$ and the third DC voltage source string 706b can generate a 90 kV output voltage $V_3$. Therefore, the single star string voltage balancing circuit 710b can balance or substantially balance the DC voltage source strings 702b, 704b and 706b output voltage at 90 kV, for example. In such case, the voltage across the capacitor 717b ($C_1$) is −10 kV, the voltage across the capacitor and 718b ($C_2$) is 10 kV, the voltage across the capacitor 719b ($C_3$) is 0 kV, for example.

The duty ratios or duty cycles, $\delta_1$-$\delta_3$, of the corresponding switches 711a, 712a, and 713a in the single star string voltage balancing circuit 710a and of the corresponding switches 711b, 712b, and 713b in the single star string voltage balancing circuit 710b are controlled to get the desired output DC voltage across the load terminals, such as the loads 730a and 730b of the power generation system. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense. The voltage unbalance in the lines can be translated into a negative potential on a corresponding capacitor, a positive potential on a corresponding capacitor or a zero potential on a corresponding capacitor to provide the voltage balancing, for example.

Figure 7C:
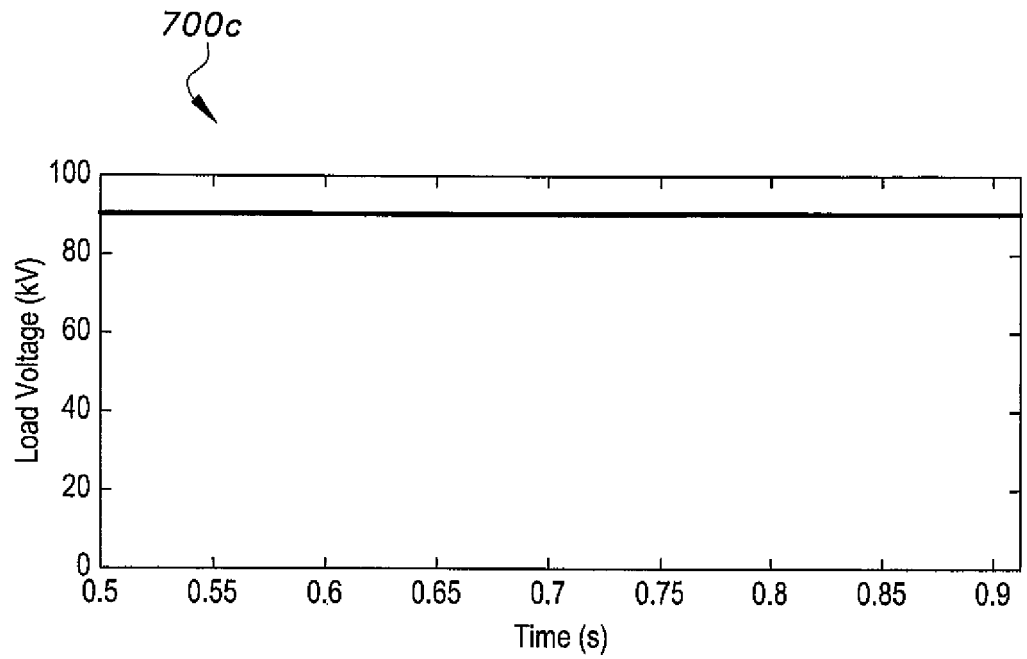
FIG. 7C, FIG. 7D and FIG. 7E illustrate graphs of simulation results respectively comparing load voltage, DC source current and capacitor voltage, versus time, for the embodiment of a DC voltage balancing circuit of FIG. 7B according to the present invention.
Figure 7D:
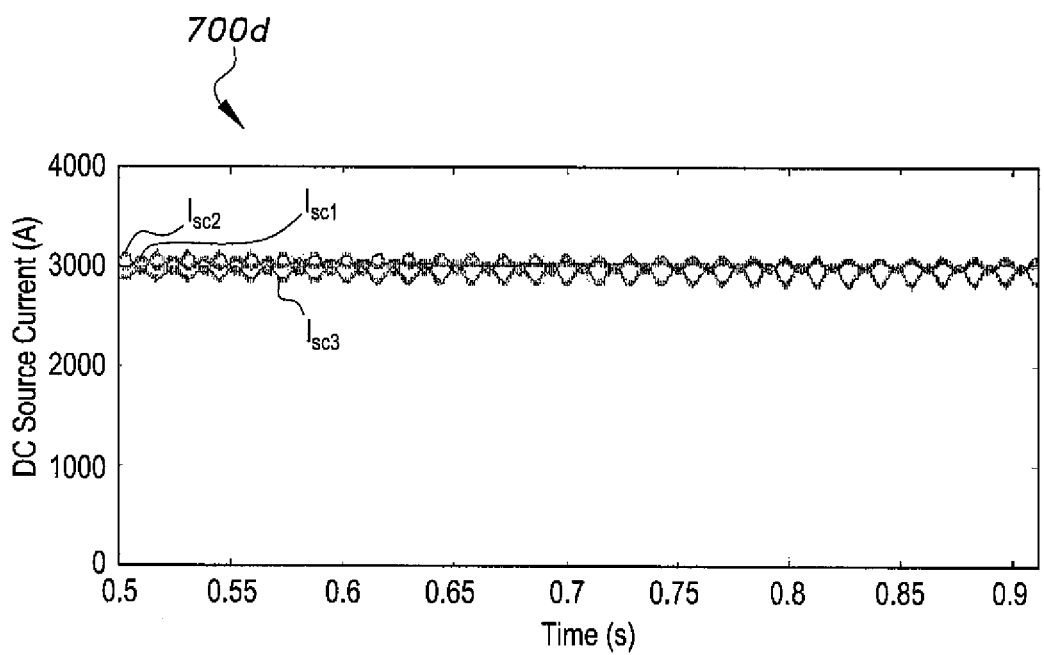
Figure 7E:
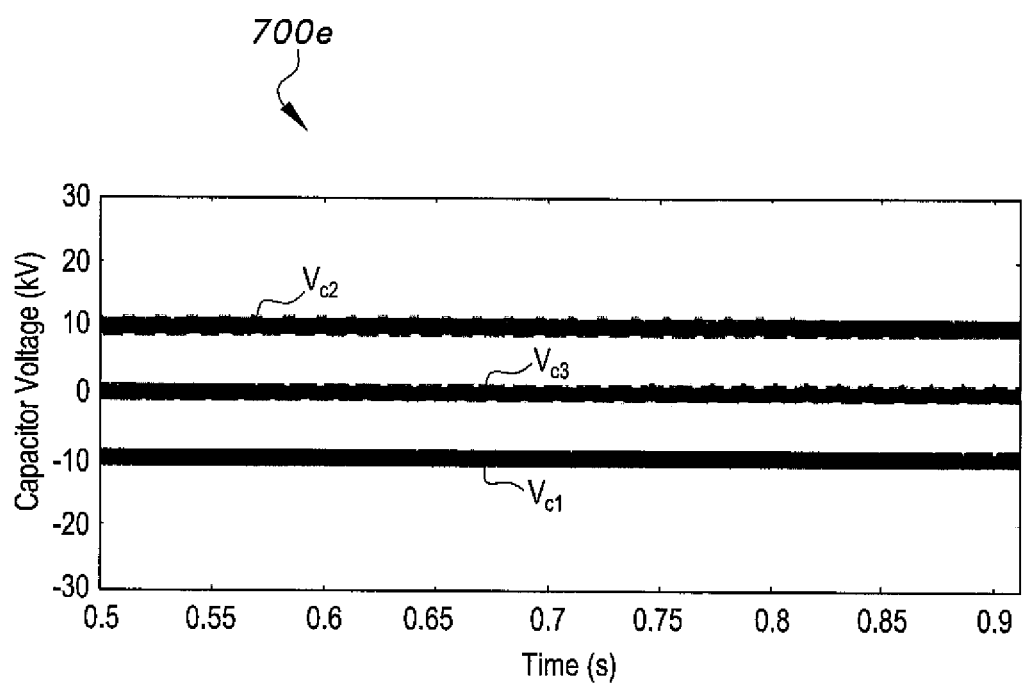

FIG. 7C, FIG. 7D and FIG. 7E illustrate graphs of simulation results respectively comparing load voltage, DC source current and capacitor voltage, versus time, for an embodiment of the single star string voltage balancing circuit 710b of FIG. 7B. Referring to FIGS. 7C-7E, the simulation results for an embodiment of the single star string voltage balancing circuit 710b in the power generation system 700b of FIG. 7B are presented. In the simulation, for the three DC voltage source strings 702b, 704b and 706b, the voltage generated by the first DC voltage source string 702b was 100 kilovolts (kV) as $V_1$, the voltage generated by the second DC voltage source string 704b was 80 kV as $V_2$ and the voltage generated by the third DC voltage source string 706b was 90 kilovolts (kV) as $V_3$.

Also, in the simulation, the duty ratio or duty cycle of first switch 711b ($\delta_1$), the duty ratio or duty cycle of second switch 712b ($\delta_2$) and the duty ratio or duty cycle of the third switch 713b ($\delta_3$) each were equal to 33% of the total duty cycle, such that their duty ratios or duty cycles were equal or substantially equal to one, $\delta_1+\delta_2+\delta_3=1$. The switches 711b, 712b, and 713b were alternately turned on in the voltage balancing process, such as by simulation control implemented by a computer processor in Matlab®, as can be implemented by the generalized system 1000 of FIG. 10. The inductance of the inductors 703b, 705b, 707b and 720b were each equal to 5 millihenry(ies) (mH) and the capacitance of the three capacitors 717b ($C_1$), 718b ($C_2$) and 719b ($C_3$) were each equal to 1 millifarad (mF), a switching frequency of the switches 711b, 712b and 713b was 1 kilohertz (kHz) and the load 730b was set to 10 ohms.

FIG. 7C illustrates a graph 700c of simulation results comparing load voltage (kV) versus time (seconds (s)). In the graph 700c it can be seen that the load voltage generated by power generation system 700b was 90 kV, indicating a voltage balancing for the DC voltage source strings 702b, 704b and 706b.

FIG. 7D illustrates a graph 700d of simulation results comparing DC source current (amperes (A)) versus time (s). In the graph 700d, it can be seen that the current $I_{sc1}$ for the first DC voltage source string 702b, the current $I_{sc2}$ for the second DC voltage source string 704b, and the current $I_{sc3}$ for the third DC voltage source string 706b were substantially balanced with respect to each other.

FIG. 7E illustrates a graph 700e of simulation results comparing capacitor voltage (kV) versus time (s). In the graph 700e, it can be seen that the voltage $V_{c1}$ for the capacitor 717b ($C_1$) was approximately −10 kV, the voltage $V_{c2}$ for the capacitor 718b ($C_2$) was approximately 10 kV, and the voltage $V_{c3}$ for the capacitor 719b ($C_3$) was approximately 0 kV, indicating a voltage balancing for the DC voltage source strings 702b, 704b and 706b.

The single star string voltage balancing circuits 710a and 710b respectively illustrated in FIGS. 7A and 7B can be generalized an extended to any number of a plurality of DC voltage source strings connected in parallel. It is noted that the voltage balancing circuits and topologies as illustrated in FIGS. 7A and 7B, and as described herein, can be extended to architectures including n parallel connected DC converters for a corresponding power generation system having a plurality of DC voltage source strings to be balanced, as can depend on the use or application, and should not be construed in a limiting sense.

FIG. 8A illustrates a general schematic diagram of an embodiment of power generation system with DC voltage source strings connected in parallel including an embodiment of a DC voltage balancing circuit in a double star balancing converter configuration. FIG. 8A illustrates an embodiment of a power generation system 800a that utilizes a double star string voltage balancing circuit 810a.

The power generation system 800a includes three unbalanced DC voltage source strings 802a, 804a and 806a, such as of PV panels or wind turbines. As illustrated, the DC voltage sources strings 802a, 804a, and 806a are connected in parallel. The DC voltage source strings 802a, 804a, and 806a are also connected in parallel to a load 830a to which an output voltage is provided.

The double star string voltage balancing circuit 810a is respectively connected to the DC voltage source strings 802a, 804a and 806a. Also, the double star string voltage balancing circuit 810a is similar in operation to the string voltage balancing circuits 410a and 410b of FIGS. 4A and 4B, for example. The double star string voltage balancing circuit 810a can therefore be considered as an extension of the string voltage balancing circuits 410a and 410b of FIGS. 4A and 4B.

The double star string voltage balancing circuit 810a is respectively connected to the DC voltage source strings 802a, 804a and 806a, in a generally redundant manner, to balance the voltages generated by the DC voltage source strings 802a, 804a and 806a. The double star string voltage balancing circuit 810a is respectively connected between the DC voltage sources strings 802a, 804a, and 806a and includes two inductors 827a ($L_1$) and 837a ($L_2$) and six switches forming a double star configuration.

Also, the double star string voltage balancing circuit 810a can overcome limitations of a relatively large number of components and physical location differences of circuit topology location associated with the closed loop string voltage balancing circuits 510a and 510b and the complementary string voltage balancing circuits 601a and 601b, such as illustrated in FIGS. 5A, 5B, 6A and 6B, respectively, for example.

A first part of the double star string voltage balancing circuit 810a includes three reverse blocking switches (e.g., valves) 822a, 824a and 826a and includes the inductor 827a ($L_1$) respectively connected to each of the switches 822a, 824a and 826a. The inductor 827a ($L_1$) can act to filter out ripples in the individual string currents respectively controlled by the switches 822a, 824a and 826a flowing in the corresponding DC voltage source strings 802a, 804a and 806a.

The first part of the double star string voltage balancing circuit 810a also includes three capacitors 803a ($C_1$), 805a ($C_2$) and 807a ($C_3$) which are also shared with and included in a second part of the double star string voltage balancing circuit 810a. The capacitor 803a ($C_1$) is connected to the switch 822a and is associated with the first DC voltage source string 802a to balance the voltage generated by the first DC voltage source string 802a. The capacitor 805a ($C_2$) is connected to the switch 824a and is associated with the second DC voltage source string 804a to balance the voltage generated by the second DC voltage source string 804a. The capacitor 807a ($C_3$) is connected to the switch 826a and is associated with the third DC voltage source string 806a to balance the voltage generated by the third DC voltage source string 806a. In some embodiments, the switches 822a, 824a and 826a have reverse blocking capability or, as illustrated, can be connected to series diodes 821a, 823a and 825a configured to block reverse current to provide a reverse blocking capability, for example.

A second part of the double star string voltage balancing circuit 810a includes three reverse blocking switches (e.g., valves) 832a, 834a and 836a and includes the inductor 837a ($L_2$) respectively connected to each the switches 832a, 834a and 836a. The inductor 837a ($L_2$) can act to filter out ripples in the individual string currents respectively controlled by the switches 832a, 834a and 836a flowing in the corresponding DC voltage source strings 802a, 804a, and 806a.

Also, the second part of the double star string voltage balancing circuit 810a also includes the three capacitors 803a ($C_1$), 805a ($C_2$) and 807a ($C_3$), which are also shared with and included in the first part of the double star string voltage balancing circuit 810a. The capacitor 803a ($C_1$) is connected to the switch 832a and is associated with the first DC voltage source string 802a to balance the voltage generated by the first DC voltage source string 802a. The capacitor 805a ($C_2$) is connected to the switch 834a and is associated with the second DC voltage source string 804a to balance the voltage generated by the second DC voltage source string 804a. The capacitor 807a ($C_3$) is connected to the switch 836a and is associated with the third DC voltage source string 806a to balance the voltage generated by the third DC voltage source string 806a. In some embodiments, the switches 832a, 834a and 836a have reverse blocking capability or, as illustrated, can be connected to series diodes 831a, 833a and 835a configured to block reverse current to provide a reverse blocking capability, for example.

In the double star string voltage balancing circuit 810a, the switches 822a, 824a and 826a and the switches 832a, 834a and 836a can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

For example, for purposes of illustration, the first DC voltage source string 802a can generate a 100 kV output voltage, the second DC voltage source string 804a can generate an 80 kV output voltage and the third DC voltage source string 806a can generate a 90 kV output voltage. Therefore, the double star string voltage balancing circuit 810a can balance or substantially balance the DC voltage source strings 802a, 804a and 806a output voltage at 90 kV, for example. In such case, the voltage across the capacitor 803a ($C_1$) is −10 kV, the voltage across the capacitor and 805a ($C_2$) is 10 kV, the voltage across the capacitor 807a ($C_3$) is 0 kV, for example.

FIG. 8B illustrates a general schematic diagram of an embodiment of power generation system with DC voltage source strings connected in parallel including an embodiment of a DC voltage balancing circuit in a double star balancing converter configuration. FIG. 8B illustrates an embodiment of a power generation system 800b that utilizes a double star string voltage balancing circuit 810b, similar to the double star string voltage balancing circuit 810a.

The power generation system 800b includes three unbalanced DC voltage source strings 802b, 804b and 806b, such as of PV panels or wind turbines. As illustrated, the DC voltage sources strings 802b, 804b, and 806b are connected in parallel. The DC voltage source strings 802b, 804b, and 806b are also connected in parallel to a load 830b to which an output voltage is provided.

The double star string voltage balancing circuit 810b is respectively connected to the DC voltage source strings 802b, 804b and 806b. Also, the double star string voltage balancing circuit 810b is similar in operation to the string voltage balancing circuits 410a and 410b of FIGS. 4A and 4B, for example. The double star string voltage balancing circuit 810b can therefore be considered as an extension of the string voltage balancing circuits 410a and 410b of FIGS. 4A and 4B.

The double star string voltage balancing circuit 810b is respectively connected to the DC voltage source strings 802b, 804b and 806b, in a generally redundant manner, to balance the voltages generated by the DC voltage source strings 802b, 804b and 806b. The double star string voltage balancing circuit 810b is respectively connected between the DC voltage sources strings 802b, 804b, and 806 and includes two inductors 827b ($L_1$) and 837b ($L_2$) and six switches forming a double star configuration.

Also, the double star string voltage balancing circuit 810b can similarly overcome limitations of a relatively large number of components and physical location differences of circuit topology location associated with the closed loop string voltage balancing circuits 510a and 510b and the complementary string voltage balancing circuits 601a and 601b, such as illustrated in FIGS. 5A, 5B, 6A and 6B, respectively, for example.

A first part of the double star string voltage balancing circuit 810b includes three IGBT type semiconductor switches as can be reverse blocking switches (e.g., valves) 822b, 824b and 826b. Use of IGBT type switches for the switches 822b, 824b and 826b can allow for relatively higher switching frequencies and can reduce harmonic content, for example. The double star string voltage balancing circuit 810b also includes the inductor 827b ($L_1$) that can act to filter out ripples in the individual string currents respectively controlled by the switches 822b, 824b and 826b flowing in the corresponding DC voltage source strings 802b, 804b and 806b.

The first part of the double star string voltage balancing circuit 810b also includes three capacitors 803b ($C_1$), 805b ($C_2$) and 807b ($C_3$) which are also shared with and included in a second part of the double star string voltage balancing circuit 810b. The capacitor 803b ($C_1$) is connected to the switch 822b and is associated with the first DC voltage source string 802b to balance the voltage generated by the first DC voltage source string 802b. The capacitor 805b ($C_2$) is connected to the switch 824b and is associated with the second DC voltage source string 804b to balance the voltage generated by the second DC voltage source string 804b. The capacitor 807b ($C_3$) is connected to the switch 826b and is associated with the third DC voltage source string 806b to balance the voltage generated by the third DC voltage source string 806b. In some embodiments, the switches 822b, 824b and 826b have reverse blocking capability or, as illustrated, can be connected to series diodes or to series type diode arrangements 821b, 823b and 825b configured to block reverse current to provide a reverse blocking capability, for example.

A second part of the double star string voltage balancing circuit 810b includes three IGBT type semiconductor switches as can be reverse blocking switches (e.g., valves) 832b, 834b and 836b. Use of IGBT type switches for the switches 832b, 834b and 836b can allow for relatively higher switching frequencies and can reduce harmonic content, for example. The double star string voltage balancing circuit 810b also includes the inductor 837b ($L_2$) respectively connected to each of the switches 832b, 834b and 836b. The inductor 837b ($L_2$) can act to filter out ripples in the individual string currents respectively controlled by the switches 832b, 834b and 836b flowing in the corresponding DC voltage source strings 802b, 804b, and 806b.

Also the second part of the double star string voltage balancing circuit 810b also includes the three capacitors 803b ($C_1$), 805b ($C_2$) and 807b ($C_3$), which are also shared with and included in the first part of the double star string voltage balancing circuit 810b. The capacitor 803b ($C_1$) is connected to the switch 832b and is associated with the first DC voltage source string 802b to balance the voltage generated by the first DC voltage source string 802b. The capacitor 805b ($C_2$) is connected to the switch 834b and is associated with the second DC voltage source string 804b to balance the voltage generated by the second DC voltage source string 804b. The capacitor 807b ($C_3$) is connected to the switch 836b and is associated with the third DC voltage source string 806b to balance the voltage generated by the third DC voltage source string 806b. In some embodiments, the switches 832b, 834b and 836b have reverse blocking capability or, as illustrated, can be connected to series diodes or to series type diode arrangements 831b, 833b and 835b configured to block reverse current to provide a reverse blocking capability, for example.

In the double star string voltage balancing circuit 810b, the switches 822b, 824b and 826b and the switches 832b, 834b and 836b in addition to being IGBT type semiconductor switches, can also include any of various suitable switches, such as metal-oxide semiconductor field effect transistor (MOSFET) switches, various types of transistor-type switches, or any another suitable components, as can depend on the use or application, and should not be construed in a limiting sense.

For example, for purposes of illustration, the first DC voltage source string 802b can generate a 100 kV output voltage $V_1$, the second DC voltage source string 804b can generate an 80 kV output voltage $V_2$ and the third DC voltage source string 806b can generate a 90 kV output voltage $V_3$. Therefore, the double star string voltage balancing circuit 810b can balance or substantially balance the DC voltage source strings 802b, 804b and 806b output voltage at 90 kV, for example. In such case, the voltage across the capacitor 803b ($C_1$) is −10 kV, the voltage across the capacitor and 805b ($C_2$) is 10 kV, the voltage across the capacitor 807b ($C_3$) is 0 kV, for example.

The duty ratios or duty cycles, $\delta_1$-$\delta_6$, of the corresponding switches 822a, 824a and 826a and the switches 832a, 834a and 836a in the double star string voltage balancing circuit 810a and of the corresponding switches 822b, 824b and 826b and the switches 832b, 834b and 836b in the double star string voltage balancing circuit 810b are controlled to get the desired output DC voltage across the load terminals, such as the loads 830a and 830b of the power generation system. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense. The voltage unbalance in the lines can be translated into a negative potential on a corresponding capacitor, a positive potential on a corresponding capacitor or a zero potential on a corresponding capacitor to provide the voltage balancing, for example.

The double star string voltage balancing circuits 810a and 810b respectively illustrated in FIGS. 8A and 8B can be generalized an extended to any number of a plurality of DC voltage source strings connected in parallel. It is noted that the voltage balancing circuits and topologies as illustrated in FIGS. 8A and 8B, and as described herein, can be extended to architectures including n parallel connected DC converters for a corresponding power generation system having a plurality of DC voltage source strings to be balanced, as can depend on the use or application, and should not be construed in a limiting sense.

Also, when compared with the single star string voltage balancing circuits 710a and 710b, respectively illustrated in FIGS. 7A and 7B, the double star string voltage balancing circuits 810a and 810b, respectively illustrated in FIGS. 8A and 8B, can include the identical three switches and an inductor in each of a first star arrangement and a second star arrangement, for example. An advantage of the double star string voltage balancing circuits 810a and 810b is that, while the double star string voltage balancing circuits 810a and 810b each include double the number of switches and inductors used from that of the single star string voltage balancing circuits 710a and 710b, the double star string voltage balancing circuits 810a and 810b can reduce the switches current to half or substantially half of that of the single star string voltage balancing circuits 710a and 710b, as well as can reduce the capacitor sizes used, for example.

In some embodiments, such redundancy, such as in the double star string voltage balancing circuits 810a and 810b, can therefore lower the device rating as is illustrated in Table 1 (e.g., power rating of the double star balancing circuit is reduced to approximately 50%). As is illustrated in Table 1, a double star balancing converter topology can be relatively advantageous based on a comparison index that considers the number of components and device rating, for example.

TABLE 1

Comparative Analysis of Balancing Converter Topologies
Three Lines String Voltage Balancing Converter
(Note: Full load is the total current from the three lines)

|  | Closed Ring | Single Star | Double Star |
|---|---|---|---|
| Switches |  |  |  |
| # of switches | 6 | 3 | 6 |
| Max current/full load (%) | 66.67% | 100% | 50% |
| Average Current/Max Current | 0.5 | 0.33 | 0.33 |
| Max (Average Current/Full load (%)) | 33.33% | 33.33% | 16.67% |
| # of switches *Max Current/Full load (%) | 4 | 3 | 3 |
| Inductors |  |  |  |
| # of inductors | 3 | 1 | 2 |
| Max Current/Full load (%) | 66.67% | 100% | 100% |
| # of inductors *Max Current/Full load (%) | 2 | 1 | 1 |
| Capacitors |  |  |  |
| # of capacitors | 3 | 3 | 3 |
| Index (Inductors, switches, capacitors) | 9 = 4 + 2 + 3 | 7 = 3 + 1 + 3 | 7 = 3 + 1 + 3 |
| Ranking based on index (worst to best) | Closed Ring | Single Star | Double Star |

FIG. 9 illustrates a general schematic diagram of an embodiment of power generation system with DC voltage source strings connected in parallel including an embodiment of a DC voltage balancing circuit in an open ring balancing converter configuration. FIG. 9 illustrates an embodiment of a power generation system 900 that utilizes an open ring string voltage balancing circuit 902, such as illustrated in FIG. 9.

The power generation system 900 includes three unbalanced DC voltage source strings 910, 920 and 930, such as of PV panels or wind turbines. As illustrated, the DC voltage sources strings 910, 920 and 930 are connected in parallel, and are also connected in parallel to a load 960 to which an output voltage is provided.

The open ring string voltage balancing circuit 902 is connected between the DC voltage source strings 910, 920 and 930. Also, the open ring voltage balancing circuit 902, in the embodiment of FIG. 9, includes a topology similar to the string voltage balancing circuits 410a and 410b of FIGS. 4A and 4B. The open ring string voltage balancing circuit 902 can therefore be considered as an extension of the string voltage balancing circuits 410a and 410b of FIGS. 4A and 4B.

The open ring string voltage balancing circuit 902 includes reverse blocking switches (e.g., valves) 942 and 944 and an inductor 947 connected between switches 942 and 944, the switches 942 and 944 dividing the inductor 947 current between the two lines, such as according to their operating operation point, for example. In some embodiments, the switches 942 and 944 have reverse blocking capability or, as illustrated, can be connected to series diodes or to series diode type arrangements 943 and 945 configured to block reverse current to provide a reverse blocking capability, for example.

The open ring string voltage balancing circuit 902 also includes reverse blocking switches (e.g., valves) 952 and 954 and an inductor 957 connected between switches 952 and 954, the switches 952 and 954 dividing the inductor 957 current between the two lines, such as according to their operating operation point, for example. In some embodiments, the switches 952 and 954 have reverse blocking capability or, as illustrated, can be similarly connected to series diodes or to series diode type arrangements 953 and 955 configured to block reverse current to provide a reverse blocking capability, for example.

The open ring string voltage balancing circuit 902 is connected between the DC voltage source strings 910, 920 and 930 to balance the voltages generated by the DC voltage source strings 910, 920 and 930. The open ring string voltage balancing circuit 902 also includes thee capacitors 946, 948 and 950. The capacitor 946 is connected in series with the DC voltage source string 910 and is also connected to the switch 942. The capacitor 948 is connected in series with the DC voltage source string 920 and is also connected to the switch 944 and the switch 952. The capacitor 950 is connected in series with the DC voltage source string 930 and is also connected to the switch 954.

In the open ring string voltage balancing circuit 902, the switches 942, 944, 952 and 954 include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

Also, as illustrated in FIG. 9, the power generation system 900 also includes a resistor 912 in series with an inductor 914 connected in series with the capacitor 946 and the DC voltage source string 910, a resistor 922 in series with an inductor 924 connected in series with the capacitor 948 and the DC voltage source string 920 and a resistor 932 in series with an inductor 934 connected in series with the capacitor 950 and the DC voltage source string 930. The resistors 912, 922 and 932 respectively in series with the inductors 914, 924 and 934 can act as a filter, such as to minimize or reducing a ripple current, for example, in the power generation system 900.

The duty ratios or duty cycles, $\delta_1$-$\delta_4$, of the corresponding switches 942, 944, 952 and 954 in the open ring string voltage balancing circuit 902 are controlled to get the desired output DC voltage across the load terminals, such as at the load 960 of the power generation system. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense. The voltage unbalance in the lines can be translated into a negative potential on a corresponding capacitor, a positive potential on a corresponding capacitor or a zero potential on a corresponding capacitor to provide the voltage balancing, for example.

For example, for purposes of illustration, the DC voltage source string 910 can generate a 100 kV output voltage $V_1$, the DC voltage source string 920 can generate a 90 kV output voltage $V_2$ and the DC voltage source string 930 can generate an 80 kV output voltage $V_3$. However, in the power generation system 900, the open ring string voltage balancing circuit 902 illustrates voltage balancing for the three DC voltage source strings 910, 920 and 930 with essentially two voltage balancing circuits that form the open ring string voltage balancing circuit 902, using an open ring type configuration.

While the open ring string voltage balancing circuit 902 can provide voltage balancing of DC voltage source strings in a power generation system in some operating conditions, the open ring string voltage balancing circuit 902, due to its open ring configuration, does not necessarily provide voltage balancing for all operating conditions in a power generation system. In this regard, if the DC voltages generated by the three DC voltage source strings 910, 920 and 930 are 100 kV, 90 kV and 80 kV, respectively, then the left capacitor 946 potential should be −10 kV, the right capacitor 960 potential should be 10 kV, and the middle capacitor potential should be 0 kV.

However, in this example, the open ring string voltage balancing circuit 902 cannot operate to effectively balance the voltages unless the voltages of its groupings of two capacitors have an opposite sign. Another problem that can arise in voltage balancing using the open ring string voltage balancing circuit 902 with the open right type configuration is that the ratings of the switches, such as transistors, are typically not equal. In this regard, in the open ring string voltage balancing circuit 902 the two middle switches, such as transistors, are feeding one DC voltage source line and the two outer switches, such as transistors, each feed one DC voltage source line, for example.

The open ring string voltage balancing circuit 902 respectively illustrated in FIG. 9 can, for suitable applications, be generalized an extended to any number of a plurality of DC voltage source strings connected in parallel, for those applications to which is applicable. It is noted that the voltage balancing circuits and topologies as illustrated in FIG. 9, and as described herein, can be extended to architectures including n parallel connected DC converters for a corresponding power generation system having a plurality of DC voltage source strings to be balanced, as can depend on the use or application, and should not be construed in a limiting sense.

Therefore, as described herein, embodiments of string voltage balancing converters can provide all or substantially all the benefits of microinverters (AC or DC) at a relatively reduced complexity and/or cost. Embodiments of string voltage balancing converters can also be relatively superior to AC microinverters, particularly for use in higher voltage utility scale systems, for example.

Also, embodiments of string voltage balancing converters can be relatively superior to DC microinverters because, in some cases, power generation systems using DC micro inverters typically still require voltage balancing when more strings are connected in parallel. In such cases, one solution can be to overrate each of the DC microinverters to account for any voltage drops in any string, such as is described for large scale wind farm architectures in S. Lundberg, "Evaluation of wind farm layouts," EPE Journal, vol. 19, no. 1, pp. 157-169 (March 2004), the entirety of which in incorporated by reference herein as part of this specification.

However, overrating DC microinverters can come at a relatively significant complexity and/or cost. In various embodiments using string balancing voltage converters can substantially reduce a need to overrate each individual inverter (or groups of inverters) in a power generation system. In this regard, embodiments of string voltage balancing converters can be arranged in topologies that can allow for integration into central inverter architectures or can serve as an add-on to such architectures, for example.

In some embodiments, using string voltage balancing converters can be cost effective. For example, Table 2 presents a cost analysis based on published figures (from December 2009) for a 7 kW system, which can be considered a sizable rooftop PV installation. The price information used for Table 2 was based on that from a PV distributor, AEE Solar. Although the total cost of central converter solution is relatively the lowest, the costs of the central converter solution do not account for any of the system accessories, wiring, protection equipment, etc.

As is illustrated in Table 2, a multiple string system that utilizes string voltage balancing converters can cost somewhat more than the central converter system, but less than a system that utilizes microinverters. In this regard, additional components configured to perform string voltage balancing are typically relatively less costly and less complex than another converter, and can also be integrated into central inverter architectures or can serve as an add-on to such architectures, for example.

TABLE 2

Economic Study of a 7 kW System

| Topologies | Inverter | Integrated Module | Total Cost |
|---|---|---|---|
| Central converter | $5,470 | Not applicable | $ 5,470 |
| String voltage balancing converters | 2 × $3,580 | Not applicable | $ 7,160 |
| Microinverter | Not applicable | 40 × $288 | $11,520 |

Also, as described, embodiments of string voltage balancing converters can be applicable to various series connection of DC voltage sources that are placed in parallel combinations, such as for PV applications, wind energy applications (e.g., wind turbine collection grids), battery cells, capacitor banks, and the like.

As mentioned, embodiments of string voltage balancing power converters, as can include embodiments of voltage balancing circuits and topologies, can be combined with embodiments of current balancing circuits and topologies of various configurations for power generation electrical systems to balance DC voltage source strings that are placed in parallel. For example, balancing the current in each of DC voltage sources of a DC voltage source string, such as a string of PV panels or wind turbines, etc., can be beneficial as can enhance relatively efficient generation of output power in power generation systems.

In this regard, series connection of PV panels or wind turbines, etc. to build up voltage can force the panels to hold the same current which can possibly result in a decreased efficiency if the PV panels are of different parameters (irradiance) and, hence, the DC voltage source string(s) including such PV panels do not necessarily operate at its maximum power point (mpp).

One solution is to assist in operating the DC voltage source strings DC voltage sources, such as PV panels, at a maximum power point (mpp) is connect each DC voltage source, such as a PV panel to a DC converter to enhance the PV panel's ability to deliver a maximum available power, then connect the DC converters in a suitable way (series, parallel, etc.).

Another solution to assist in operating the DC voltage source strings DC voltage sources, such as PV panels, at a maximum power point (mpp) is to connect the DC voltage source strings DC voltage sources, such as PV panels, in series and attach them to a balancing circuit to bypass the required difference current, such as illustrated in FIG. 11A and FIG. 11B, such as can be beneficial in partial shading conditions, for example. Such process is referred to as differential power processing (DPP) series balancing. Implementing embodiments of DPP series balancing to DC voltage sources in DC voltage source strings in a power generation system having a plurality of DC voltage source strings can enhance the DC voltage source's, such as a PV panel's ability, to deliver a maximum available power and, therefore, can enhance each DC voltage source strings ability to generate a maximum power.

FIG. 11A illustrates a general schematic diagram of an embodiment of power generation system 1100a including an embodiment of a DPP current balancing circuit 1110a as can be used in a power generation system of a plurality of DC voltage source strings to balance the current between series connected DC voltage sources, such as PV arrays, in a DC voltage source string. For exemplary purposes, the power generation system 1100a illustrates a single DC voltage source string having a plurality of DC voltage sources or modules, such as PV panels. The DC voltage source string in the power generation system 1100a includes DC voltage sources or modules ("DC voltage source module(s)") 1120a, 1222a and 1224a.

The DPP current balancing circuit 1110a includes a plurality of switches 1132a, 1134a and 1136a respectively connected with the DC voltage source modules 1120a, 1222a and 1224a, each of the switches 1132a, 1134a and 1136a is respectively associated with a diode 1131a, 1133a and 1135a, to control bypass of a difference current. An inductor 1137a is connected between the DC voltage source modules 1120a and 1122a and connected between the switches 1132a and 1134a to carry a difference current and induce a difference voltage. An inductor 1139a is connected between the DC voltage source modules 1122a and 1124a and connected between the switches 1134a and 1136a to carry a difference current and induce a difference voltage. A DC voltage $V_c$ is provided across a capacitor 1140a connected in parallel with the DC voltage source modules 1120a, 1222a and 1224a.

The switches 1132a, 1134a and 1136a can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

FIG. 11B illustrates a general schematic diagram of another embodiment of a power generation system 1100b including an embodiment of a DPP current balancing circuit 1110b as can be used in a power generation system of a plurality of DC voltage source strings to balance the current between series connected DC voltage source modules, such as PV arrays in a DC voltage source string. For exemplary purposes, the power generation system 1100b illustrates a single DC voltage source string having a plurality of DC voltage source modules, such as PV panels. The DC voltage source string in the power generation system includes DC voltage source modules 1120b, 1222b and 1224b.

The DPP current balancing circuit 1110b includes a plurality of switches 1132b, 1134b and 1136b each respectively connected with the DC voltage source modules 1120b, 1222b and 1224b to control bypass of a difference current. Inductors 1121b, 1123b and 1125b are respectively connected in series with the DC voltage source modules 1120b, 1222b and 1224b to filter a ripple current. A DC voltage $V_c$ is provided across a capacitor 1140b connected in parallel with the DC voltage source modules 1120b, 1222b and 1224b.

The switches 1132b, 1134b and 1136b can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

As between the embodiment of the DPP current balancing circuit 1110a of FIG. 11A and the embodiment of the DPP current balancing circuit 1110b of FIG. 11B, the embodiment of the DPP current balancing circuit 1110a can be relatively better in that is can more easily be replaced or incorporated into power generation systems, as well as includes a smaller number of inductors of a reduced rating, for example.

Figures 11C, 11D:
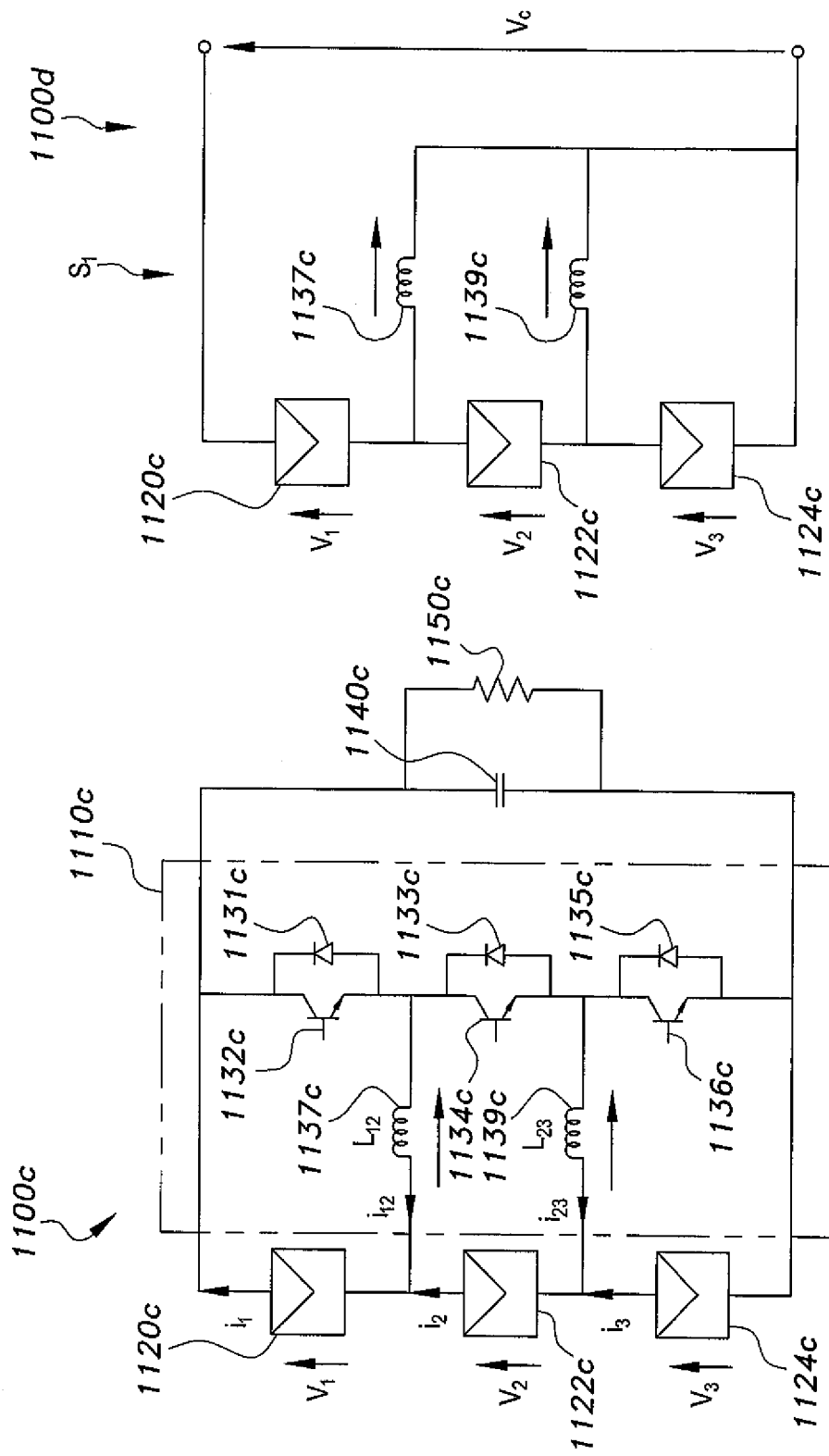
FIG. 11C illustrates a general schematic diagram of an embodiment of the current balancing circuit of FIG. 11A to illustrate switching states of switches of the current balancing circuit for differential power processing and difference currents as can be used in a power generation system of a plurality of DC voltage source strings to balance the current between series connected DC voltage sources, such as PV arrays in a DC voltage source string, according to the present invention.
FIG. 11D illustrates a general schematic diagram of a first switching state ($S_1$) in an embodiment of the current balancing circuit of FIG. 11C to balance the current between series connected DC voltage sources, such as PV arrays in a DC voltage source string according to the present invention.

FIG. 11C illustrates a general schematic diagram of an embodiment of a power generation system 1100c including an embodiment of a DPP current balancing circuit 1110c corresponding to the DPP current balancing circuit 1110a of FIG. 11A to illustrate switching states of the switches of the current balancing circuit and difference currents for differential power processing as can be used in a power generation system of a plurality of DC voltage source strings to balance the current between series connected DC voltage source modules, such as PV arrays, in a DC voltage source string.

For exemplary purposes, the power generation system 1100c similarly illustrates a single DC voltage source string having a plurality of DC voltage source modules, such as PV panels. The DC voltage source string in the power generation system 1100c includes DC voltage source modules 1120c, 1222c and 1224c. The DC voltage source module 1120c generates a voltage $V_1$ and has a current $i_1$, DC voltage source module 1122c generates a voltage $V_2$ and has a current $i_2$, and DC voltage source module 1124c generates a voltage $V_3$ and has a current $i_3$.

The DPP current balancing circuit 1110c includes a plurality of switches 1132c, 1134c and 1136c respectively connected with the DC voltage source modules 1120c, 1222c and 1224c, each of the switches 1132c, 1134c and 1136c is respectively associated with diodes 1131c, 1133c and 1135c, to control bypass of a difference current. An inductor 1137c ($L_{12}$) passing a current $i_{13}$ is connected between the DC voltage source modules 1120c and 1122c and connected between the switches 1132c and 1134c to pass a difference current and induce a difference voltage. An inductor 1139c ($L_{23}$) passing a current $i_{23}$ is connected between the DC voltage sources modules 1122c and 1124c and connected between the switches 1134c and 1136c to pass a difference current and induce a difference voltage. A DC voltage $V_c$ is provided across a capacitor 1140c connected in parallel with the DC voltage source modules 1120c, 1222c and 1224c. A load 1150c is connected across the capacitor 1140c.

The switches 1132c, 1134c and 1136c similarly can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense. Also, the switches are controlled so as to control values of the currents flowing in the inductances and, therefore, values of currents carried by the DC voltage source modules can differ from one another, for example.

Figures 11E, 11F:
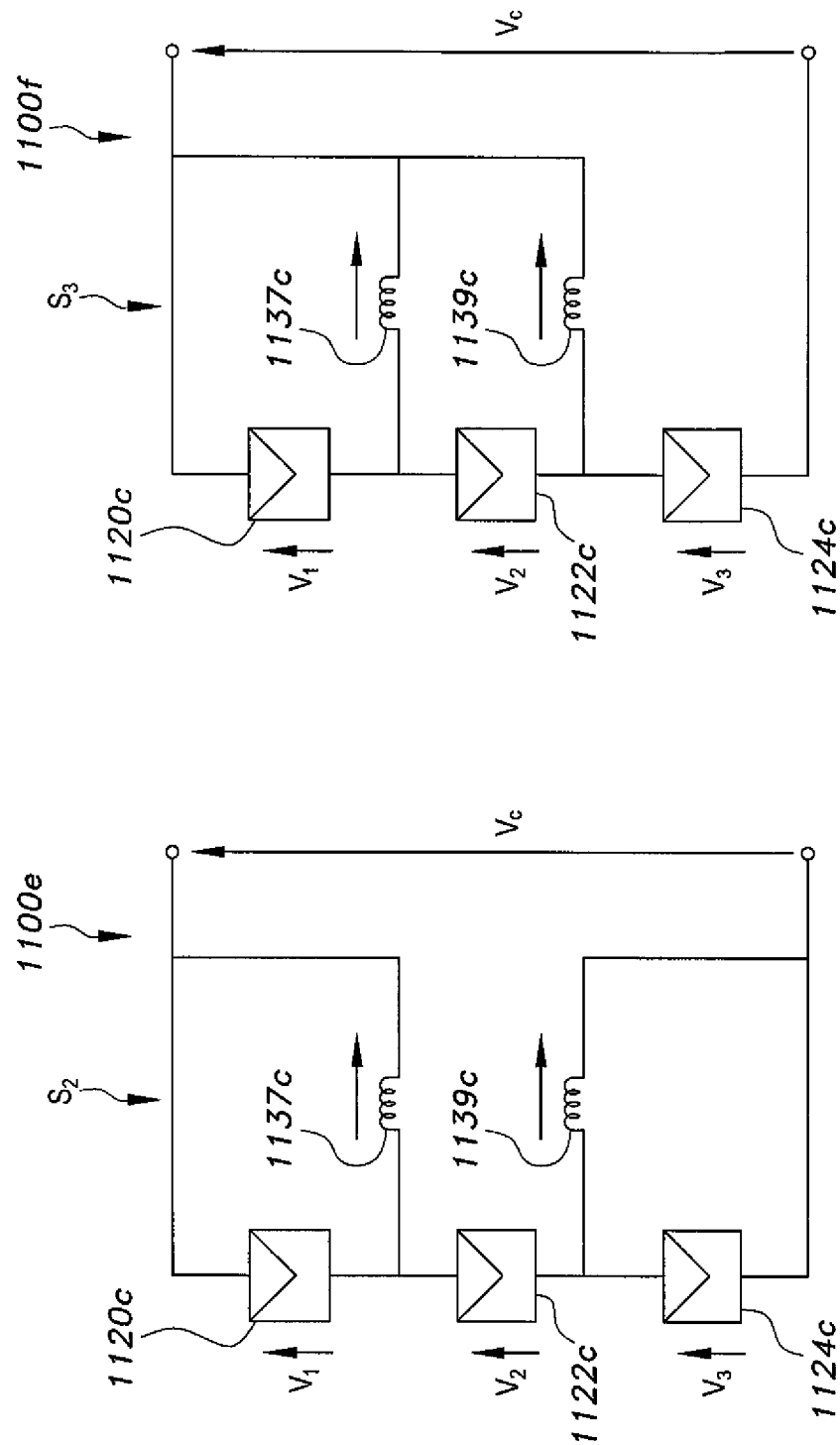
FIG. 11E illustrates a general schematic diagram of a second switching state ($S_2$) in an embodiment of the current balancing circuit of FIG. 11C to balance the current between series connected DC voltage sources, such as PV arrays in a DC voltage source string according to the present invention.
FIG. 11F illustrates a general schematic diagram of a third switching state ($S_3$) in an embodiment of the current balancing circuit of FIG. 11C to balance the current between series connected DC voltage sources, such as PV arrays in a DC voltage source string according to the present invention.

In the embodiment of the power generation system 1100c, in modeling and control of the DPP current balancing circuit 1110c for current balancing of the individual DC voltage source modules 1120c, 1122c and 1124c, the DPP current balancing circuit 1110c has three switching states $S_1$, $S_2$ and $S_3$. FIG. 11D illustrates a general schematic diagram 1100d of the first switching state $S_1$, FIG. 11E illustrates a general schematic diagram 1100e of the second switching state $S_2$ and FIG. 11F illustrates a general schematic diagram 1100f of a third switching state $S_3$ in an embodiment of DPP current balancing circuit 1110c of FIG. 11C.

Continuing with reference to FIGS. 11C-11F, the switching states $S_1$, $S_2$ and $S_3$ complete a switching period $\Delta t$ as follows:

$$\Delta t = T = \frac{1}{fswitching}, \quad (1)$$

where S1+S2+S3=1. Also, the voltages induced by and the currents flowing across the inductors 1137c ($L_{12}$) 1139c ($L_{23}$) for the switching states S1, S2 and S3 can be determined according to the following relations:

$$L_{12}\frac{\Delta i_{12}}{\Delta t} = (S_2 + S_3)V_1 + S_1(V_1 - V_c) = (S_1 + S_2 + S_3)V_1 - S_1 V_c, \quad (2)$$

$$L_{23}\frac{\Delta i_{23}}{\Delta t} = -(S_1 + S_2)V_3 + S_3(V_c - V_3), \quad (3)$$

$$\Delta i_{12} = \frac{T}{L_{12}}(V_1 - S_1 V_c) = -(S_1 + S_2 + S_3)V_3 + S_3 V_c \text{ and} \quad (4)$$

$$\Delta i_{23} = \frac{T}{L_{23}}(-V_3 + S_3 V_c). \quad (5)$$

Further, for the switching states $S_1$, $S_2$ and $S_3$ at steady state:

$$\Delta i_{12} = \Delta i_{23} = 0 \rightarrow S_1 = \frac{V_1}{V_c}, S_3 = \frac{V_3}{V_c}. \quad (6)$$

Also, for the switching states $S_1$, $S_2$ and $S_3$ at transient state:

$$\Delta i_{12} \propto \Delta S_1, \Delta i_{23} \propto \Delta S_3 \text{ and} \quad (7)$$

$$\Delta S_1 + \Delta S_2 + \Delta S_3 = 0. \quad (8)$$

At an initial moment of time, it is assumed to have $V_1=V_2=V_3$, approximately, for the switching states $S_1$, $S_2$ and $S_3$. Then $S_1=S_2=S_3=\frac{1}{3}$, as can correspond to the duty ratios or duty cycles for the switches 1132c, 1134c and 1136c, for example. To reach the reference $i_{12}$, $i_{23} \rightarrow S_1$, $S_2$, $S_3$ are slightly changed and finally can reach their equilibrium states according to the actual voltages $V_1$, $V_2$, $V_3$, and $\Delta S_1 \propto$ –(required increase $\Delta i_{12}$), $\Delta S_3$ a (required increase $\Delta i_{23}$) and $\Delta S_2 = 0 - \Delta S_1 - \Delta S_3$.

Figure 12:
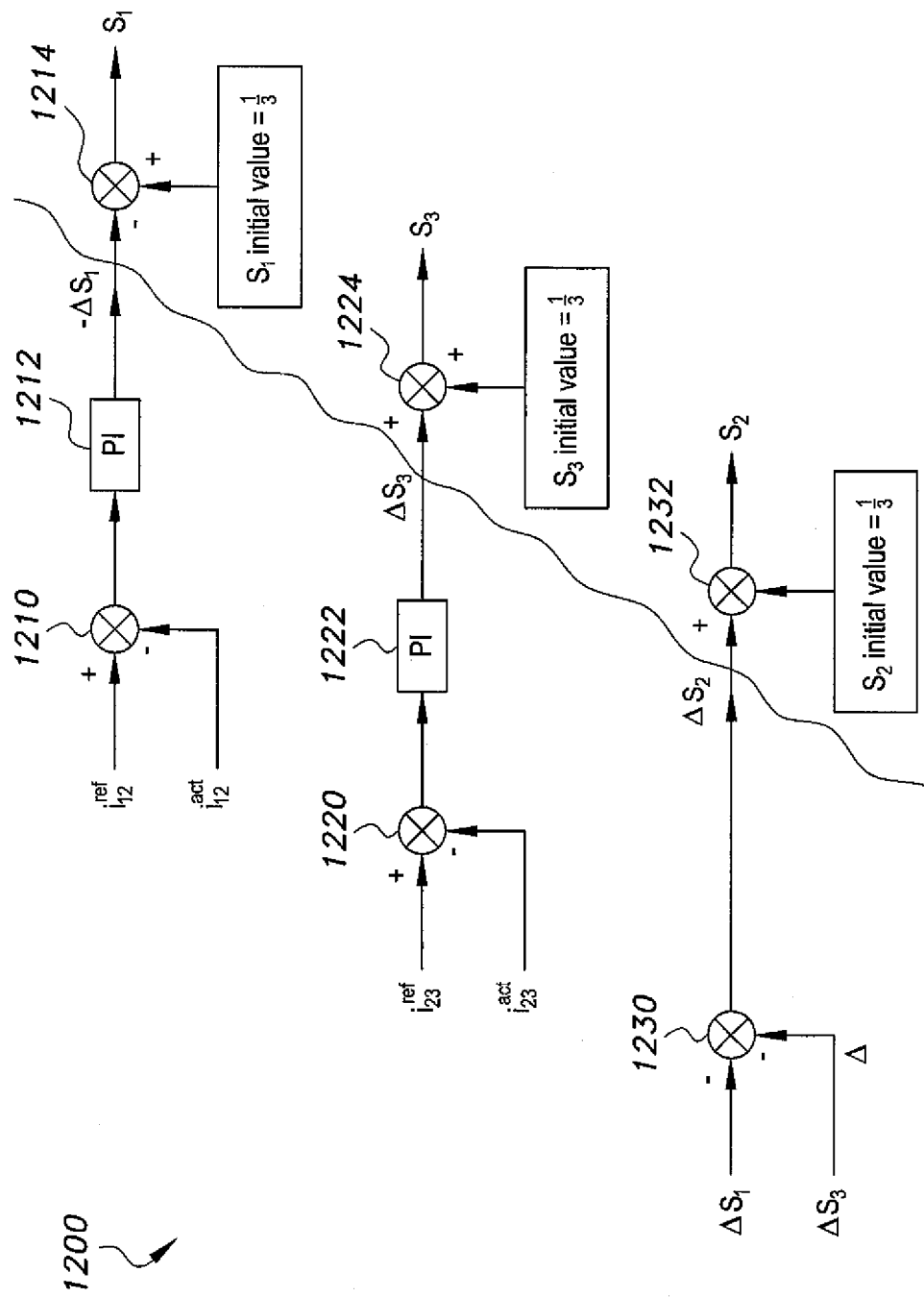
FIG. 12 illustrates a general schematic diagram of an embodiment of a controller illustrating a process for implementing the switching states $S_1$, $S_2$ and $S_3$ of the current balancing circuit of FIG. 11C for differential power processing as can be used in a power generation system to balance the current between series connected DC voltage sources, such as PV arrays, in a DC voltage source string according to the present invention.

FIG. 12 illustrates a general schematic diagram of an embodiment of a controller 1200 illustrating a process for implementing the switching states $S_1$, $S_2$ and $S_3$ of the DPP current balancing circuit 1110c of FIG. 11C for differential power processing as can be used in a power generation system to balance the current between series connected DC voltage sources, such as PV arrays in a DC voltage source string. The controller can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense.

The controller 1200 includes or implements summation modules or circuits 1210, 1214, 1220, 1224, 1230 and 1232 for respectively receiving and positively/negatively summing the reference ("ref") and the actual ("act") values of the currents $i_{12}$ and $i_{23}$ and the switching states and deltas ($\Delta$) of the switching states $S_1$, $S_2$ and $S_3$, such as of the DPP current balancing circuit 1110c. The controller 1200 also includes proportional-integral (PI) controllers 1212 and 1222 to implement control of the switching states $S_1$, $S_2$ and $S_3$, as can be in conjunction with other processes, operations, systems and controllers, embodiments of the DPP current balancing processes and operations, such as can be implemented by or in conjunction with the generalized system 1000 of FIG. 10, as can include, constitute or perform the functions and operations of the controller 1200, for example. In this regard, the controller 1200 can be implemented in a Simulink model as implemented by the embedded Matlab® function entitled "Saturation function (Adaptive gain)", for example.

In the control process implemented by the controller 1200, typically before $\Delta S_1$, $\Delta S_2$ and $\Delta S_3$ are added to the switching states $S_1$, $S_2$ and $S_3$, the delta values for the switching states the switching states $S_1$, $S_2$ and $S_3$ are checked to verify that any of $\Delta S_1$, $\Delta S_2$ and $$\Delta S_3 > -\frac{1}{3},$$

for example. This verification is done because ($\Delta S + \Delta S_{initial}$) must be >0 since it is a duty cycle or duty ratio, for example. Also, the duty cycles or duty ratios corresponding to the switching states of the switches in various embodiments of the DPP current balancing circuits and processes, can vary, as dependent on the use or application or on the number of switches or circuit configurations, for example, and should not be construed in a limiting sense.

Also, in an embodiment of the control process for DPP current balancing implemented by the controller 1200, if any of $\Delta S_1$, $\Delta S_2$ and $\Delta S_3$ is determined to be smaller than $-\frac{1}{3}$, then the following relation (9) will set $\Delta S_{min}$ to $-\frac{1}{3}$ and also scale the other $\Delta S$ to maintain the rule that $\Delta S_1 + \Delta S_2 + \Delta S_3 = 0$ as in relation (8):

$$\Delta S = \frac{\Delta S * \frac{1}{3}}{|\min \Delta S|}. \quad (9)$$

Further, in controlling the switching states $S_1$, $S_2$ and $S_3$, the switches can be gated, such as the switches 1132, 1134c and 1136c, as can be transistors. Also, the diodes respectively corresponding to the switches, such as the diodes 1131c, 1133c and 1135c, can be correspondingly antiparallel gated for current balancing of the DC voltage source modules, such as DC voltage source modules 1120c, 122c and 1124c. The gating of the switches and the antiparallel gating of the corresponding diodes can be based on the following relations that indicate an on-state for the corresponding switches, such as the switches 1132c, 1134c and 1136c, also thereby indicate an off-state for the diodes corresponding to the switches:

$$t_1 = S_2(i_{12} > 0) + S_3(i_{12} + i_{23} > 0), \quad (10)$$

$$t_2 = S_1(i_{12} + i_{23} < 0) + S_3(i_{23} > 0) \text{ and} \quad (11)$$

$$t_3 = S_1(i_{12} + i_{23} < 0) + S_2(i_{23} < 0). \quad (12)$$

Above, $t_1$ corresponds to the first switch 1132c, $t_2$ corresponds to the second switch 1134c and $t_3$ corresponds to the third switch 1136c. Irrespective of the inequalities of the values of the difference currents, the switches, such as the switches 1132c, 1134c and 1136c, as can be transistors, can be gated. Such gating of the switches can reduce the diode voltage drop (synchronized rectification) and can decrease conduction losses, for example.

The duty ratios or duty cycles, $\delta_1$-$\delta_3$, of the corresponding switches 1132c, 1134c and 1136c of the DPP current balancing circuit 1110c are controlled such that each DC voltage source module 1120c, 1122c and 1124c can carry or substantially carry the current at max power ($I_{mpp}$) which will differ from one DC voltage source module to another and that the voltage across each DC voltage source module will be a voltage at a maximum power ($V_{mpp}$), such as by control of the switching states $S_1$, $S_2$ and $S_3$ of the corresponding switches 1132c, 1134c and 1136c, as described. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense.

FIG. 13 illustrates a general schematic diagram of an embodiment of a voltage and current balancing circuit 1300. The voltage and current balancing circuit 1300 includes a plurality of DPP current balancing circuits 1350, 1360 and 1370, each similar to the DPP current balancing circuit 1110c, as described, for differential power processing to balance the current between series connected DC voltage source modules, such as PV arrays, in a corresponding DC voltage source string.

Each of the DPP current balancing circuits 1350, 1360 and 1370 operate in a similar manner to that of the DPP voltage balancing circuit 1110c, as described, in relation to FIGS. 11C-11F and 12. The voltage and current balancing circuit 1300 also includes an integrated embodiment of a string voltage balancing circuit 1310 that is similar to and operates in a similar manner to the voltage balancing circuits 400a and 400b, as described, to balance the voltage of a plurality DC voltage source strings in a power generation system. Positive and negative potentials for the voltage and current balancing circuit 1300 are indicated at 1380 and 1382, respectively. An advantage of the configuration and topology of the voltage and current balancing circuit 1300 is that it can provide expandability and flexibility in that the DC voltage source strings can be from different manufacturing sources and can be integrated in the circuit topology.

The DPP current balancing circuit 1350 is associated with a first DC voltage source string having DC voltage source modules 1352a, 1352b, 1352c and 1352d. The DPP current balancing circuit 1350 includes a plurality of switches 1154a, 1354b, 1354c and 1154d respectively connected with the DC voltage source modules 1352a, 1352b, 1352c and 1352d, each of the switches 1354a, 1354b, 1354c and 1354d is respectively associated with diodes 1355a, 1355b, 1355c and 1355d, to control bypass of a difference current. An inductor 1356a passing a difference current and inducing a difference voltage is connected between the DC voltage source modules 1352a and 1352b and connected between the switches 1354a and 1354b. An inductor 1356b passing a difference current and inducing a difference voltage is connected between the DC voltage source modules 1352b and 1352c and connected between the switches 1354b and 1354c. An inductor 1356c passing a difference current and inducing a difference voltage is connected between the DC voltage source modules 1352c and 1352d and connected between the switches 1354c and 1354d. A DC voltage $V_{c1}$ is provided across a capacitor 1358 connected in parallel with the DC voltage source modules 1352a, 1352b, 1352c and 1352d.

Similarly, the DPP current balancing circuit 1360 is associated with a second DC voltage source string having DC voltage source modules 1362a, 1362b, 1362c and 1362d. The DPP current balancing circuit 1360 includes a plurality of switches 1164a, 1364b, 1364c and 1164d respectively connected with the DC voltage source modules 1362a, 1362b, 1362c and 1362d, each of the switches 1364a, 1364b, 1364c and 1364d is respectively associated with diodes 1365a, 1365b, 1365c and 1365d, to control bypass of a difference current. An inductor 1366a passing a difference current and inducing a difference voltage is connected between the DC voltage source modules 1362a and 1362b and connected between the switches 1364a and 1364b. An inductor 1366b passing a difference current and inducing a difference voltage is connected between the DC voltage source modules 1362b and 1362c and connected between the switches 1364b and 1364c. An inductor 1366c passing a difference current and inducing a difference voltage is connected between the DC voltage source modules 1362c and 1362d and connected between the switches 1364c and 1364d. A DC voltage $V_{c2}$ is provided across a capacitor 1368 connected in parallel with the DC voltage source modules 1362a, 13 62b, 1362c and 1362d.

Also, the DPP current balancing circuit 1370 is associated with a third DC voltage source string having DC voltage source modules 1372a, 1372b, 1372c and 1372d. The DPP current balancing circuit 1370 includes a plurality of switches 1174a, 1374b, 1374c and 1174d respectively connected with the DC voltage source modules 1372a, 1372b, 1372c and 1372d, each of the switches 1374a, 1374b, 1374c and 1374d is respectively associated with diodes 1375a, 1375b, 1375c and 1375d, to control bypass of a difference current. An inductor 1376a passing a difference current and inducing a difference voltage is connected between the DC voltage source modules 1372a and 1372b and connected between the switches 1374a and 1374b. An inductor 1376b passing a difference current and inducing a difference voltage is connected between the DC voltage source modules 1372b and 1372c and connected between the switches 1374b and 1374c. An inductor 1376c passing a difference current and inducing a difference voltage is connected between the DC voltage source modules 1372c and 1372d and connected between the switches 1374c and 1374d. A DC voltage $V_{c3}$ is provided across a capacitor 1378 connected in parallel with the DC voltage source modules 1372a, 1372b, 1372c and 1362d.

Continuing, as to the string voltage balancing circuit 1310, the string voltage balancing circuit 1310 is connected between the three DC voltage source strings associated respectively associated with the DPP current balancing circuits 1350, 1360 and 1370. Also, the string voltage balancing circuit 1310 would typically be connected in a closed ring type configuration, similar to that illustrated in FIGS. 5A and 5B, as described, a portion of which is illustrated in FIG. 13. The string voltage balancing circuit 1310 can therefore be considered as an extension of the string voltage balancing circuits 410a and 410b of FIGS. 4A and 4B.

The string voltage balancing circuit 1310 includes reverse blocking switches (e.g., valves) 1311 and 1312 and an inductor 1317 connected between switches 1311 and 1312, the switches 1311 and 1312 dividing the inductor 1317 current between the two lines, such as according to their operating operation point, for example. In some embodiments, the switches 1311 and 1312 have reverse blocking capability or, as illustrated, can be connected to series diodes or to series diode type arrangements 1313 and 1314 configured to block reverse current to provide a reverse blocking capability, for example.

The string voltage balancing circuit 1310 also includes reverse blocking switches (e.g., valves) 1321 and 1322 and an inductor 1327 connected between switches 1321 and 1322, the switches 1321 and 1322 dividing the inductor 1327 current between the two lines, such as according to their operating operation point, for example. In some embodiments, the switches 1321 and 1322 have reverse blocking capability or, as illustrated, can be similarly connected to series diodes or to series diode type arrangements 1323 and 1324 configured to block reverse current to provide a reverse blocking capability, for example.

The string voltage balancing circuit 1310 is connected between the DC voltage source strings associated with the DPP current balancing circuits 1350, 1360 and 1370 to balance the voltages generated by the DC voltage source strings. The string voltage balancing circuit 1310 also includes three capacitors 1315, 1325 and 1335. The capacitor 1315 is connected in series to the switch 1354d of the DPP current balancing circuit 1350 and to the DC voltage source module 1352d and is also connected to the switch 1311. The capacitor 1325 is connected in series to the switch 1364d of the DPP current balancing circuit 1360 and to the DC voltage source module 1362d and is also connected to the switch 1312 and the switch 1321. The capacitor 1335 is connected in series to the switch 1374d of the DPP current balancing circuit 1370 and to the DC voltage source module 1372d and is also connected to the switch 1322.

The switches of the voltage and current balancing circuit 1300 can include any of various suitable switches, such as metal-oxide semiconductor field effect transistor (MOSFET) switches, insulated-gate bipolar transistor (IGBT) semiconductor switches, various types of transistor-type switches, or any another suitable components, as can depend on the use or application, and should not be construed in a limiting sense.

The duty ratios or duty cycles, δ, of the corresponding switches of the DPP current balancing circuits 1350, 1360 and 1370 are controlled such that each DC voltage source module can carry or substantially carry the current at max power ($I_{mpp}$) which will differ from one DC voltage source module to another and that voltage across each DC voltage source module will be a voltage at a maximum power ($V_{mpp}$), such as by control of the switching states of the switches, similar to that described in relation to FIGS. 11C-11F and 12. Also, the duty ratios or duty cycles, δ, of the corresponding the switches in the string voltage balancing circuit 1310 are controlled to get the desired output DC voltage across the load terminals of the power generation system. Such control can be provided by a suitable maximum power point control (MPP) process, such as can be implemented by a computer processor in Matlab®, such as can be implemented by the generalized system 1000 of FIG. 10, for example, as can depend on the use or application, and should not be construed in a limiting sense.

Figure 14A:
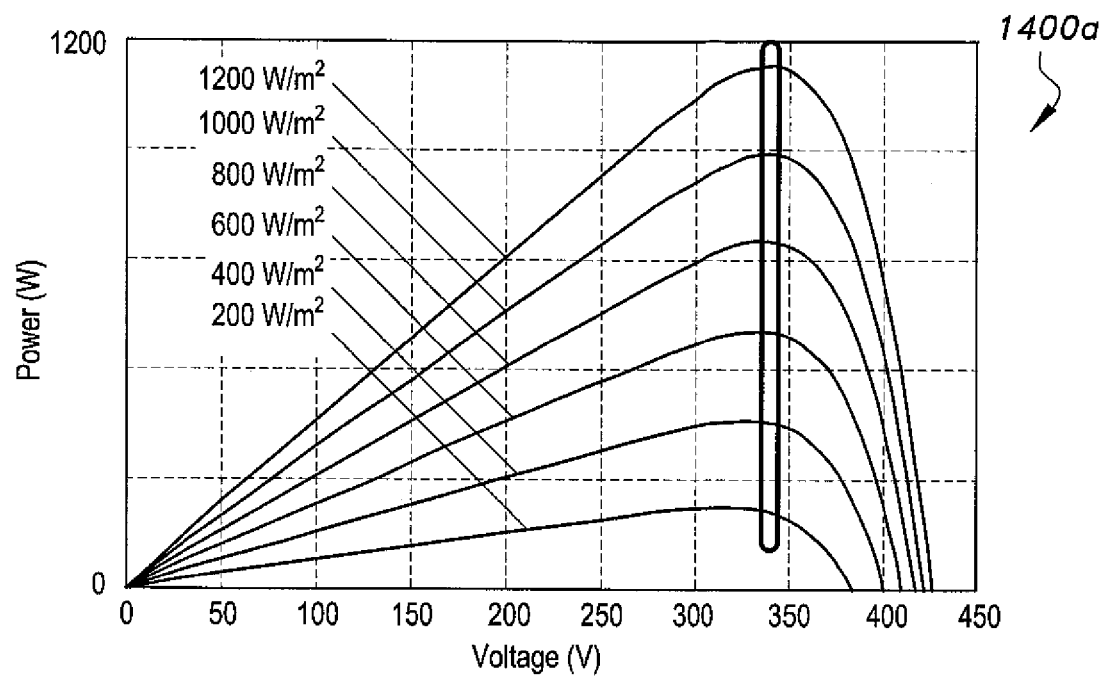
FIG. 14A illustrates a graph of power versus time for PV panel characteristics at different insolation levels for differential power processing in current balancing series connected DC voltage sources according to the present invention.

FIG. 14A illustrates a graph 1400a of power (watts (W)) versus time (s) for PV panel characteristics at different insolation levels for differential power processing in current balancing DC voltage source modules of series connected DC voltage sources. The differential power processing concept for extracting a maximum power from DC voltage source modules, such as PV arrays, during partial shading conditions can be applied such that each DC voltage source module can carry a current at maximum power ($I_{mpp}$) which can differ from one DC voltage source module to another. As illustrated form the graph 1400a, the voltage across each DC voltage source module is a voltage at maximum power ($V_{mpp}$), which is almost constant for all insolation levels. In this regard, by direct parallel connection of DC voltage source strings in the DPP current balancing, it is also possible to use the differential converters as voltage balancers for DC voltage source modules, which can reduce a need for additional balancing circuits, for example.

FIG. 14B, FIG. 14C, FIG. 14D, FIG. 14E, FIG. 14F and FIG. 14G illustrate graphs of simulation results respectively comparing voltage, current, overall string current, total output voltage, total output current and total output power, versus time, for a two DC voltage source string current balancing circuit topology, similar to the current balancing topology of FIG. 11C implemented for each of two DC voltage source strings for differential power processing to balance the current between series connected DC voltage source modules, such as PV arrays, in a corresponding DC voltage source string.

In the simulation, two parallel DC voltage source strings of a PV array consisting of a total combined six DC voltage source modules, each DC voltage source string including three DC voltage source modules, to provide a 3 by 2 PV array as shown in Table 3, the DC voltage source modules being referred to as "module" in the table. The DC voltage source modules in the simulation had an open circuit voltage of 22.2 V, a voltage at maximum power of 17.2 V, a short circuit current of 5.45 A, and a current at maximum power of 4.95 A at an insolation level of 1000 watts/meter$^2$ (W/m$^2$).

TABLE 3

| PV Array (3 × 2) | |
| --- | --- |
| DC Voltage Source Sting 1 | DC Voltage Source Sting 2 |
| Module 1 | Module 4 |
| Module 2 | Module 5 |
| Module 3 | Module 6 |

In the simulation, to demonstrate and validate the DPP current balancing concept as to direct parallel connection of DPP-based (series balancing based) strings, the following case was tested using Matlab®/Simulink, as set forth in Table 4.

TABLE 4

| Test Case Parameters for Simulation | | | | |
| --- | --- | --- | --- | --- |
| | Insolation (W/m$^2$) | $V_{mpp}$ (V) | $I_{mpp}$ (A) | $P_{mpp}$ (W) |
| Module 1 | 1000 | 17.2 | 5 | 85 |
| Module 2 | 300 | 17.2 | 1.39 | 24 |
| Module 3 | 800 | 17.2 | 4 | 68 |
| Module 4 | 1000 | 17.2 | 5 | 85 |

TABLE 4-continued

Test Case Parameters for Simulation

|  | Insolation (W/m²) | $V_{mpp}$ (V) | $I_{mpp}$ (A) | $P_{mpp}$ (W) |
|---|---|---|---|---|
| Module 5 | 1000 | 17.2 | 5 | 85 |
| Module 6 | 800 | 17.2 | 4 | 68 |

Based on the above data and parameters to extract a maximum power for a corresponding PV array, a power of 415 W was delivered at load at voltage of 51.6 V, and a current of 8.04 A. The corresponding simulation results for the abovementioned data are illustrated in the graphs of 1400b-1400g of FIGS. 14B through 14G. From the results illustrated in the graphs of FIGS. 14B-14G, it is evident that DPP current balancing was successfully applied, and a relatively exact MPP was extracted after a certain searching period.

Figure 14B:
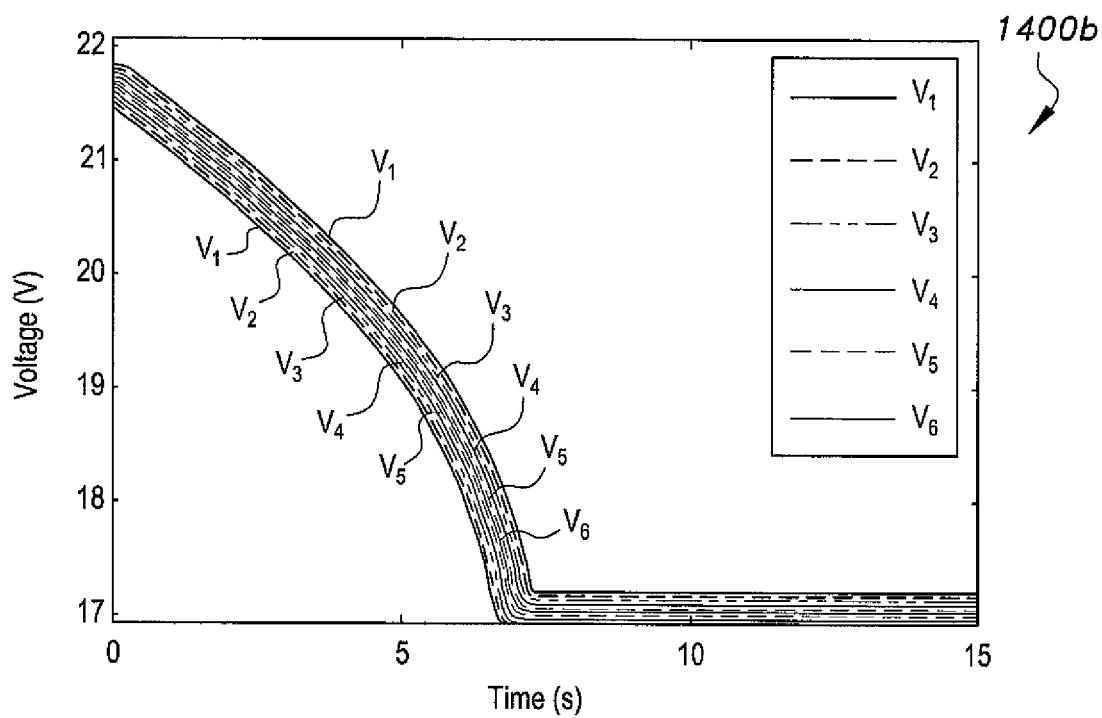
FIG. 14B, FIG. 14C, FIG. 14D, FIG. 14E, FIG. 14F and FIG. 14G illustrate graphs of simulation results respectively comparing voltage, current, overall string current, total output voltage, total output current and total output power, versus time, for a two DC voltage source string current balancing circuit topology, similar to the current balancing topology of FIG. 11C, as implemented for each DC voltage source string for differential power processing to balance the current between series connected DC voltage source modules, such as PV arrays, in a corresponding DC voltage source string according to the present invention.

FIG. 14B illustrates the graph 1400b of simulation results comparing voltage (V) versus time (s). In the graph 1400b it can be seen that the voltage $V_1$-$V_6$ for the modules 1-6 indicates DPP current balancing for each of the modules 1-6 of the DC voltage source strings 1 and 2.

Figure 14C:
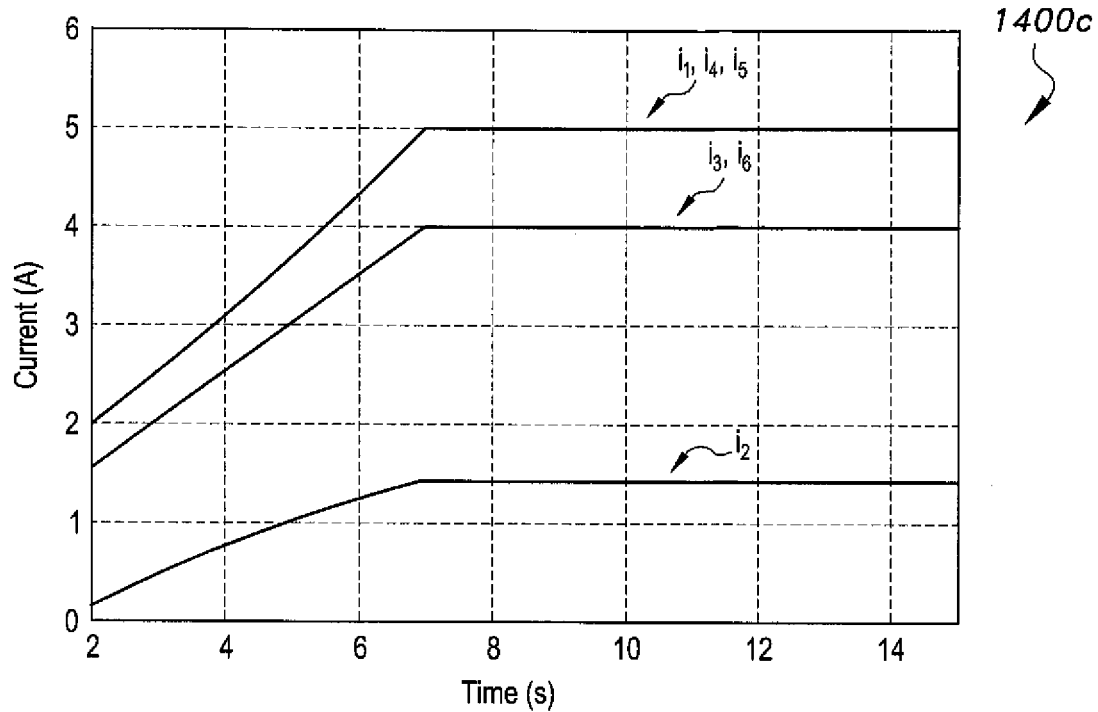

FIG. 14C illustrates the graph 1400c of simulation results comparing current (A) versus time (s). In the graph 1400c it can be seen that the current $i_1$-$i_6$ of the modules 1-6 indicates DPP current balancing for each of the modules 1-6 of the DC voltage source strings 1 and 2.

Figure 14D:
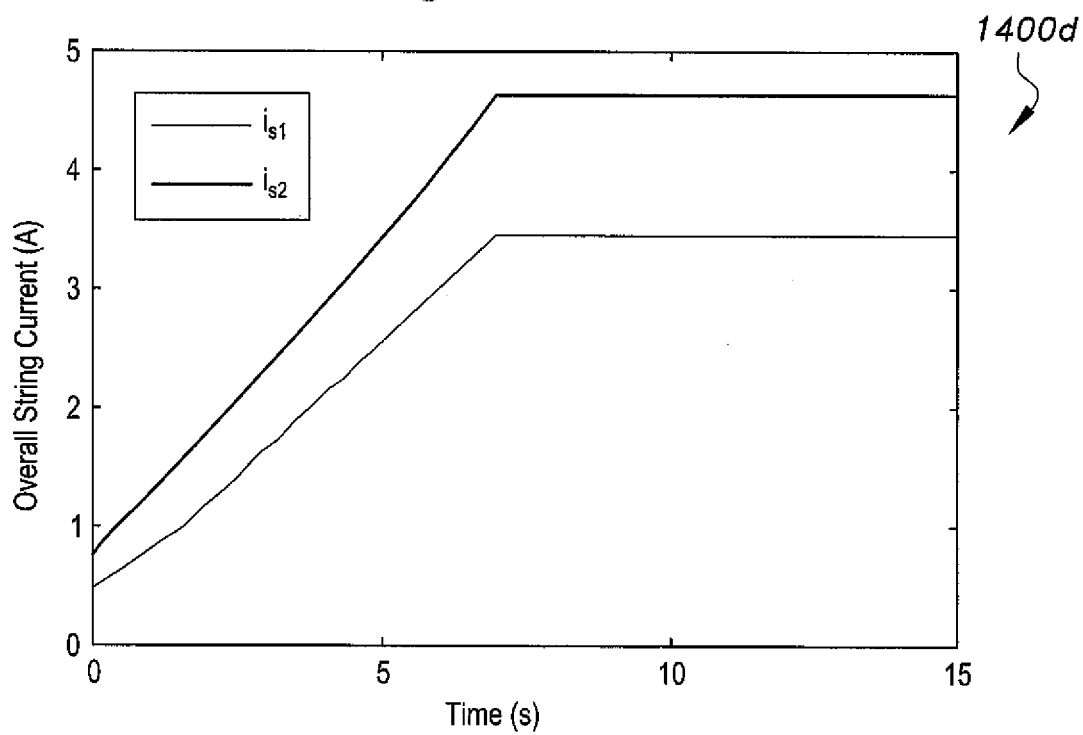

FIG. 14D illustrates the graph 1400d of simulation results comparing overall string current (A) versus time (s). In the graph 1400d, it can be seen that the current $i_{sc1}$ for the first DC voltage source string and the current $i_{sc2}$ for the second DC voltage source string indicates DPP current balancing for each of the modules 1-6 of the DC voltage source strings 1 and 2.

Figure 14E:
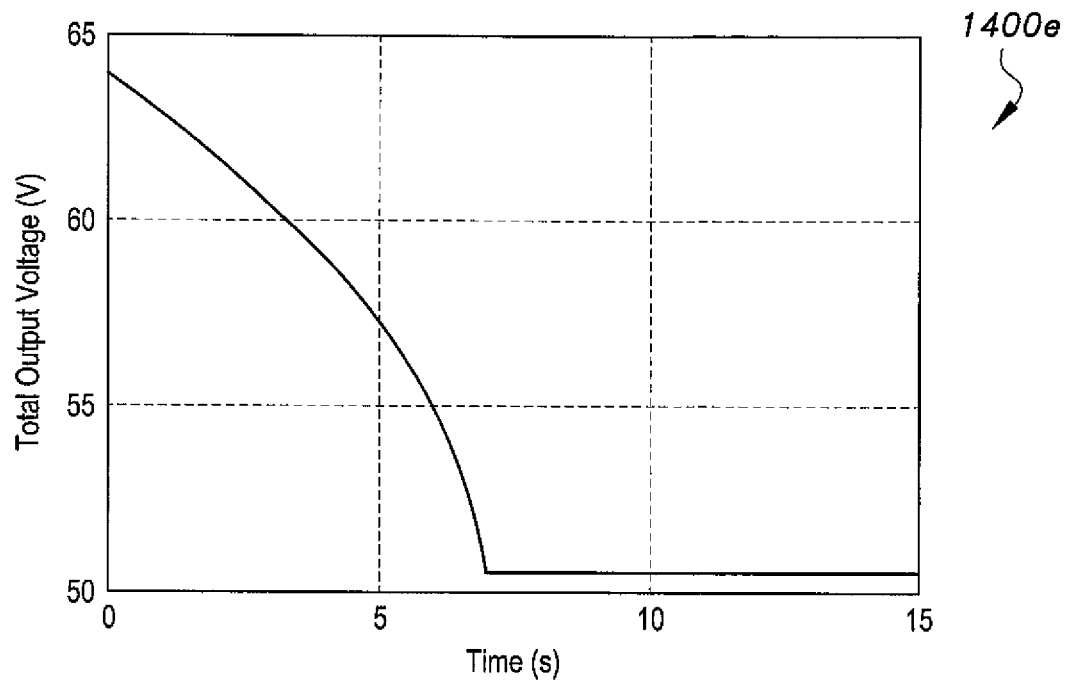

FIG. 14E illustrates the graph 1400e of simulation results comparing total output, voltage (V) versus time (s). In the graph 1400e, it can be seen that the total output voltage indicates DPP current balancing for each of the modules 1-6 of the DC voltage source strings 1 and 2.

Figure 14F:
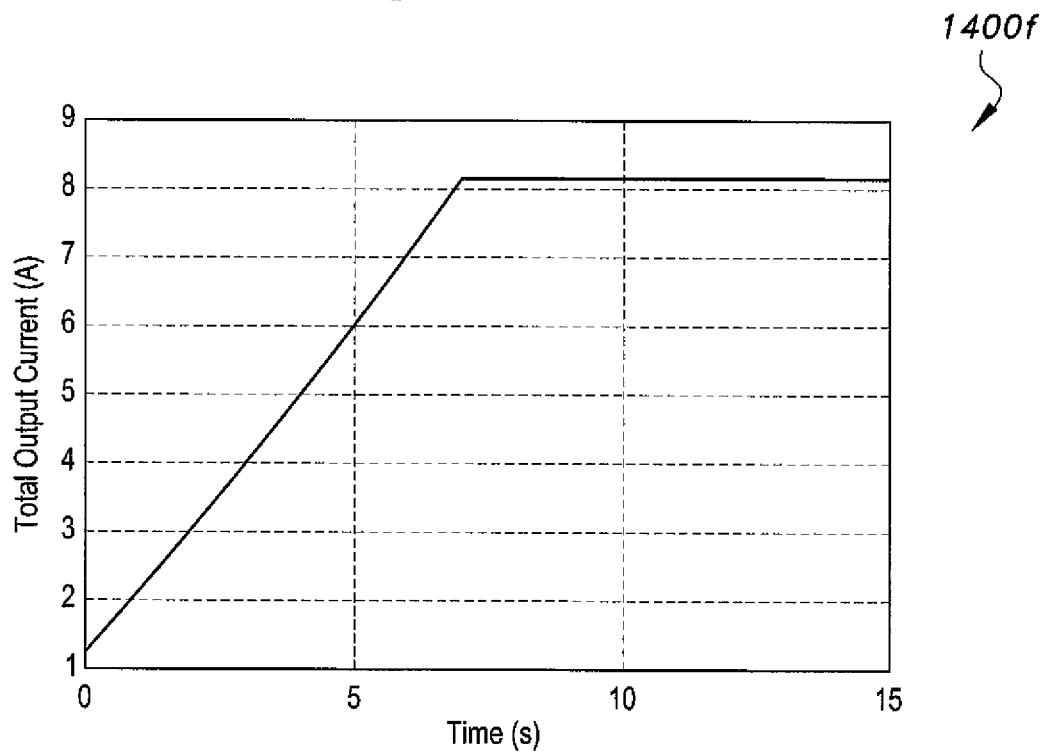

FIG. 14F illustrates the graph 1400f of simulation results comparing total output current (A) versus time (s). In the graph 1400f, it can be seen that the total output current indicates DPP current balancing for each of the modules 1-6 of the DC voltage source strings 1 and 2.

Figure 14G:
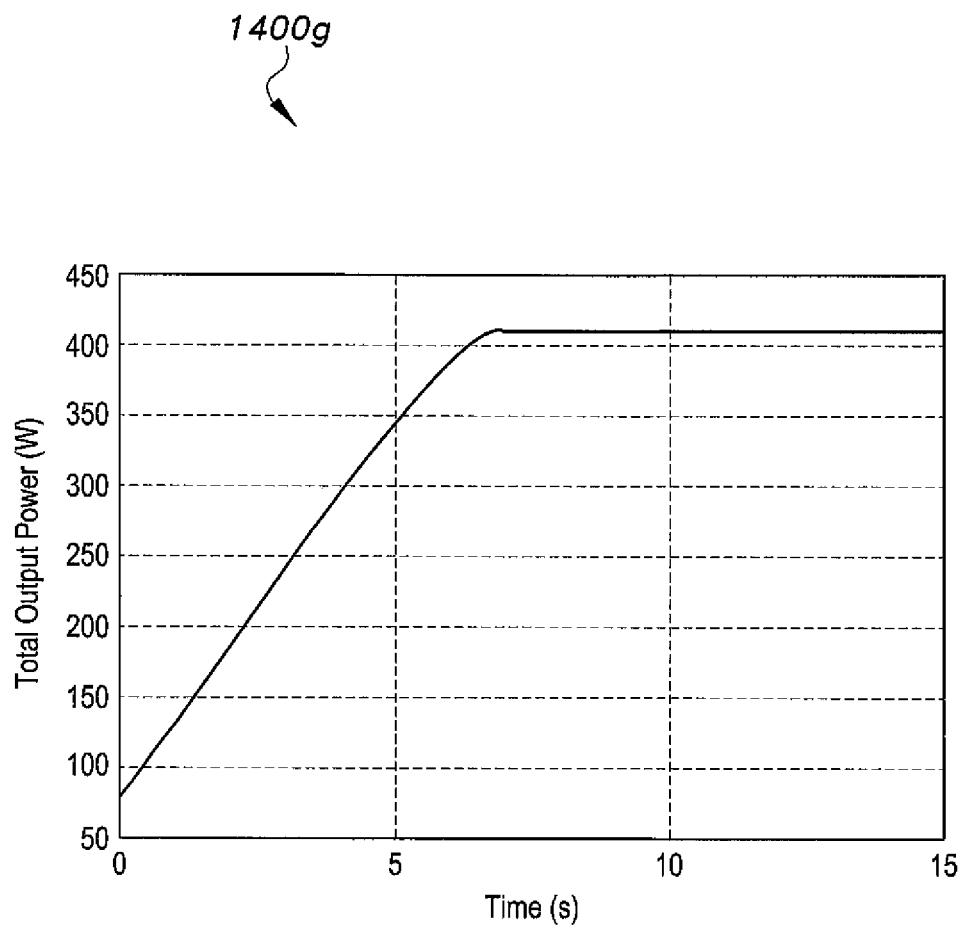

FIG. 14G illustrates the graph 1400g of simulation results comparing total output power (W) versus time (s). In the graph 1400g, it can be seen that the total output power indicates DPP current balancing for each of the modules 1-6 of the DC voltage source strings 1 and 2.

Those skilled in the art will appreciate that in some embodiments, additional or alternative components and/or modules can be used to perform string voltage balancing conversion. Disclosed systems and circuits can be utilized in AC power generation systems. In addition, disclosed systems and circuits can be used for systems in which at least some single and/or string sources are connected in series. Further, in some embodiments at least some DC source making up a DC voltage source string can be connected in parallel. Additional system components can be utilized, and disclosed system components can be combined or omitted. Depending on the embodiment, certain of the steps described above can be removed, others can be added.

Conditional language used herein, such as, among others, "can," "might," "may," "e.g.," and the like, unless specifically stated otherwise, or otherwise understood within the context as used, is generally intended to convey that certain embodiments include, while other embodiments do not necessarily have to include, certain features, elements and/or states. Also, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

For example, the various components illustrated in the figures can be implemented in dedicated hardware or on ASIC or on a field programmable gate array (FPGA), for example. Firmware and/or software modules can be additionally or alternatively used. Also, the features and attributes of the specific embodiments disclosed above can be combined in different ways to form additional embodiments, all of which fall within the scope of the present disclosure.

Although the present disclosure provides certain desirable embodiments and applications, other embodiments that are apparent to those of ordinary skill in the art, including embodiments which do not provide all of the features and advantages set forth herein, are also within the scope of this disclosure.

It is to be understood that the present invention is not limited to the embodiments described above, but encompasses any and all embodiments within the scope of the following claims.

We claim:

1. An apparatus for voltage balancing a plurality of parallel arranged direct current (DC) voltage source strings in a power generation system, comprising:
at least one string voltage balancing circuit, each string voltage balancing circuit comprising:
at least two reverse blocking switches each adapted to control a current flowing in and an output voltage of one or more corresponding DC voltage source strings; and
at least two capacitors each communicatively connected to a corresponding at least one reverse blocking switch and communicatively connected in series with a corresponding one of the plurality of DC voltage source strings, each capacitor being adapted to construct a voltage difference for a corresponding one of the plurality DC voltage source strings,
wherein the at least one string voltage balancing circuit selectively adjusts an output voltage of each of the DC voltage source strings by selectively controlling a current flowing in corresponding ones of the plurality of DC voltage source strings to selectively adjust a voltage constructed across corresponding ones of the at least two capacitors to balance the output voltage for each of the DC voltage source strings to be substantially the same output voltage.

2. The apparatus for voltage balancing a plurality of parallel arranged DC voltage source strings according to claim 1, wherein the at least one string voltage balancing circuit further comprises:
at least one inductor communicatively connected to least two reverse blocking switches adapted to minimize a ripple current flowing to the two reverse blocking switches, the current flowing in the inductor being divided by the at least two reverse blocking switches to flow the divided current into corresponding ones of the plurality of DC voltage source strings.

3. The apparatus for voltage balancing a plurality of parallel arranged DC voltage source strings according to claim 2, wherein the at least two reverse blocking switches comprise a switch selected from the group consisting of a transistor, a metal-oxide semiconductor field effect transistor (MOSFET) and an insulated-gate bipolar transistor (IGBT).

4. The apparatus for voltage balancing a plurality of parallel arranged DC voltage source strings according to claim 1, wherein the at least two reverse blocking switches comprise a switch selected from the group consisting of a transistor, a metal-oxide semiconductor field effect transistor (MOSFET) and an insulated-gate bipolar transistor (IGBT).

5. The apparatus for voltage balancing a plurality of parallel arranged DC voltage source strings according to claim 1, wherein duty ratios of the at least two reverse blocking switches are controlled to construct the voltage difference for corresponding ones of the plurality DC voltage source strings to balance the output voltage for each of the DC voltage source strings to be substantially the same output voltage.

6. The apparatus for voltage balancing a plurality of parallel arranged DC voltage source strings according to claim 5, wherein a sum of the duty ratios of the at two reverse blocking switches is substantially equal to one (1).

7. The apparatus for voltage balancing a plurality of parallel arranged DC voltage source strings according to claim 1, wherein the at least one string voltage balancing circuit further comprises:
at least two diodes respectively arranged in series with corresponding ones of the at least two reverse blocking switches adapted to control a direction of current flow.

8. The apparatus for voltage balancing a plurality of parallel arranged DC voltage source strings according to claim 1, wherein
the at least one string voltage balancing circuit comprises a closed loop voltage balancing configuration, and
the closed loop configuration comprises:
at least six reverse blocking switches adapted to control a current flowing in and an output voltage of at least three corresponding DC voltage source strings, and
at least three capacitors each communicatively connected to at least a corresponding pair of reverse blocking switches and to a corresponding one of the DC voltage source strings.

9. The apparatus for voltage balancing a plurality of parallel arranged DC voltage source strings according to claim 1, wherein
the at least one string voltage balancing circuit comprises a complimentary string voltage balancing configuration, and
the complimentary string voltage balancing configuration comprises:
at least a pair of said string voltage balancing circuits, each pair of said string voltage balancing circuits being arranged in opposing relation at opposite ends of a corresponding group of three DC voltage source strings adapted to control a current flowing in and an output voltage of the group of the three corresponding DC voltage source strings,
wherein a capacitor from each of said pair of said string voltage balancing circuits is communicatively connected to a same corresponding one of the DC voltage source strings of the group of three DC voltage source strings, the capacitors connected to the same corresponding DC voltage source string being adapted to construct a voltage difference for the said same DC voltage source string.

10. The apparatus for voltage balancing a plurality of parallel arranged DC voltage source strings according to claim 1, wherein
the at least one string voltage balancing circuit comprises a single star string voltage balancing configuration, and the single star string voltage balancing configuration comprises:
at least three reverse blocking switches each associated with a respective one of a corresponding plurality of DC voltage source strings adapted to control a current flowing in and an output voltage of the respective one of the DC voltage source strings, and
at least three capacitors each communicatively connected to a respective one of the DC voltage source strings to which the corresponding respective reverse blocking switch is communicatively connected.

11. The apparatus for voltage balancing a plurality of parallel arranged DC voltage source strings according to claim 10, wherein the single star voltage balancing configuration further comprises:
an inductor communicatively connected to each of the plurality of reverse blocking switches adapted to minimize a ripple current flowing to the reverse blocking switches, the current flowing in the inductor being divided by the reverse blocking switches to flow the divided current into corresponding ones of the plurality of DC voltage source strings.

12. The apparatus for voltage balancing a plurality of parallel arranged DC voltage source strings according to claim 1, wherein
the at least one string voltage balancing circuit comprises a double star string voltage balancing configuration, and
the double star string voltage balancing configuration comprises:
a first group and a second group each of at least three reverse blocking switches, a reverse blocking switch from each of the first and the second group being respectively associated with a respective one of a corresponding plurality of DC voltage source strings adapted to control a current flowing in and an output voltage of the respective one of the DC voltage source strings, and
at least three capacitors each communicatively connected to a respective one of the DC voltage source strings to which the corresponding respective reverse blocking switch from the first group and the respective reverse blocking switch from the second group is communicatively connected.

13. The apparatus for voltage balancing a plurality of parallel arranged DC voltage source strings according to claim 12, wherein the double star voltage balancing configuration further comprises:
a pair of inductors, one of said pair of inductors being communicatively connected to the first group of reverse blocking switches and the other of the pair of inductors being communicatively connected to the second group of reverse blocking switches, the pair of inductors adapted to minimize a ripple current flowing to the reverse blocking switches, the current flowing in the inductor communicatively connected to the first group of reverse blocking switches being divided by the reverse blocking switches of the first group to flow the divided current into corresponding ones of the plurality of DC voltage source strings, and the current flowing in the inductor communicatively connected to the second group of reverse blocking switches being divided by the reverse blocking switches of the second group to flow the divided current into corresponding ones of the plurality of DC voltage source strings.

14. The apparatus for voltage balancing a plurality of parallel arranged DC voltage source strings according to claim 1, further comprising:

a controller including a processor to control operation of the at least one voltage balancing circuit to selectively adjust the output voltage of each of the DC voltage source strings by selectively controlling a current flowing in corresponding ones of the plurality of DC voltage source strings to selectively adjust a voltage constructed across corresponding ones of the at least two capacitors to balance the output voltage for each of the DC voltage source strings to be substantially the same output voltage.

15. A method for voltage balancing a plurality of parallel arranged direct current (DC) voltage source strings in a power generation system, comprising the steps of:

controlling by a controller including a processor an operation of at least one string voltage balancing circuit to selectively adjust an output voltage of each of a plurality of DC voltage source strings by selectively controlling a current flowing in corresponding ones of the plurality of DC voltage source strings;

selectively controlling by the controller a current flowing in each of the plurality of DC voltage source strings by controlling operation of at least two reverse blocking switches associated with a corresponding at least one voltage balancing circuit, each reverse blocking switch associated with a corresponding one of the plurality of DC voltage source strings; and selectively adjusting by the controller a voltage difference for at least two capacitors associated with a corresponding at least one voltage balancing circuit to selectively adjust a voltage constructed across corresponding ones of the at least two capacitors to balance the output voltage for each of the DC voltage source strings to be substantially the same output voltage.

16. The method for voltage balancing a plurality of parallel arranged direct current (DC) voltage source strings in a power generation system according to claim 15, further comprising the step of:

controlling by the controller including a processor an operation of differential power processing (DPP) to adjust respective currents flowing through each of a plurality of series connected DC voltage source modules respectively forming corresponding ones of the plurality of DC voltage source strings by a plurality of reverse blocking switches communicatively connected to the corresponding ones of the series connected DC voltage source modules to balance the current between corresponding ones of the series connected DC voltage source modules.

17. The method for voltage balancing a plurality of parallel arranged direct current (DC) voltage source strings in a power generation system according to claim 16, wherein the controller controls the operation of differential power processing (DPP) to adjust the respective currents flowing through each of the plurality of series connected DC voltage source modules such that each DC voltage source module can substantially carry a current at a maximum power ($I_{mpp}$) different from another DC voltage source module in the corresponding ones of the plurality of DC voltage source strings, and a voltage generated by each DC voltage source module based on the adjusted current corresponds to a voltage at a maximum power ($V_{mpp}$).

18. An apparatus for current balancing a plurality of parallel arranged direct current (DC) voltage source strings in a power generation system, comprising:

at least one differential power processing (DPP) current balancing circuit, each DPP current balancing circuit comprising:

a plurality of reverse blocking switches communicatively connected to a plurality of series connected DC voltage source modules respectively forming corresponding ones of the plurality of DC voltage source strings to control currents respectively flowing through each of the communicatively connected series connected DC voltage source modules; and a plurality of inductors communicatively connected to the series connected DC voltage source modules and to the plurality of reverse blocking switches to induce a corresponding voltage based on the flow of the respective controlled currents to balance a current between corresponding ones of the series connected DC voltage source modules to adjust the respective currents flowing through each of the plurality of series connected DC voltage source modules.

19. The apparatus for current balancing a plurality of parallel arranged direct current (DC) voltage source strings in a power generation system according to claim 18, further comprising:

a controller including a processor to control operation of the plurality of reverse blocking switches for the differential power processing (DPP) operation to control adjusting the respective controlled currents flowing through each of the plurality of inductors to the series connected DC voltage source modules respectively forming corresponding ones of the plurality of DC voltage source strings to balance the current between the corresponding series connected DC voltage source modules.

20. The apparatus for current balancing a plurality of parallel arranged direct current (DC) voltage source strings in a power generation system according to claim 19, wherein the controller controls the operation of differential power processing (DPP) to adjust the respective currents flowing through each of the plurality of series connected DC voltage source modules such that each DC voltage source module can substantially carry a current at a maximum power ($L_{mpp}$) different from another DC voltage source module in the corresponding ones of the plurality of DC voltage source strings, and a voltage generated by each DC voltage source module based on the adjusted current corresponds to a voltage at a maximum power ($V_{mpp}$).

* * * * *